(12) United States Patent
Takada

(10) Patent No.: US 6,885,483 B2
(45) Date of Patent: Apr. 26, 2005

(54) HOLOGRAM SCREEN AND A METHOD OF PRODUCING THE SAME

(75) Inventor: Kenichiro Takada, Kuwana (JP)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 10/868,618

(22) Filed: Jun. 15, 2004

(65) Prior Publication Data

US 2004/0263927 A1 Dec. 30, 2004

Related U.S. Application Data

(62) Division of application No. 10/403,851, filed on Mar. 31, 2003, now abandoned, which is a division of application No. 10/106,777, filed on Mar. 26, 2002, now Pat. No. 6,597,477, which is a division of application No. 09/348,009, filed on Jul. 6, 1999, now Pat. No. 6,421,147.

(30) Foreign Application Priority Data

| Jul. 7, 1998 | (JP) | 10-191572 |
|---|---|---|
| Jul. 10, 1998 | (JP) | 10-195711 |
| Sep. 2, 1998 | (JP) | 10-248807 |
| Oct. 14, 1998 | (JP) | 10-292447 |

(51) Int. Cl.⁷ .............................................. G02B 5/32
(52) U.S. Cl. ......................................... 359/15; 359/599
(58) Field of Search ................................ 359/1, 15, 16, 359/35, 599

(56) References Cited

U.S. PATENT DOCUMENTS

| 4,602,843 A | 7/1986 | Glaser-Inbari |
|---|---|---|
| 4,960,314 A | 10/1990 | Smith et al. |

(Continued)

FOREIGN PATENT DOCUMENTS

| GB | 2315565 | 2/1998 |
|---|---|---|
| JP | 52-12568 | 4/1977 |

(Continued)

OTHER PUBLICATIONS

Patent Abstract of Japan, vol. 1998, No. 2, Jan. 30, 1998 and JP 09–259765 A (Sony Corp) Oct. 3, 1997.

(Continued)

Primary Examiner—Leo Boutsikaris
(74) Attorney, Agent, or Firm—Harness, Dickey & Pierce, PLC

(57) ABSTRACT

In a hologram screen for reproducing an image based on an output light obtained by scattering and diffusing an image light from an image projector, when a white light (image light) is projected on the hologram screen; and when a distance between two points at optional two points A and B on a surface of the hologram screen is given by 20 cm or less, and a value of the CIE 1976 chromaticity coordinate (u', v') at the point A is given by $(u'_A, v'_A)$ and the value of the CIE 1976 chromaticity coordinate (u', v') at the point B is given by $(u'_B, v'_B)$; the output light perpendicularly from the surface of the hologram screen has a color distribution in which a color difference Δu'v' between two points A and B is derived from the following formula (1) and given by 0.06 or less, where, the formula (1) is expressed by, $$\Delta u'v' = [(u'_A - u'_B)^2 + (v'_A - v'_B)^2]^{1/2} \quad (1)$$

Further, the output light, which is output to a viewpoint defined by the following formula (2) from the surface of the hologram screen, has the color distribution in which a color difference Δu'v' between two points A and B is derived from the above formula (1) and given by 0.01 or less, where, the formula (2) is expressed by, $$H/2L = 0.1 \quad (2)$$

in the formula (2), L is a distance between the viewpoint and a center of the hologram screen, and H is a length of the hologram screen in the direction of the height.

3 Claims, 63 Drawing Sheets

U.S. PATENT DOCUMENTS

| | | | |
|---|---|---|---|
| 5,016,950 A | | 5/1991 | Smith |
| 5,046,793 A | * | 9/1991 | Hockley et al. .............. 359/12 |
| 5,731,108 A | * | 3/1998 | Biles ............................. 430/1 |
| 5,796,499 A | | 8/1998 | Wenyon |
| 5,812,287 A | | 9/1998 | Vivarelli |
| 5,993,006 A | | 11/1999 | Takeuchi et al. |
| 6,020,090 A | | 2/2000 | Takada et al. |
| 6,111,670 A | | 8/2000 | Hattori et al. |
| 6,421,147 B1 | | 7/2002 | Takada |

FOREIGN PATENT DOCUMENTS

| | | |
|---|---|---|
| JP | 3-204678 | 9/1991 |
| JP | 4-263281 | 9/1992 |
| JP | 4-306689 | 10/1992 |
| JP | 6-186424 | 7/1994 |
| JP | 9-166762 | 6/1997 |

OTHER PUBLICATIONS

Gambogi, et al., "Holographic Transmission Elements Using Improved Photopolymer Films", SPIE, Vo. 1555 Computer and Optically Generated Holographic Optics (Fourth in a Series), 1991, pp. 256–267.

* cited by examiner $$X = K \int_{380}^{780} S(\lambda) x(\lambda) \tau(\lambda) d\lambda$$

$$K = 100 \bigg/ \int_{380}^{780} S(\lambda) y(\lambda) d\lambda$$

$S(\lambda)$: SPECTRUM DISTRIBUTION OF STANDARD LIGHT
$x(\lambda), y(\lambda)$: SAME COLOR FUNCTION AT XYZ-COLOR-COORDINATE
$\tau(\lambda)$: SPECTRUM TRANSMISSION POSITION 0mm (PRESENT INVENTION)

(PRESENT INVENTION)

(PRESENT INVENTION)

(COMPARISON)

(COMPARISON)

(COMPARISON)

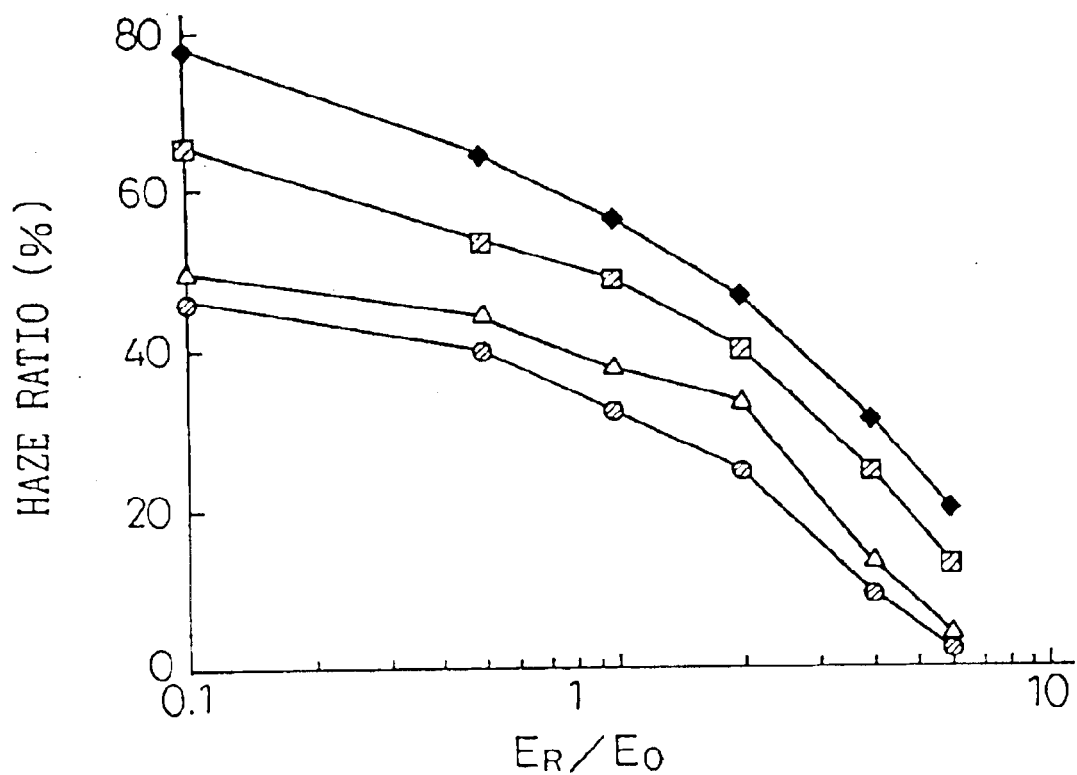
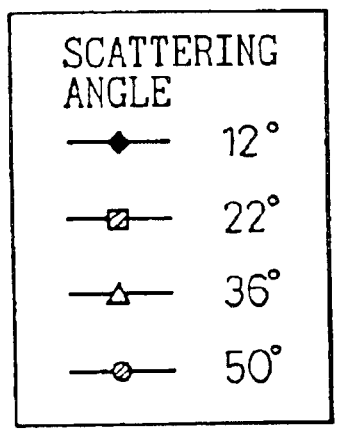
Fig.90

HOLOGRAM SCREEN AND A METHOD OF PRODUCING THE SAME

CROSS-REFERENCE TO RELATED APPLICATIONS

This application is a divisional of U.S. patent application Ser. No. 10/403,851 filed on Mar. 31, 2003 now abandoned, which is a divisional of U.S. patent application Ser. No. 10/106,777 filed Mar. 26, 2002 now U.S. Pat. No. 6,597,477 which is a divisional of U.S. patent application Ser. No. 09/348,009, filed Jul. 6, 1999, now U.S. Pat. No. 6,421,147, issued Jul. 16, 2002, which claims priority to Japanese App. No. 10-191572. filed Jul. 7, 1998; Japanese App. No. 10-195711, filed Jul. 10, 1998; Japanese App. No. 10-248807, filed Sep. 2, 1998; and Japanese App. No. 10-292447, filed Oct. 14, 1998.

BACKGROUND OF THE INVENTION

1. Field of the Invention

The present invention relates to a hologram screen and a method of producing the same. In particular, a first aspect of the present invention relates to a hologram screen for reproducing an image based on an output light obtained by scattering and diffusing an image light which is input from an image projector, and a producing method of the same; a second aspect of the present invention relates to a producing method of a hologram element which can be used as a display apparatus for displaying the image, such as a still image and an animation, by irradiating the image light thereto; a third aspect of the present invention relates to a hologram screen and a producing method of the same; and a fourth aspect of the present invention relates to a hologram screen for reproducing an image based on an output light obtained by scattering and diffusing an image light.

2. Description of the Related Art

A hologram screen, which is formed by a hologram element and a transparent glass, has been widely known in the field of image projecting techniques. A hologram element is of basically two types, i.e., a light-transmitting type and a light-reflecting type and the position of an observer who observes the hologram screen is different in each type.

As representative problems to be solved in a conventional hologram screen, there are the quality of the image, such as unevenness of color and brightness on the hologram screen, cloudiness and a partial non-transparent state on the hologram screen, and the difficulty of preparing very large hologram screen. These problems will be explained in detail with reference to the attached drawings described below.

SUMMARY OF THE INVENTION

The first object of the present invention is to provide a hologram screen, which has no unevenness of color on the reproduced image, and a method of producing the screen.

The second object of the present invention is to provide a method of producing a hologram screen in which an observer can observe a uniformly bright image without change of brightness and color to a broad extent on the hologram screen.

The third object of the present invention is to provide a hologram screen, which has good reappearance of the reproduced image on the hologram screen and which can realize low cost and easy production of the hologram screen, and a method of producing the screen.

The fourth object of the present invention is to provide a hologram screen which has good transparency and no cloudy state so that the observer clearly and easily observe the back of the hologram screen.

In accordance with a first aspect of the present invention, there is provided a hologram screen, and a method of producing the same, for reproducing an image based on an output light obtained by scattering and diffusing an image light from an image projector, characterized in that; when a white light is used as the image light and projected on the hologram screen; and when a distance between two points at optional two points A and B on a surface of the hologram screen is given by 20 cm or less, and a value of the CIE 1976 chromaticity coordinate (u', v') at the point A is given by (u'$_A$, v'$_A$) and the value of the CIE 1976 chromaticity coordinate (u', v') at the point B is given by (u'$_B$, v'$_B$); the output light, which is output perpendicularly from the surface of the hologram screen, has a color distribution in which a color difference Δu'v' between two points A and B is derived from the following formula (1) and given by 0.06 or less, where, the formula (1) is expressed by, $$\Delta u'v' = [(u'_A - u'_B)^2 + (v'_A - v'_B)^2]^{1/2} \tag{1}$$

Further, the output light, which is output to a viewpoint defined by the following formula (2) from the surface of the hologram screen, has a color distribution in which a color difference Δu'v' between two points A and B is derived from the above formula (1) and given by 0.01 or less, where, the formula (2) is expressed by, $$H/2L = 0.1 \tag{2}$$

in the formula (2), L is a distance between the viewpoint and a center of the hologram screen, and H is a length of the hologram screen at the direction of the height.

In a preferred embodiment, a spectral characteristic of the output light, which is output perpendicularly from the surface of the hologram screen, has a characteristic in which either a difference between peak wavelengths at the whole of the surface of the hologram screen is given by 120 nm or less, or a difference between half bandwidth is given by 100 nm or less.

In another preferred embodiment, when producing the hologram screen defined in claim 1 or 2 by irradiating the object light and the reference light onto a photosensitive material and by exposing the photosensitive material, the photosensitive material has a thickness distribution which is inclined to an incident direction of the reference light.

In still another preferred embodiment, when an incident angle of the reference light to the photosensitive material becomes larger, the thickness distribution of the photosensitive material becomes thicker.

In still another preferred embodiment, when the thickness at a center of the photosensitive material is $T_0$, and when thickness difference of both ends of the photosensitive material is ΔT, the following relationship, i.e., ΔT ≦ 0.5$T_0$, is defined.

In still another preferred embodiment, the thickness distribution of the photosensitive material is defined by the following formula (3), i.e., $$T = a(R_0 - R) + T_0, \text{ and } a = b \cdot \theta_0^{-0.9} \tag{3}$$

where, T is a thickness at an optional point on the photosensitive material, $T_0$ is a thickness at the center of the photosensitive material, R is an incident distance of the reference light at the optional point on the photosensitive material, $R_0$ is the incident distance of the reference light at the center on the photosensitive material, $\theta_0$ is an incident angle of the reference light at the center of the photosensitive material, and "b" is a coefficient determined by the thickness of the photosensitive material and given by 0<b<1.

In still another preferred embodiment, when producing the hologram screen defined in claim 1 or 2 by irradiating the object light and the reference light onto a photosensitive material and by exposing the photosensitive material, ultraviolet light is previously irradiated onto the photosensitive material so as to have an energy distribution which is inclined to an incident direction of the reference light.

In still another preferred embodiment, the energy distribution of the ultraviolet is given by the following formula (4), i.e., $$0.8E \leq Euv \leq 1.2E, \text{ and } E=0.01 \cdot (R-R_0)+E_0 \quad (4)$$

where, R is the incident distance of the reference light at the optional point on the photosensitive material, Euv is an amount of energy of the ultraviolet irradiated to the optional point on the photosensitive material, $R_0$ is the incident distance of the reference light at the center of the photosensitive material, and $E_0$ is the amount of energy of the ultraviolet irradiated to the center of the photosensitive material.

In still another preferred embodiment, when producing the hologram screen defined in claim 1 or 2 by irradiating the object light and the reference light onto a photosensitive material and by exposing the photosensitive material, an incident distance of the reference light at an optional point of the reference light is shorter than an incident distance of an image light which is irradiated from an image projector when reproducing the image on the hologram screen.

In still another preferred embodiment, when producing the hologram screen defined in claim 1 or 2 by irradiating the object light and the reference light onto a photosensitive material and by exposing the photosensitive material, an intensity ratio of the reference light and the object light is defined by a relationship of $I_R/I_O \leq 10$, on the whole of the surface of the photosensitive material, where, $I_R$ is the intensity of the reference light, and $I_O$ is the intensity of the object light.

In accordance with a second aspect of the present invention, there is provided a method for producing a hologram screen formed by interfering of a reference light and an object light transmitted through a light diffusion body, and by recording the light diffusion body on a photosensitive material, characterized in that; a mirror is arranged approximately perpendicular to the light diffusion body; the photosensitive material and the light diffusion body are rotated by the same angle θ around an axis which is intersected perpendicularly to a center of the photosensitive material and used as a rotational center; and a polarized direction of a laser light is defined by either P-polarization or S-polarization which is inclined by the angle in the range of θ−5 to θ+5.

In accordance with a third aspect of the present invention, there is provided a hologram screen for reproducing an image based on an output light obtained by scattering and diffusing an image light from an image projector, characterized in that; a half bandwidth of a spectral characteristic of the hologram screen is given by 100 nm or more; a diffusion light which is obtained by a light diffusion body having a large light diffusion angle is used as an object light; a non-diffusion light is used as a reference light; and the object light and the reference light are irradiated on a photosensitive material in order to form an interference fringe so that a hologram element is produced.

In a preferred embodiment, the light diffusion angle of the hologram screen is defined by an angle in which the light diffusion angle of the hologram screen is 100 or more.

In another preferred embodiment, a half bandwidth of a spectral characteristic of the hologram screen is given by 100 nm or more; a diffusion light which is obtained by a light diffusion body is used as an object light; a non-diffusion light is used as a reference light; and the object light and the reference light are irradiated on a photosensitive material having the thickness of 1 to Δn in order to form an interference fringe so that a hologram element is produced.

In still another preferred embodiment, a peak wavelength of the hologram screen is either 525 nm or less, or 585 nm or more; a half bandwidth of a spectral characteristic of the hologram screen is 100 nm or more; a diffusion light which is obtained by a light diffusion body is used as an object light; a non-diffusion light is used as a reference light; the object light and the reference light are irradiated on a photosensitive material in order to form an interference fringe; and a refractive index of the photosensitive material is adjusted so that a hologram element is produced.

In still another preferred embodiment, the diffusion light which is obtained by the light diffusion body is used as the object light; the non-diffusion light is used as the reference light; the object light and the reference light are irradiated on the photosensitive material in order to form the interference fringe; and a heat treatment is performed for the photosensitive material in the extent of 80° to 150° C. so that a hologram element is produced.

In still another preferred embodiment, the diffusion light which is obtained by the light diffusion body is used as the object light; the non-diffusion light is used as the reference light; a sum of an exposure intensity of the object light and the exposure intensity of the reference light is defined in the extent of 0.02 to 50 mW/cm²; the object light and the reference light are irradiated on the photosensitive material in order to form the interference fringe so that a hologram element is produced.

In still another preferred embodiment, the diffusion light which is obtained by the light diffusion body is used as the object light; the non-diffusion light is used as the reference light; an intensity ratio (R/O) of the intensity (O) of the object light and the intensity (R) of the reference right is defined by 0.1 to 30; and the object light and the reference light are irradiated on the photosensitive material in order to form the interference fringe so that a hologram element is produced.

In still another preferred embodiment, a peak wavelength of the hologram screen is either 525 nm or less, or 585 nm or more; a diffusion light which is obtained by a light diffusion body is used as an object light; a non-diffusion light is used as a reference light; the object light and the reference light are irradiated on a photosensitive material in order to form an interference fringe; and a thickness of of the photosensitive material is adjusted so that a hologram element is produced.

In still another preferred embodiment, a peak wavelength of the hologram screen is either 525 nm or less, or 585 nm or more; a diffusion light which is obtained by a light diffusion body is used as an object light; a non-diffusion light is used as a reference light; an incident angle $\theta_r$ of the reference light to a photosensitive material is different from an incident angle θe of the image light to the hologram screen; and the object light and the reference light each having the above different angle are irradiated on the photosensitive material in order to form an interference fringe so that a hologram element is produced.

In still another preferred embodiment, an amount of angle correction which indicates a difference between the incident angle $\theta_r$ and the incident angle θe is defined by the extent of −5° to +5°.

In still another preferred embodiment, a half bandwidth of a spectrum characteristic of the hologram screen is given by 100 nm or more; a diffusion light which is obtained by a light diffusion body is used as an object light; a non-diffusion light is used as a reference light; and a plurality of object lights each having different angle are irradiated on a photosensitive material in order to form an interference fringe so that a hologram element is produced.

In accordance with a third aspect of the present invention, there is provided a hologram screen for reproducing an image based on an output light obtained by scattering and diffusing an image light from an image projector, characterized in that, a haze ratio is given by 5 to 60%.

In a preferred embodiment, a screen gain of the hologram screen is given by 0.3 or more.

In another preferred embodiment, an intensity ratio $E_R/E_O$ of the intensity $E_O$ of the object light and the intensity $E_R$ of the reference light is changed in accordance with a scattering angle of the light diffusion body.

In still another preferred embodiment, when the scattering angle of the light diffusion body is set to a large angle, the intensity ratio $E_R/E_O$ is set to a small value.

BRIEF DESCRIPTION OF THE DRAWINGS

FIG. 90 is a graph for the relationship between the intensity ratio $E_R/E_O$ and the haze ratio at various scattering angles of the light diffusion body in the second embodiment;

DESCRIPTION OF THE PREFERRED EMBODIMENTS

Before explaining preferred embodiments of the present invention, the conventional arts and their problems will be explained in detail with reference to the attached drawings.

Figure 1:
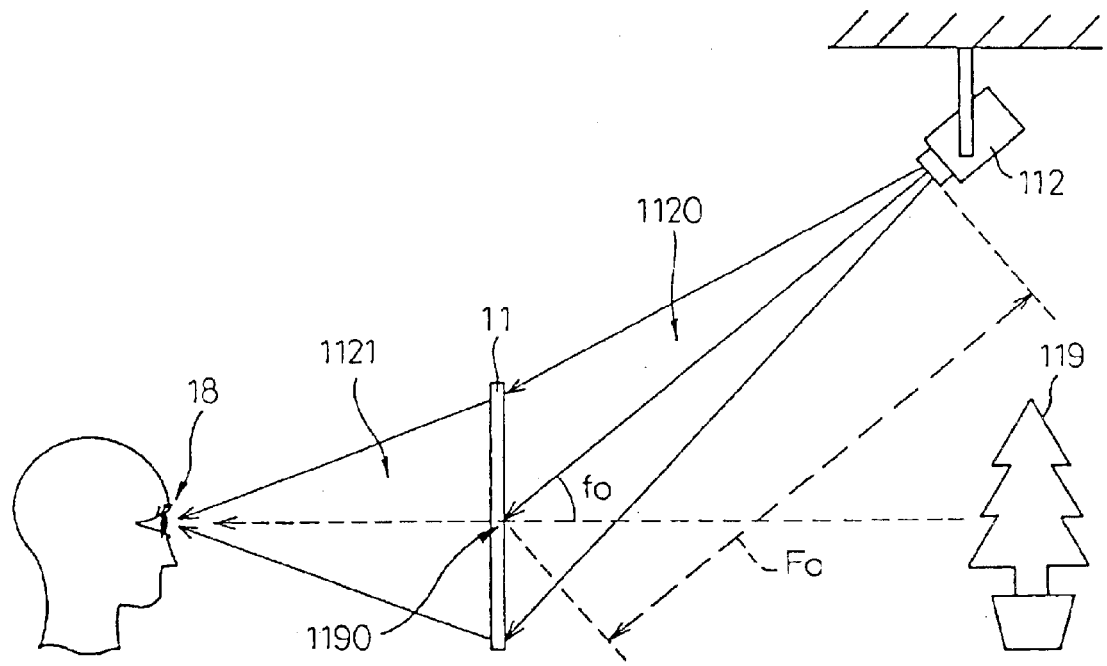
FIG. 1 is a view for explaining use state of a hologram screen according to a first embodiment of a first aspect of the present invention.

FIG. 1 is an explanatory view of the use of a hologram screen. In the drawing, an observer 18 watches a hologram screen 11, and an image projector 112 is arranged to an upper location at the back of the hologram screen 11. An image light 1120 is irradiated from the image projector 112 to the hologram screen 11. The image light 1120 is scattered and diffused by the hologram screen 11 to the observer's side so as to obtain an output light 1121. The image can be reproduced by the output light 1121.

On the other hand, it is possible to constitute the hologram screen 11 by using a transparent material. In the case of the transparent hologram screen, the observer can observe not only the image reproduced on the hologram screen 11, but also an object 119 located at the back of the hologram screen 11. As mentioned above, the hologram screen 11 can be widely utilized as a display apparatus having very good visual effect.

The hologram screen 11 can be produced by using an exposure optical system 12 shown in FIG. 10 which is explained in detail below. Briefly, a laser oscillator 1210 generates a laser beam, and the laser beam is splitted by a beam splitter 1211. One light 1212 is irradiated to a light diffusing body 1216 through an object tens 1222 and a parabolic mirror 1214. The diffusion light from the light diffusing body 1216 is used as an object light 1217. On the other hand, the other light 1213 from the beam splitter 1211 is used as a reference light 1218 through an object lens 1221.

The object light 1217 and the reference light 1218 are irradiated on a photosensitive material 1220 so that an interference fringe formed by these lights 1217 and 1218 is recorded on the photosensitive material 1220. As a result, the light diffusing body 1216 is recorded on the photosensitive material 1220. When the image light 1120 (see FIG. 1) is irradiated, the light diffusing body 1216 is reproduced. Then, the diffusing light is output from the light diffusing body 1216, and at the same time, the image light 1120 is diffracted and scattered on the hologram screen 11 so that it is possible to reproduce the image on the hologram screen 11.

Figure 10:
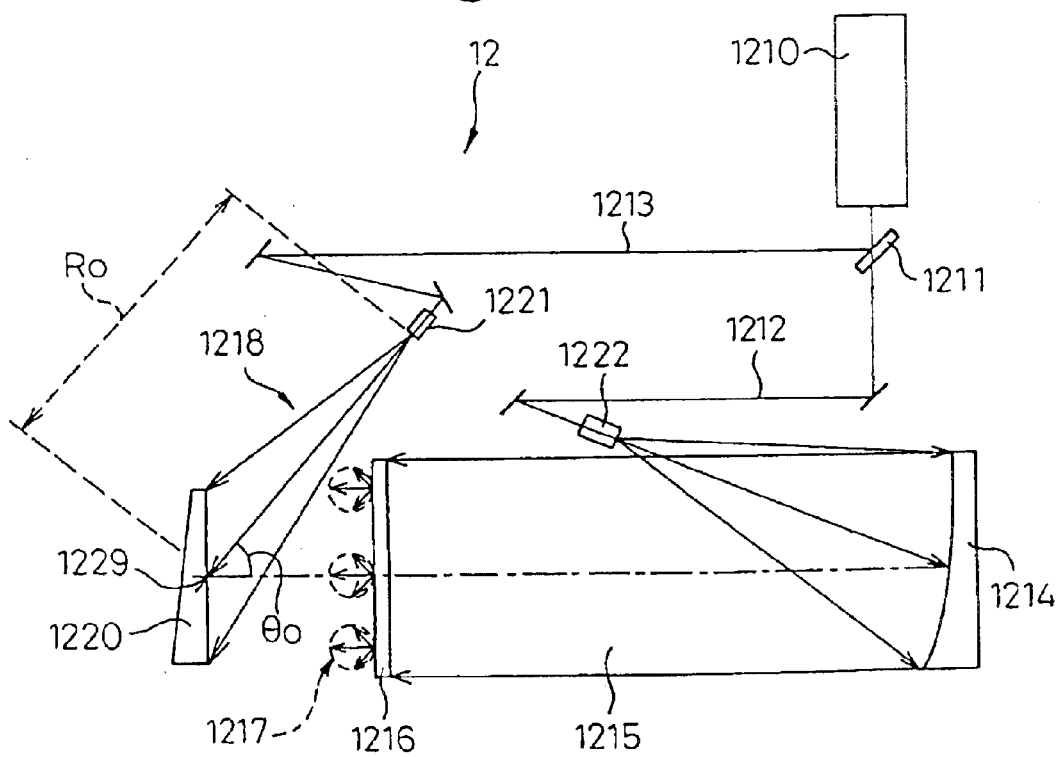
FIG. 10 is an explanatory view for an exposure optical system according to a third embodiment in the first aspect of the present invention.

In the exposure optical system 2 in FIG. 10, an incident angle $\theta_0$ of the reference light 1218 to a center 1229 of the photosensitive material 1220 and an incident distance $R_0$ of the reference material 1220 are approximately equal to an incident angle $f_0$ of the image light 1120 to the hologram screen 11 and an incident distance $F_0$ of the image light 1120 in FIG. 1.

However, when the image is reproduced by the conventional hologram screen, for example, although approximately the same color tone as the image light can be obtained at the center of the hologram screen, the color tone becomes more blue than the image light at the upper portion of the hologram screen, and becomes more yellow than the image light at the lower portion of the hologram screen (see COMPARING SAMPLE C1 in the third embodiment). That is, in the conventional art, it is impossible to reproduce uniformly the color of the image light on all areas of the hologram screen. That is, there is a problem in which an unnatural image which gives large feeling of difference to the observer is reproduced in the conventional art.

Accordingly, the first invention aims to provide a hologram screen which can eliminate unevenness of color on the reproduced image, and a producing method of the hologram screen as explained in detail below.

Explanations of the First Aspect of the Present Invention

According to the invention defined in claim 1, in the hologram screen for reproducing the image based on the output light by scattering and diffusing the image light which is irradiated from the image projector, when a white light is projected on the hologram screen as the image light, and when a value on the CIE 1976 chromaticity coordinate (u', v') is ($u'_A$, $v'_A$) and ($u'_B$, $v'_B$) at optional two points A and B having the distance of 20 cm or less between two points on the hologram screen, the hologram screen is characterized in that the output light which is output perpendicularly from the surface of the hologram screen has color distribution in which the color difference $\Delta u'v'$ between two points A and B and delivered from the following formula (1) becomes 0.06 or less.

where, the formula (1) is expressed by, $$\Delta u'v' = [(u'_A - u'_B)^2 + (v'_A - v'_B)^2]^{1/2} \quad (1)$$

Figure 2:
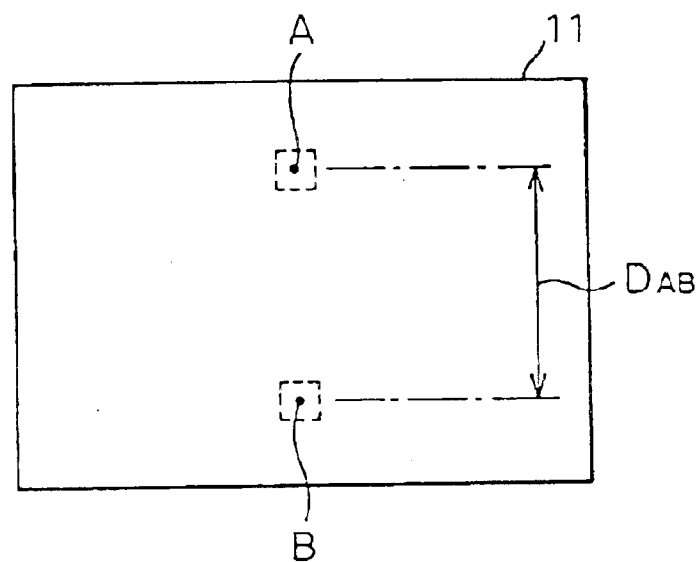
FIG. 2 is a view for explaining optional two points A and B on the surface of the hologram screen shown in FIG. 1.

As mentioned above, A and B are optional two points on the surface of the hologram (i.e., the side in which the output light is output), and the distance between two points is 20 cm or less (see FIG. 2). The color difference at two points can be obtained from the chromaticity coordinate at two points. When the color difference is larger than 0.6, unevenness of color may occur on the reproduced image. Further, it is preferable that the color difference is nearly zero. That is, when the color difference is brought near to zero, it is possible to almost eliminate unevenness of color of the image. In this case, the CIE 1976 chromaticity coordinate (u', v') indicates a value on an orthogonal coordinate of u' and v' which is obtained from the UCS chromaticity coordinate defined by the CIE.

The operation of the first aspect of the present invention will be explained below.

The important point in the first aspect of the present invention lies in that the output light has the color distribution in which the color difference $\Delta u'v'$ between optional two points A and B having the distance of 20 cm or less becomes 0.06 or less. The maximum color difference of the output light is 0.06 in the present invention, and the difference of the color between the output lights irradiated from each portion is small. Accordingly, the output light from any position on the hologram screen has an approximately uniform color tone so that it is possible to obtain the output light in which the color of the image light is considered. As a result, it is possible to prevent unevenness of color on the hologram screen, such as a blue portion at the upper on the screen and a yellow portion at the lower on the screen, when reproducing the image.

The hologram screen of the first aspect of the present invention can reproduce the color of the image light irradiated on the screen, and it is possible to reproduce the image having no feeling of difference for the observer. Accordingly, the hologram screen according to the first aspect of the present invention can be widely utilized as the screen of various image display apparatus. Further, since it is easy to constitute the hologram screen by using the transparent material, the present invention can be utilized as a display apparatus for displaying both image on the hologram screen and image transmitted from the back. Further, when the image is not displayed on the hologram screen, it is possible to utilize a screen in which the view field is not cut off (i.e., the view field can see through the hologram screen because of the transparent material).

The hologram screen according to the first invention can be utilized as a screen for advertisement provided for various show windows or a screen for navigation system provided in a vehicle, etc. Further, as the image projecting apparatus 112, it is possible to utilize various projectors and liquid crystal projectors. Still further, as the image light, it is possible to utilize various advertisements and environmental images without kinds of images. Still further, regarding the color difference, it is preferable to satisfy the color difference not only in the case of the front of the hologram screen (see FIG. 3), but also in the cases of upper, lower, left and right directions of the hologram screen.

According to the invention defined in claim 2, the hologram screen is characterized in that the output light output from the surface of the hologram screen to a viewpoint provided based on the following formula (2) has color distribution in which the color difference $\Delta u'v'$ between two points A and B and delivered from the above formula (1) becomes 0.1 or less.

where, the formula (2) is expressed by, $$H/2L = 0.1 \quad (2)$$

In this case, L is the distance between the viewpoint and the center of the hologram screen, and H is a height of the hologram screen itself.

When the color difference is larger than 0.1, unevenness of color may occur on the reproduced image. Further, it is preferable that the color difference is nearly zero. That is, when the color difference is brought near to zero, it is possible to almost eliminate unevenness of color of the image. The maximum color difference of the output light toward the viewpoint determined based on the formula (2) is 0.1, and the difference of the color between each output lights is small. Accordingly, when the image light has a single color, the output light generated from any portion on the hologram screen has approximately the same color tone each other. As a result, it is possible to obtain the output light in which the color of the image light is reflected. As mentioned above, as a result, it is possible to prevent unevenness of color on the hologram screen, such as a blue portion at the upper on the screen and yellow portion at the lower on the screen, when reproducing the image.

According to the invention defined in claim 3, it is preferable that, as the spectral characteristic of the output light which is output perpendicularly from the surface of the hologram screen, either the difference in peak wavelengths at all areas of the hologram screen is 120 nm or less, or the difference in half bandwidth is 100 nm or less.

When the difference in the peak wavelength is larger than 120 nm, the output light from the hologram screen is constituted by the light having more wide range of the wavelength. As a result, the difference of the color on the hologram screen become large so that unevenness of color easily occurs in the reproduced image. Further, it is preferable that the difference in the peak wavelength is nearly zero.

When the half bandwidth is larger than 100 nm, the wavelength distribution of the output light from the hologram screen becomes narrow, and the wavelength distribution from another portion becomes wide. That is, the output light from the hologram screen is constituted by the light having more wide range of the wavelength so that the difference in the color becomes large and unevenness of color easily occurs in the reproduced image. Further, it is preferable that the difference in the half bandwidth is nearly zero.

In the above explanation, the description "the difference in peak wavelengths at all areas of the hologram screen is 120 nm or less" means that, when collecting the spectral characteristics of the output light from the hologram screen, the difference in the peak wavelength between one spectral characteristic having longest peak wavelength and another spectral characteristic having shortest peak wavelength is 120 nm.

Regarding the half bandwidth, the description "the difference in half bandwidth is 100 nm or less" means that the difference in half bandwidth between one spectral characteristic having the most wide half band and another spectral characteristic having the most narrow half band is 100 nm.

According to the invention defined in claim 4, in the exposure optical system using the object light and the reference light, the object light being the diffusion light obtained by using the light diffusion body and the reference light being a non-diffusion light, the hologram screen defined in claim 1 or 2 is produced by irradiating the object light and the reference light onto the photosensitive material in order to expose the photosensitive material.

Figure 11:
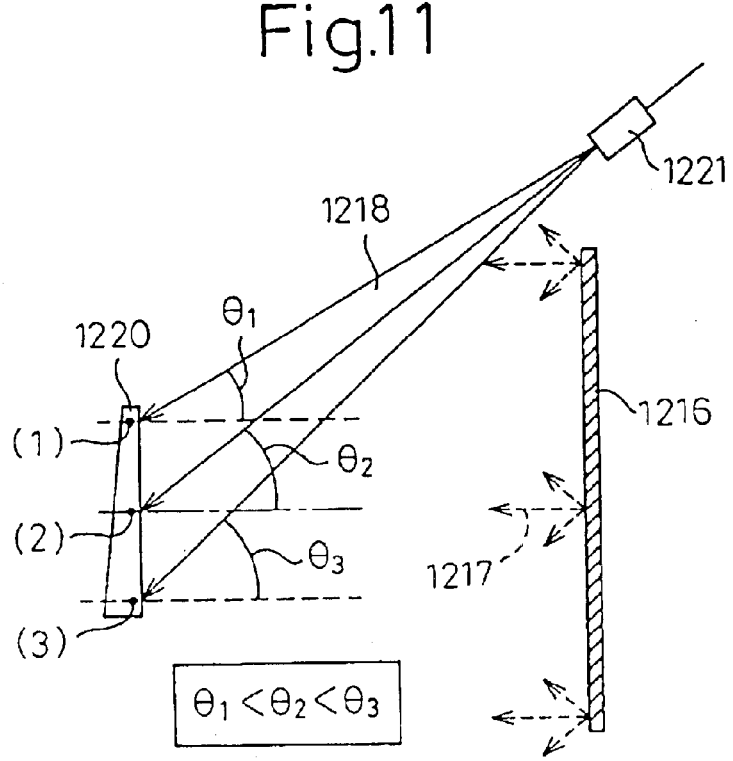
FIG. 11 is an explanatory view for an essential parts of the exposure optical system in the third embodiment.

At that time, a method of producing the hologram screen according to the present invention is characterized in that the photosensitive material having a thickness distribution which is inclined to the incident direction of the reference light (see 1220 in FIG. 11). This means that the thickness of the photosensitive material is different between the upper portion and the lower portion. In this case, the incident direction of the reference light is indicated by the directions (1), (2) and (3) in FIG. 11.

In this case, there is a known fact that the half bandwidth becomes wider in the spectral characteristic of the hologram screen made by the thin photosensitive material, and the spectral characteristic becomes broader. This is obvious from the following logical formula for defining the half bandwidth.

$$\Delta\lambda = \lambda_0^2/[T(n-(n^2-\sin^2\theta_r)^{1/2})] \qquad (3)$$

where, $\Delta\lambda$ is a half bandwidth, $\lambda_0$ is a recorded wavelength, T is a thickness of the photosensitive material, n is a refractive index of the photosensitive material, and $\theta_r$ is an incident angle of the reference light.

Figure 14:
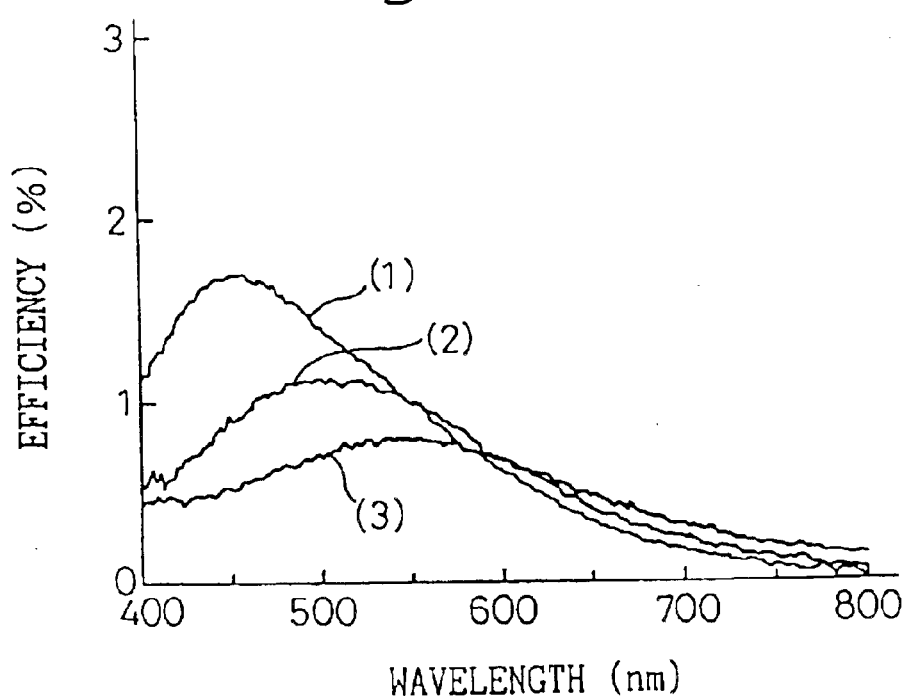
FIG. 14 is a graph for explaining the spectral characteristic of the hologram screen for the comparing sample 1 in the third embodiment.

The spectral characteristic of the hologram screen made by the photosensitive material having the uniform thickness in a conventional art is shown in FIG. 14. In this spectral characteristic, the half bandwidth becomes broader in order of (1)→(2)→(3). For example, when putting all spectral characteristics into the spectral characteristic (2), the photosensitive material for the spectral characteristic (1) having a narrow half bandwidth is thinned, and the photosensitive material for the spectral characteristic (3) having a broad half bandwidth is thickened.

As mentioned above, it is possible to obtain the hologram screen having the uniform spectral characteristic by providing the photosensitive material having the different thickness between the upper portion and the lower portion.

In this case, the difference in the color of the output light from each portion of the hologram becomes small so that it is possible to obtain the output light having almost the same color tone.

As is obvious from the above, according to the invention defined in claim 4, as well as the invention defined in claims 1 and 2, it is possible to provide a producing method of the hologram screen having no unevenness of color in the reproduced image. Further, the present invention has the same effect as the above, for not only the incident direction of the reference light, but also an orthogonal direction, i.e., the right and left directions when reproducing the image on the hologram screen.

As the photosensitive material, it is possible to utilize various materials, for example, various kinds of photopolymers, a dichromated gelatin, a silver salt, etc. Further, as the light diffusion body, it is possible to utilize any kinds of materials, for example, a ground glass, an opal glass, etc.

Next, according to the invention defined in claim 5, as the photosensitive material, it is preferable to use the material in which the larger the incident angle of the reference light, the larger the thickness distribution.

As shown in FIG. 11, the incident angle θ of the reference light 1218 in the exposure optical system becomes small at the location near to a divergence point 1221 of the reference light, and becomes large at the location apart from the divergence point 1221. That is, the incident angle $\theta_1$ is the smallest, and the incident angle $\theta_3$ is the largest, as shown in the drawing. Accordingly, in the method defined in claim 5, the photosensitive material having the thickness which becomes gradually thick from the location near to the divergence point to the location apart from the divergence point, is used as the hologram screen.

When the half bandwidth of the spectrum characteristic of the output light from the hologram screen is widened, the wavelength distribution of the output light can be broadened so that it is possible to increase reappearance of the color of the image light. Further, it is possible to avoid reduction of the reappearance of the color of the image light caused by the difference of the peak wavelength in the spectrum characteristic.

As mentioned above, when the thickness of the photosensitive material becomes thin, the spectral characteristic of the output light becomes broad. That is, selectivity of the wavelength for the incident light becomes small so that it is possible to diffract the broader wavelength (i.e., the half bandwidth becomes broad.). However, since the number of the interference fringe which can record is reduced in the case of the thin photosensitive material, the hologram screen having low effectivity is obtained.

On the other hand, when the thickness of the photosensitive material becomes thick, the selectivity of the wavelength becomes large (i.e., the half bandwidth becomes narrow.). However, since the number of the interference fringe which can record is increased in the photosensitive material, the hologram screen having high effectivity can be obtained. Accordingly, by providing the thickness distribution having different thickness at the upper portion and the lower portion, it is possible to arrange all spectrum distributions of the hologram screen, and to match the whole efficiency of the hologram screen. In this case, the difference of the color of the output light from each portion of the hologram screen becomes small so that it is possible to obtain the output light having almost the same color tone.

According to the invention defined claim 6, it is preferable that the thickness distribution of the photosensitive material is given by $\Delta T \leq 0.5 T_0$, where, $\Delta T$ is a difference in thickness between the upper end and the lower end in the photosensitive material. According to this conditions, it is possible to ensure the effect of the present invention. If the $\Delta T$ is larger than $0.5 T_0$, the range of the thickness distribution of the hologram screen becomes too wide so that it may be very difficult to obtain the effect of reduction of unevenness of color.

It is preferable that an inclined degree k of the thickness of the photosensitive material is given by $0 \leq k \leq 2 \times 10^{-5}$. Where, the inclined degree k is given by a value when a primary approximation is executed to the thickness distribution of the photosensitive material. When the inclined degree "k" of the thickness becomes larger than $10^{-5}$, an amount of shift of the peak wavelength in the spectrum distribution of the output light becomes too large so that the difference occurs in the color of the output light and the improved effect of unevenness of color may be reduced.

According to the invention defined in claim 7, it is preferable to establish the following formula (4) in the thickness distribution, i.e., $$T=a(R_0-R)+T_0, \ a=b \cdot \theta_0^{-0.9} \tag{4}$$

where, T is the thickness at optional location of the photosensitive material, $T_0$ is the thickness at a center of the photosensitive material, R is an incident distance of the reference light at optional location of the photosensitive material, $R_0$ is the incident distance of the reference light at the center of the photosensitive material, $\theta_0$ is the incident angle of the reference light at the center of the photosensitive material, and "b" is a coefficient determined by the thickness distribution and defined as 0<b<1.

The photosensitive material having the thickness distribution satisfying the above conditions becomes linearly thin from the thick portion until the thin portion. By using the above photosensitive material, the brightness and color on the image are not changed partially, and it is possible to obtain the hologram screen in which, for example, stripe-like unevenness of color does not occur on the screen.

In the thickness distribution, even if there is unevenness in the range of 15% of the thickness $T_0$ at the center of the photosensitive material, there is no problem of the stripe-like unevenness of color.

According to the invention defined in claim 8, in the exposure optical system using the object light and the reference light, the object light being the diffusion light obtained by using the light diffusion body and the reference light being the non-diffusion light, the hologram screen defined in claim 1 or 2 is produced by irradiating the object light and the reference light onto the photosensitive material in order to expose the photosensitive material.

At that time, a method of preparing the hologram screen according to the present invention is characterized in that the photosensitive material which is previously irradiated by an ultraviolet in accordance with energy distribution inclined to the incident direction of the reference light is used as the hologram screen.

Further, there is a material which can stop polymerization action of monomer by irradiating the ultraviolet in the photosensitive material. For this material, it is possible to reduce the sensitivity by previously irradiating the ultraviolet having the intensity in which the polymerization action of the monomer is not completely stopped.

According to the invention defined in claim 9, it is preferable to satisfy the following formula (5) as the energy distribution of the ultraviolet regarding the incident distance R of the reference light at the optional location on the photosensitive material.

$$0.8E \leq Euv \leq 1.2E, \text{ and } E=0.01 \cdot (R-R_0)+E_0 \tag{5}$$

where, Euv is an amount of energy of the ultraviolet irradiated to the optional location on the photosensitive material, $R_0$ is an incident distance of the reference light at the center of the photosensitive material, and $E_0$ is an amount of energy of the ultraviolet irradiated to the center of the photosensitive material. As a result, it is possible to obtain the photosensitive material having the optimum sensitivity.

According to the invention defined in claim 10, in the exposure optical system using the object light and the reference light, the object light being the diffusion light obtained by using the light diffusion body and the reference light being the non-diffusion light, the hologram screen defined in claim 1 or 2 is produced by irradiating the object light and the reference light onto the photosensitive material in order to expose the photosensitive material.

At that time, a method of producing the hologram screen according to the present invention is characterized in that the incident distance of the reference light at the optional location of the photosensitive material is shorter than the incident distance of the image light input from the image projector when reproducing the image on the hologram screen.

The incident angle $\theta_0$ and the incident distance $R_0$ at the center of the photosensitive material when producing the hologram screen is usually set to the same value as an incident angle $f_0$ and an incident distance $F_0$ at the center of the hologram screen when irradiating the image light on the hologram screen and reproducing the image (see FIGS. 1 and 10).

In the producing method according to the present invention, the incident distance $R_0$ of the reference light is set to the distance shorter than the incident distance $F_0$ so that it is possible to set the incident angle of the reference light, except for the center of the photosensitive material, to a value different from the incident angle of the image light.

That is, the incident angle of the image light coincides with the incident angle of the reference light at the center of the photosensitive material, but, except for the center, the incident angle of the image is different from the incident angle of the reference light. At that time, the difference in distance of the above is changed in accordance with the distance from the center of the photosensitive material.

Figure 20:
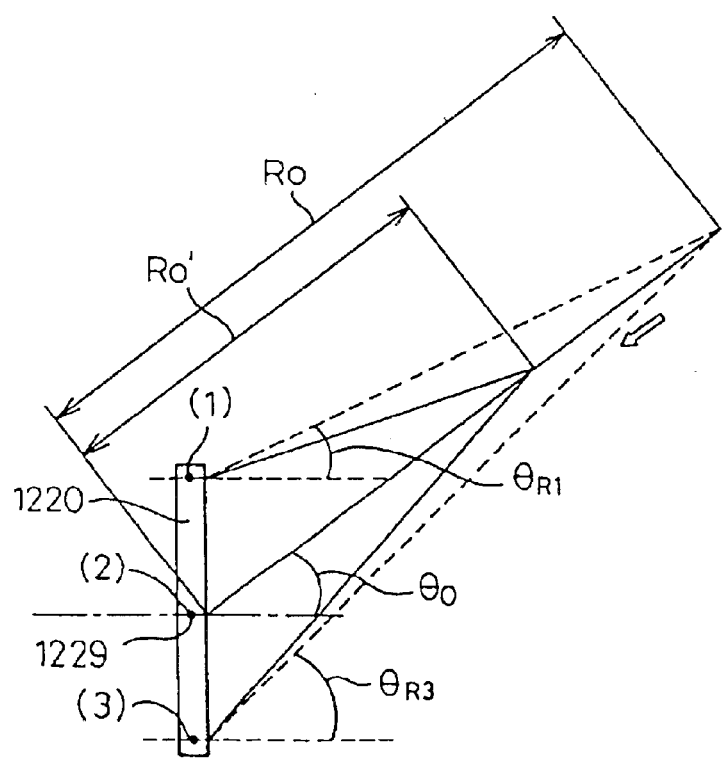
FIG. 20 is an explanatory view for reduction of irradiation distance of the reference light according to a fifth embodiment.

As shown in FIG. 20, the incident distance $R_0$ is shortened to the incident distance $R_0'$ at the center 1229 of the photosensitive material 1220. As a result, the incident angle $\theta_{R1}$, at the end (1) of the photosensitive material 1220 becomes small, and the incident angle $\theta_{R3}$ at the end (3) (a side opposite to the end (1)) of the photosensitive material 1220 becomes large.

When the incident angle of the reference light is different from the incident angle of the image light, there is known wavelength shift which is expressed by the following logical formula (6) in the spectrum characteristics of the hologram screen.

$$\sin \theta_z = \sin \theta_y + \mu(\sin \theta_x - \sin \theta_0), \text{ and}$$

$$\mu = \lambda_z/\lambda_0 \qquad (6)$$

Figure 21:
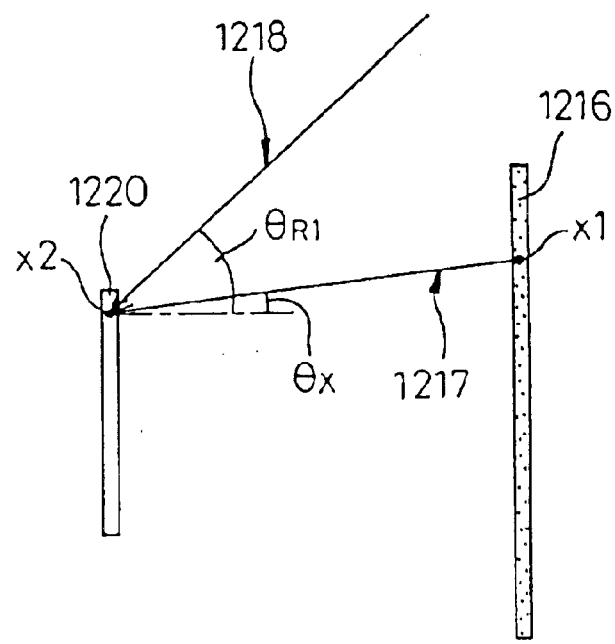
FIG. 21 is an explanatory view for an incident angle $\theta_x$ of the object light which is input from a point X1 of the light diffusion body to a point X2 of the photosensitive material.
Figure 22:
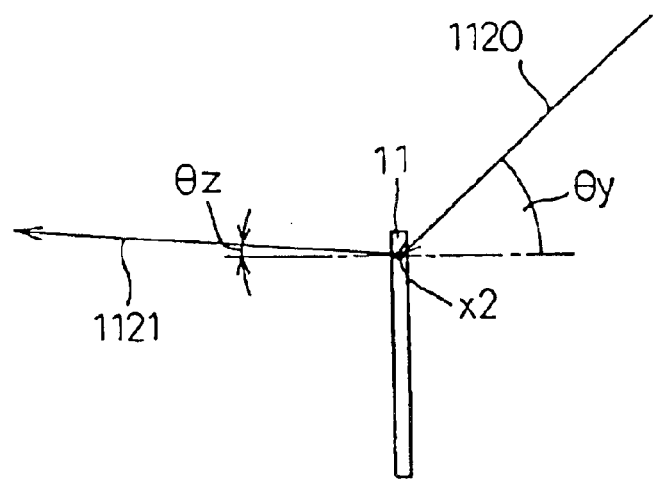
FIG. 22 is an explanatory view for the incident angle $\theta_y$ of the image light which is input to a point y on the hologram screen, and an output angle $\theta_z$ of of the output light which is diffracted y the hologram screen.

As shown in FIGS. 20 and 21, $\theta_{R1}$ is the incident angle at the end (1) of the reference light, $\theta_x$ is an incident angle of the object light input from the point X1 of the light diffusion body 1216 to the point X2 of the photosensitive material 1220, $\lambda_0$ is a wavelength of the laser used in the exposure. Further, as shown in FIG. 22, $\theta y$ is an incident angle of the image light input to the point X2 of the hologram screen 11, $\theta_z$ is an angle of the output light 1121 diffracted by the hologram screen and output toward the direction of the arrow, and $\lambda_z$ is wavelength of the output light 1121.

From the above formula (6), the following formula can be obtained.

$$\lambda_z = \lambda_0[(\sin \theta_z - \sin \theta_y)/(\sin \theta_x - \sin \theta_{R1})]$$

As is obvious from the above formula, when the incident angle $\theta_{R1}$ of the reference light is smaller than the incident angle $\theta$ of the image light, the output light is shifted to a side of the long wavelength. On the other hand, when the incident angle $\theta_{R1}$ is larger than the incident angle $\theta_y$, the output light is shifted to the side of the short wavelength.

As the hologram screen in which the incident angle of the reference light is equal to the incident angle of the image light, there is a comparing sample C1 explained in the third embodiment. The spectral characteristic of this sample is shown in FIG. 14. If the spectral characteristic of this hologram screen is arranged to the spectral characteristic of the curve (2), the spectral characteristic of the curve (1) is shifted to the side of the long wavelength and the spectral characteristic of the curve (3) is shifted to the side of the short wavelength.

That is, the incident angle of the reference angle is set to the angle smaller than the incident angle of the image light in the spectral characteristic (1), and the incident angle of the reference angle is set to the angle larger than the incident angle of the image light in the spectral characteristic (3). This can be realized by shortening the incident distance of the reference light than the incident distance of the image light. In this case, the incident angle of the reference light is maintained to the same value of the incident angle of the image light at the center of the photosensitive material.

As a result, since the spectral characteristic of the hologram screen can be arranged in the whole, the difference of color of the output light from each portion of the hologram screen becomes small, and it is possible to obtain the output light having approximately the same color tone.

According to the invention defined in claim 11, in the exposure optical system using the object light and the reference light, the object light being the diffusion light obtained by using the light diffusion body and the reference light being the non-diffusion light, the hologram screen defined in claim 1 or 2 is produced by irradiating the object light and the reference light onto the photosensitive material in order to expose the photosensitive material.

At that time, a method of producing the hologram screen according to the present invention is characterized in that an intensity ratio $I_R/I_O$ of the reference light and the object light has the following relationship is given by the following formula, i.e., $I_R/I_O \leq 10$, where, $I_R$ is the intensity of the reference light, and $I_O$ is the intensity of the object light.

In this embodiment, the ratio $I_R/I_O$ is 10 or less. When the intensity ratio $I_R/I_O$ becomes large, the intensity of the object light becomes very weak. As a result, the dispersion of the spectral characteristic, which is caused by the dispersion of the intensity of the object light due to the location on the photosensitive material, is easy to occur on the hologram screen. That is, the difference of the spectral characteristic due to the intensity of the object light becomes large.

When the intensity of the object light becomes large, the spectral characteristic becomes approximately constant so that the smaller the ratio $I_R/I_O$, the smaller the difference of the spectral characteristic. As a result, it is possible to arrange the spectral characteristic in the whole of the hologram screen. Further, the difference of color of the output light from each portion of the hologram screen becomes small so that it is possible to obtain the output light having approximately the same color tone.

According to the invention defined in claim 12, in the exposure optical system using the object light and the reference light, the object light being the diffusion light obtained by using the light diffusion body and the reference light being the non-diffusion light, the hologram screen defined in claim 1 or 2 is produced by irradiating the object light and the reference light onto the photosensitive material in order to expose the photosensitive material.

At that time, a method of producing the hologram screen according to the present invention is characterized by at least two sets of the following features (A) to (D), i.e., (A): to use the photosensitive material having the thickness distribution inclined to the incident direction of the reference light, (B): to use the photosensitive material which is previously irradiated by the ultraviolet in accordance with the energy distribution inclined to the incident direction of the reference light, (C): to determine the incident distance of the reference light at the optional location on the photosensitive material so as to become shorter than the incident distance of the image light input from the image projector when reproducing the image on the hologram screen, and (D): to have the relationship of the ratio $I_R/I_O \leq 10$ in the intensity of the reference light and the object light in the whole of the surface of the photosensitive material.

According to the features (A) to (D), it is possible to obtain the hologram screen having the arranged spectral characteristic. As mentioned above, by performing at least two sets of features (A) to (D), it is possible to make the difference of color eye small, and to satisfy the desired hologram characteristic, although it is very difficult to realize small difference of color in the case of any one feature from (A) to (D) depending on the desired hologram characteristic (for example, a view angle, a brightness of an image to be reproduced, etc.).

Explanations of Preferred Embodiments of the First Aspect of the Present Invention (First Embodiment)

The first embodiment will be explained in detail with reference to FIGS. 1 to 7.

As shown in FIG. 1, the hologram screen 11 reproduces the image based on the output light 1121 obtained by scattering and diffusing the image light 1120 irradiated from the image projector 112. As explained above, when the white light is projected on the hologram screen 11 as the image light, and when a value on the CIE 1976 chromaticity coordinate (u', v') is ($u'_A$, $v'_A$) and ($u'_B$, $v'_B$) at optional two points A and B having the distance $D_{AB}$ of 20 cm or less between two points A and B on the hologram screen, as shown in FIG. 2, the output light 1121 output perpendicularly from the surface of the hologram screen has color distribution in which the color difference Δu'v' between two points A and B and delivered from the above formula (1) becomes 0.06 or less.

Next, one example in use of the hologram screen will be explained below. As shown in FIG. 1, the image projector 112 is provided at the upper back of the hologram screen 11 for the observer 18 who observes the hologram screen 11. The image light 1120 is irradiated from the image projector 112 to the hologram screen 11. As a result, the image light 1120 is scattered and diffused by the hologram screen 11 to the side of the observer 18 so that the output light 1121 is obtained and the image can be reproduced by the output light 1121. Further, the incident distance of the image light is expressed by $F_0$, and the incident angle of the image light is expressed by $f_0$.

Further, it is possible to prepare the hologram screen 11 by using the transparent material. In this case, the observer 18 can observe not only the image reproduced by the hologram screen 11, but also the object 119 at the back of the hologram screen 11. The hologram screen 11 in FIG. 1 is a transmission type, but it is possible to use a reflection type. When the reflection type is used, the image projector 112 is provided to the same side as the observer 18.

The hologram screen according to the first embodiment was tested in accordance with the following processes.

First, the hologram screen 11 having a size of 300 nm×400 nm was prepared. In this case, as shown in FIG. 2, in optional two square areas A and B (both 30 mm×30 mm, each point A and B denotes a center of the square area) on the hologram screen 11, and the maximum color difference Δu'v' between the points A and B is 0.01 to 0.08.

The color difference Δu'v' was measured in accordance with the following steps.

Figure 3:
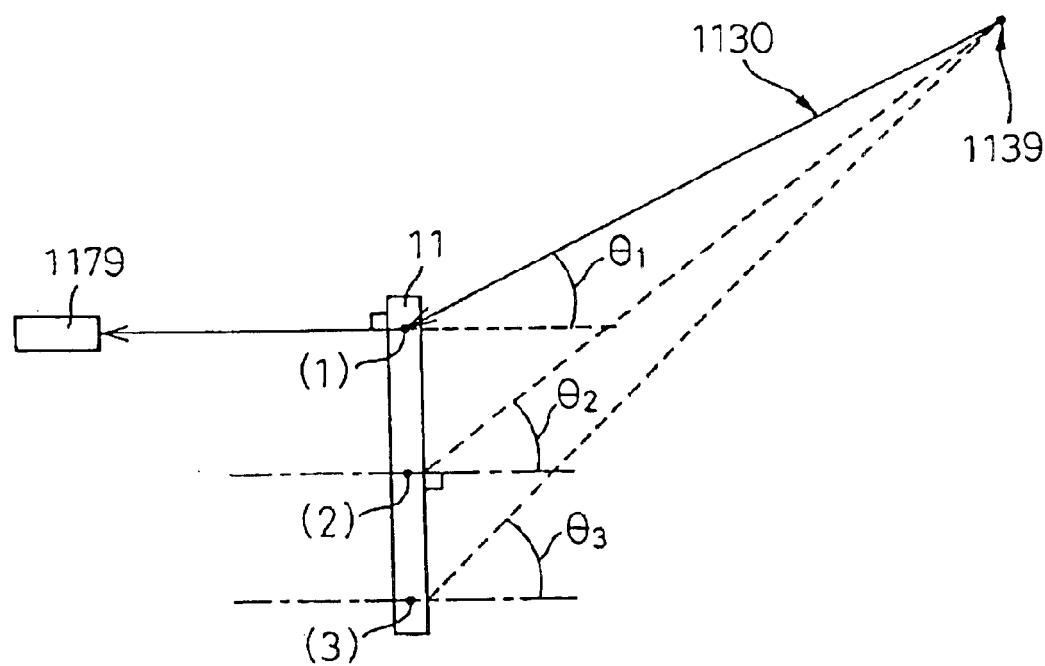
FIG. 3 is an explanatory view for checking a spectral characteristic of an output light which is output perpendicularly from each of points (1) to (3) on the hologram screen in the first embodiment.

As shown in FIG. 3, the white light 1130 is irradiated to the hologram screen 11. In the output light diffracted by each point (1), (2) and (3) on the hologram screen 11, in particular, the spectrum characteristic of the output light, which is irradiated perpendicularly to the surface of of the hologram screen 11 at the output side, was measured by a light receiving device 1179. In this case, a point 1139 is the location of the projector of the white light 1130.

Further, as shown in FIG. 1, the image is reproduced by irradiating the image light 1120 onto the hologram screen 11. In this case, the incident angle of the reference light to the hologram screen 11 is equal to the incident angle of the white light 1130 to the hologram screen 11 shown in FIG. 3.

Next, how to obtain the color difference Δu'v' using the spectral characteristic is explained below. In this case, the CIE 1976 chromaticity coordinate (u', v') is used in the following steps.

The chromaticity coordinate u' is expressed below, i.e., $$u'=4X/(X+15Y+3Z) \quad (7)$$

Figures 4, 5:
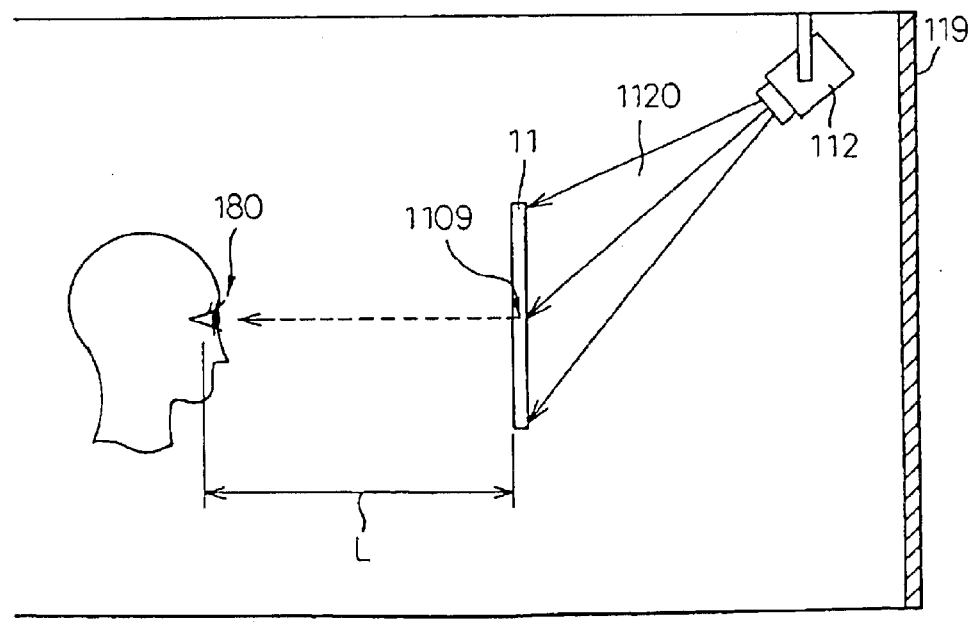
FIG. 4 is a view for explaining a formula which derives X in the first embodiment.
FIG. 5 is an explanatory view for checking unevenness of color in the first embodiment.

In the above formula, for example, X can be obtained from the formula shown in FIG. 4. Y and Z can be obtained similarly from the formula shown in FIG. 4. In this case, S(λ) was used as the spectral characteristic of the light after the white light of a liquid crystal projector has passed through the liquid crystal. This is because it is possible to perform evaluation of color of the image displayed on the hologram screen 11, as well as evaluation of unevenness of color, when the S(λ) is used as the spectral characteristic of the light having the same light source as that of the image projector actually used. Further, τ(λ) denotes a spectral transmission rate and it was used as the spectrum characteristic of the hologram screen obtained by measurement in FIG. 3.

As a result of the above measurement, next test was performed using the hologram screen having the maximum color difference of 0.01 to 0.08. In this case, although the color difference can be obtained from the spectral characteristic, it is possible to obtain the color difference by directly measuring the chromaticity using a calorimeter.

As shown in FIG. 5, the liquid projector was used as the image projector 112, and the white light was used as the image light 1120. Further, many observers, for example, twenty observers, observed the image during ten minutes at the location two meters apart from the center 1109 of the hologram screen 11.

Figure 6:
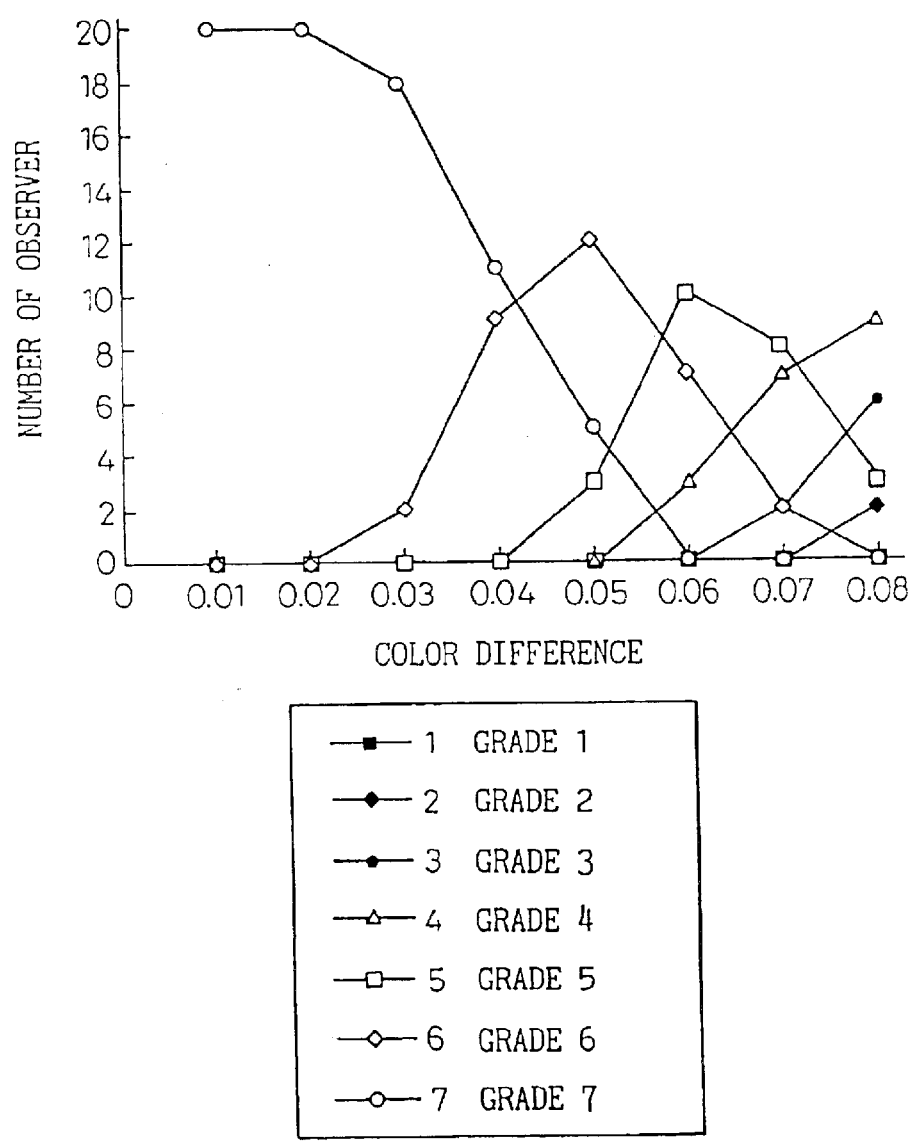
FIG. 6 is a graph for explaining a result of test of unevenness of color in the first embodiment.

A result of observation is shown in FIG. 6. The image was evaluated by twenty observers in accordance with a subjective evaluation grade having seven grades 1 to 7 (see 1 to 7 in FIG. 6). In this case, ten minutes is required for getting good condition for eye and correctly recognizing presence or absence of unevenness of color. The measurement was performed within a room, and no lamp was provided in the room. The brightness of the white color to be projected was 300 cd/m². A frosted black wall 119 was provided at the back of the hologram screen 11.

As shown in FIG. 6, for the hologram screen having the maximum color difference of 0.05 or less, all observers do not clearly recognize unevenness of color (see levels 5 to 7). When the color difference is 0.06, some observers can recognize unevenness of color, but they evaluate this unevenness of color as an ambiguous feeling, i.e., "do mind" or "don't mind" (see level 4).

In this test, no lamp is provided and the background light is the black which is very close to zero. When the illuminance within the room is 500 Lux (this is an average illuminance in offices), and when the white wall paper is used at the back of the hologram, the level 4 in this test becomes the same level as the level 5 or more, i.e., the observer does not mind unevenness of color. Further, when the color difference is 0.07 or more, there is the observer who does mind unevenness of color in this test. As is obvious from the above, when the color difference is 0.06 or less, it is obvious that the observer does not mind unevenness of color of the image on the hologram screen.

Next, the effect of the first embodiment will be explained below. As mentioned above, the output light has color distribution in which the color difference Δu'v' between points A and B is 0.06 or less. That is, since the difference of color is small, the output light from any location on the hologram screen has the same color tone each other, if the incident light is the mono-chrome. That is, there is no phenomenon from which color at a part of the hologram screen are different. As a result, as shown in FIG. 6, there is no occurrence of unevenness of color on the hologram screen.

The spectral characteristic was checked for the hologram screen having the color difference 0.06. In this case, when the half bandwidth is the same, the difference of the peak wavelength corresponds to approximately 120 nm. On the other hand, when the peak wavelength is the same, the difference of the half bandwidth corresponds to approximately 100 nm. As is obvious from the above when the color difference on the hologram screen is not measured, the conditions for the color difference can be satisfied if the spectral characteristic is smaller than the above difference.

Figure 7:
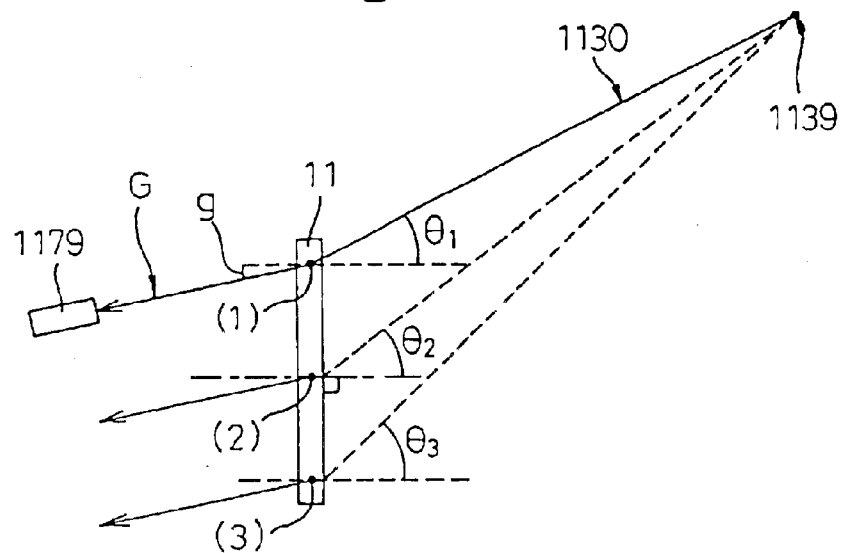
FIG. 7 is an explanatory view for checking the spectral characteristic of the output light which is output downward with an angle "g" from each of points (1) to (3) on the hologram screen in the first embodiment.

As shown in FIG. 7, it is possible to measure the spectral characteristic of the output light emitted toward the direction G when the light receiving device 1179 is provided at the angle "g" for the perpendicular direction from the surface of the hologram screen 11. Even if the hologram screen has color eye distribution in which the color difference Δu'v'obtained from the above spectral characteristic becomes 0.06 or less, there is no unevenness of color on the reproduced image.

(Second Embodiment)

In the hologram screen according to the second embodiment, the output light, which is emitted toward the viewpoint, has the color distribution in which the color difference between two points is 0.1 or less. As well as the first embodiment, shown in FIG. 1, the image is reproduced based on the output light by scattering and diffusing the image light from the image projector. As mentioned above, the output light emitted toward the viewpoint based on the formula (2) has the color eye distribution in which the distance between two points A and B is 20 cm or less, and the color difference Δu'v' is 0.1 or less.

Figure 8:
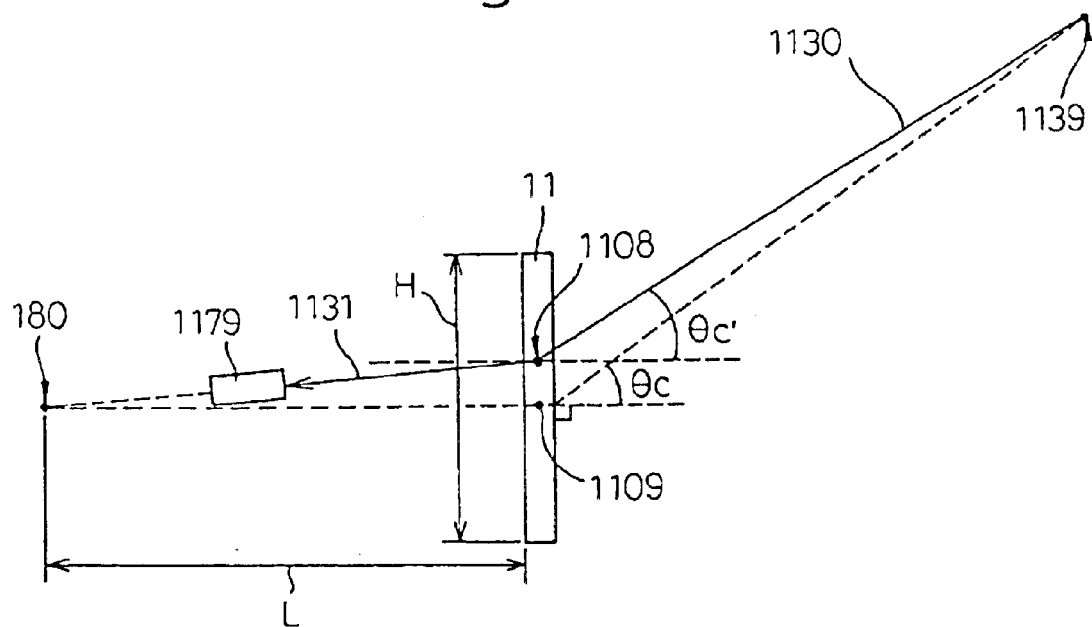
FIG. 8 is an explanatory view for checking the spectral characteristic of the output light toward the view point in the second embodiment.

As shown in FIG. 8, when the distance between the viewpoint 180 and the center 1109 of the hologram screen 11 is given by L, and when the height of the hologram screen 11 is given by H, the formula (2), i.e., H/2L=0.1, is given as mentioned above.

The measurement of the color difference will be explained in detail below. As shown in FIG. 8, the white light 1130 is irradiated on the hologram screen 11. When the white light 1130 is input by the incident angle $\theta_c$ at the center 1109 on the hologram screen 11, the white light 1130 is input by the incident angle $\theta_c$ at the point 1108, i.e., at a point except for the center 1109.

The white light 1130 is diffracted on the hologram screen 11 so that the output light 1131 can be obtained. In this case, the spectral characteristic of the output light 1131 at the location apart by the distance L from the center 1109 of the hologram screen 11 was measured. In order to measure the spectral characteristic of the output light 1131, first, the output light from the point 1108 is measured by providing the light receiving device 1179 on the line between the viewpoint 180 and the point 1108. That is, the light receiving device 1179 is inclined by the same angle as that of the line between the viewpoint 180 and the point 1108. As a result, the spectral characteristic is measured, and the color difference can be obtained by the same method as the first embodiment. In this case, the output light from the center 1109 is output perpendicularly from the surface of the hologram screen 11, as well as the first embodiment.

The color difference was re-checked based on the above method-regarding the hologram screen having the color difference 0.06 in the first embodiment. As a result, when H=300 mm, and L=2000 mm, in the structure of the hologram screen, the color difference was changed from 0.06 to 0.1 in the second embodiment.

Further, since the hologram screen having the color difference 0.06 in the first embodiment was evaluated as the level 5 or more (i.e., the observer does not mind unevenness of color), it is obvious that there is no unevenness of color on the reproduced image for the hologram screen having the color difference 0.1. Since these measuring methods can be used to measure the color difference which can be observed actually through a human eye, it is possible to perform practical evaluation.

Figure 9:
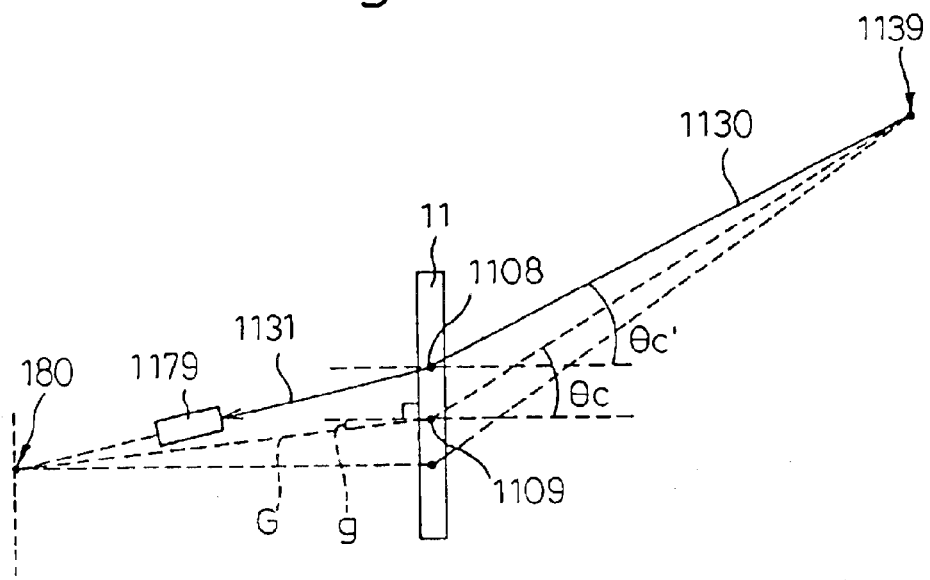
FIG. 9 is an explanatory view for checking the spectral characteristic of the output light which is output downward with the angle "g" from the perpendicular direction to the view point on the surface of the hologram screen in the second embodiment.

As shown in FIG. 9, the spectral characteristic of the output light emitted toward the direction G for the viewpoint 180 having the angle "g" is measured by using the light receiving device 1179, and the color difference can be obtained based on this measurement. Further, even if the hologram screen has the color distribution in which the color difference is 0.1 or less, there is no unevenness of color on the reproduced image.

(Third Embodiment)

As shown FIGS. 10 to 14, the explanation will be given for the hologram screen which was produced by the photosensitive material having the inclined thickness distribution below.

First, the exposure optical system in FIG. 10 is explained below. In the exposure optical system 2, the laser beam (wavelength: 14.5 nm, Ar laser beam) emitted from the laser oscillator 1210 is splitted by the beam splitter 1221 for two laser beams 1212 and 1213. The splitted beam 1212 becomes divergence light through the object lens 1222, and the divergence light is irradiated to the parabolic mirror 1214 so that it is possible to obtain the parallel light 1215. The parallel light 1215 is transmitted through the light diffusion body 1216 which is made of a ground glass so that the diffusion light can be obtained and used as the object light 1217. On the other hand, another splitted light 1213 is transmitted through the object lens 1221 so that the reference light 1218 can be obtained.

As shown in FIGS. 10 and 11, the object light 1217 and the reference light 1218 are irradiated to the photosensitive material 1220 in order to form the interference fringe. Accordingly, the interference fringe can be recorded on the photosensitive material 1220. As a result, the light diffusion body 1216 is recorded on the photosensitive material 1220. When the image light 1120 is irradiated on the hologram screen 11, the light diffusion body 1216 is reproduced, and it is possible to diffract and scatter the image light 1120 on the hologram screen 11 when the diffusion light is emitted from the light diffusion body 1216.

In this case, in the exposure optical system 2 shown in FIGS. 10 and 11, the incident angle $\theta_0$ and the incident distance $R_0$ of the reference light 1218 to the center 1229 on the photosensitive material 1220 is the same as the incident distance $F_0$ and the incident angle $f_0$ of the image light 1120 to the center 1109 on the hologram screen 11.

Figure 12:
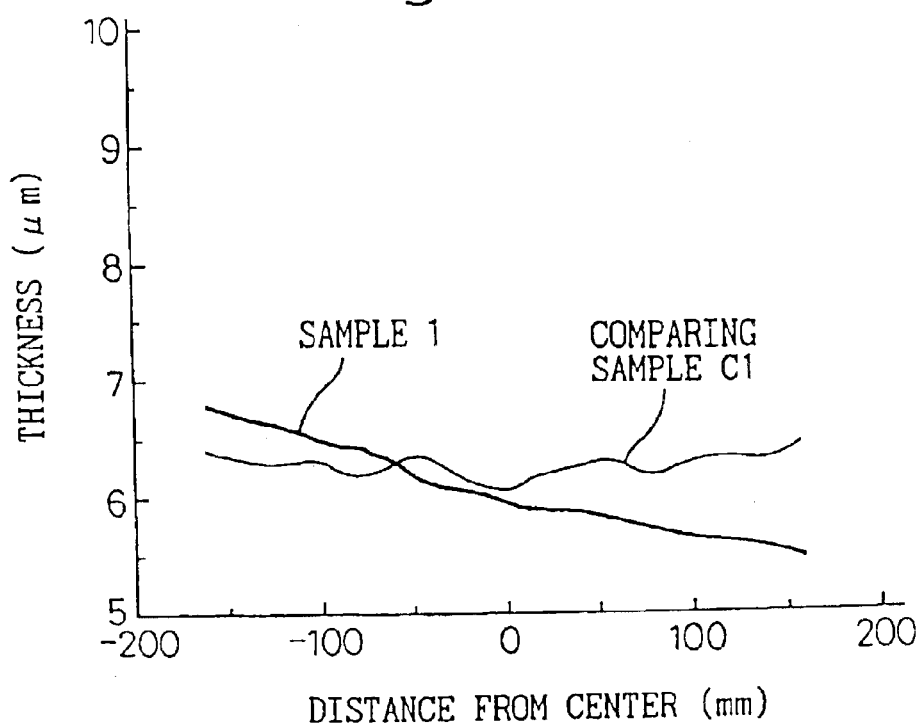
FIG. 12 is a graph for explaining thickness distribution of the photosensitive material of a sample 1 and comparing sample C1 in the third embodiment.

The hologram screen 11 was made by exposing two kinds to photosensitive materials using the exposure optical system 12. The photosensitive material of the sample 1 has the thickness distribution shown in FIG. 12. That is, the sample 1 has the inclined thickness, i.e., the thickness is different between one end and the other end of the photosensitive material. In FIG. 12, the abscissa is the distance from the center location of the photosensitive material. A minus side of the center represents an irradiation side, and a plus side represents a side opposite to the irradiation. On the other hand, in FIG. 12, the photosensitive material of the comparing sample C1 has a uniform thickness.

The sample 1 and the comparing sample C1 were provided to the exposure optical system 2 shown in FIGS. 10 and 11, and the hologram screen was made by irradiating the reference light 1218 and the object light 1217. Further, both the sample 1 and the comparing sample C1 have the size of 300 mm×400 mm, and made of a photopolymer by Dupont Co., Ltd. Further, the light diffusion body 1216 is made of a ground glass having the scattering angle of 36°, and the intensity ratio of the reference light 1118 and the object light 1117 at the center of the photosensitive material 1220 is 4 (=$I_R/I_O$). The incident angle $\theta_0$ of the reference light at the center of the photosensitive material 1220 is the same as the incident angle $f_0$ of the image light, i.e., 30°, when reproducing the image on the hologram screen (see FIG. 1).

Figure 13:
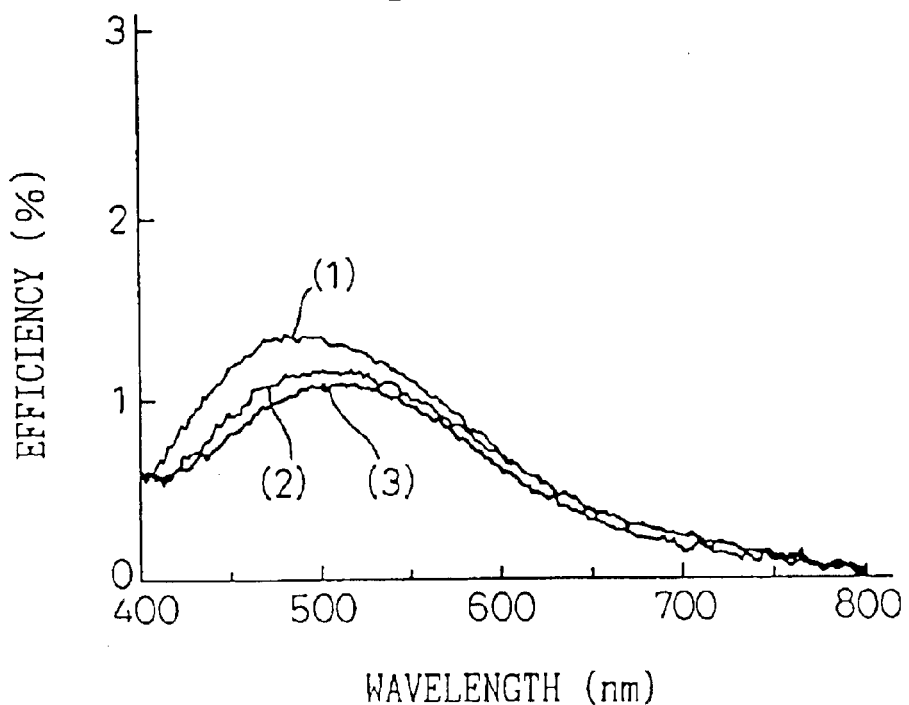
FIG. 13 is a graph for explaining the spectral characteristic of the hologram screen for the sample 1 in the third embodiment.

The measurement of the spectral characteristic of the hologram screen having the sample 1 and the comparing sample C1 is explained with reference to FIG. 3 below. As shown in FIG. 3, the white light 1130 is irradiated to the hologram screen 11. In three kinds of output lights diffracted at the points (1), (2) and (3), in particular, the spectral characteristic of the output light to the direction perpendicular to the surface at the output side on the hologram screen 11 was measured by using the light receiving device 1179. The incident angle of the white light 1130 is the same as the incident angle of the image light when reproducing the image on the hologram screen. Further, the point (2) is the center of the hologram screen 11. The spectral characteristic of the sample 1 was shown in FIG. 13, and that of the comparing sample C1 was shown in FIG. 14. As shown in FIG. 13, the sample 1 has approximately the same peak wavelength on the curves (1), (2) and (3), and these spectral characteristics are arranged each other. Further, the chromaticity coordinate u'v' was obtained in accordance with the above measurement so-that the maximum color difference became 0.015.

When the hologram screen was observed based on the same conditions as the first embodiment, unevenness of color was not almost recognized in this embodiment. As mentioned above, by using the photosensitive material having the inclined thickness distribution, it is possible to obtain the hologram screen having no unevenness of color when reproducing the image. Further, as shown in FIG. 14, in the hologram screen having the comparing sample C1, the spectral characteristic (1) has the high peak of the efficiency at the wavelength of a blue area, and the spectral characteristic (3) has the high peak at the wavelength from a green area to a yellow area. The spectral characteristic (2) has the high peak at the vicinity of intermediate efficiency of (1) and (3).

The maximum color difference was measured by using the same method as the first embodiment. As a result of measurement, the maximum color difference became 0.073. Further, the unevenness of color was tested for this hologram screen. As a result, all observers answered level 3 or more (i.e., the observer slightly do mind the unevenness of color.). As is obvious from the above, the difference in the spectral characteristic at each portion of the hologram screen is caused of unevenness of color when reproducing the image on the hologram screen.

(Fourth Embodiment)

As shown in FIGS. 15 to 19, the explanation will be given to the hologram screen which was made by the photosensitive material previously irradiated by the ultraviolet before exposure. In this case, the exposure optical system is the same as the third embodiment shown in FIG. 10. Further, the ultraviolet is irradiated on the photosensitive material so as to become gradually strong from one incident side to the other incident side as explained in detail below.

Figure 15:
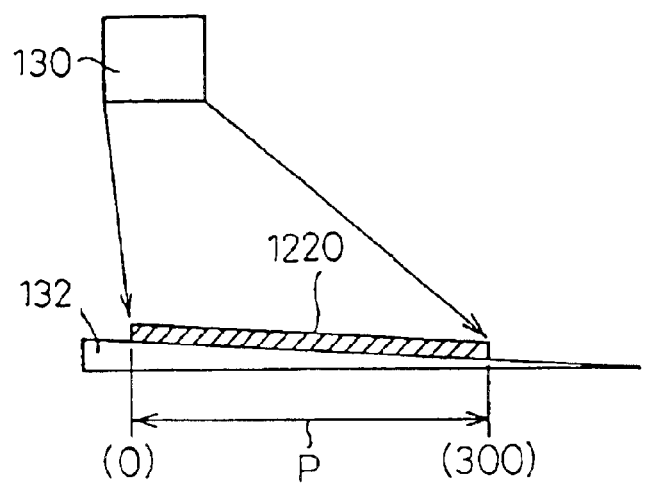
FIG. 15 is an explanatory view for irradiation of an ultraviolet to the photosensitive material according to a fourth embodiment.
Figure 16:
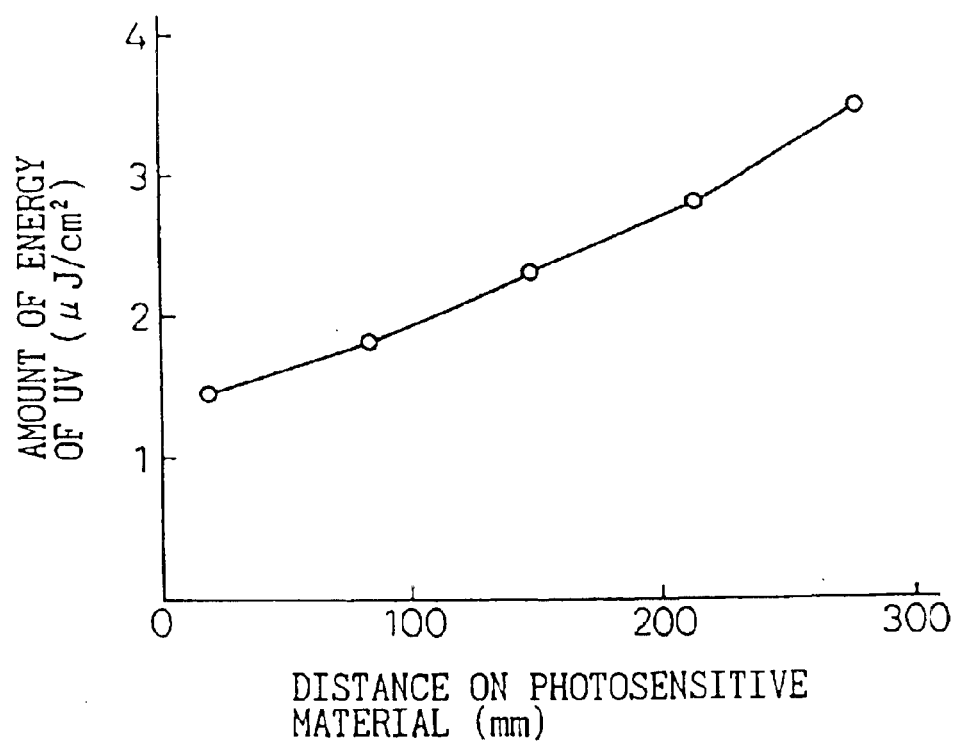
FIG. 16 is a graph for explaining an amount of the ultraviolet to the photosensitive material.

The above irradiation method of the ultraviolet will be explained in detail with reference to FIGS. 15 and 16. In FIG. 15, the photosensitive material 1220 has the size of 300 mm×400 mm, and was made of the photopolymer by Dupont Co., Ltd. The photosensitive material was provided on a slanted base 132, and an ultraviolet lamp 130 was provided to the upper location of the end of the slanted base 132 as shown in FIG. 15. The ultraviolet was irradiated to the photosensitive material 1220 in such a way that the amount of the ultraviolet has the distribution shown in FIG. 16. In this case, P shown in FIG. 15 is the distance on the photosensitive material 1220, and corresponds to the abscissa of the graph shown in FIG. 16. That is, the amount of the ultraviolet is small at one end of the photosensitive material 1220 (approximately, 1.5 $\mu j/cm^2$), and becomes large at the other end of the photosensitive material 1220 (approximately, 3.5 $\mu j/cm^2$).

Figure 17:
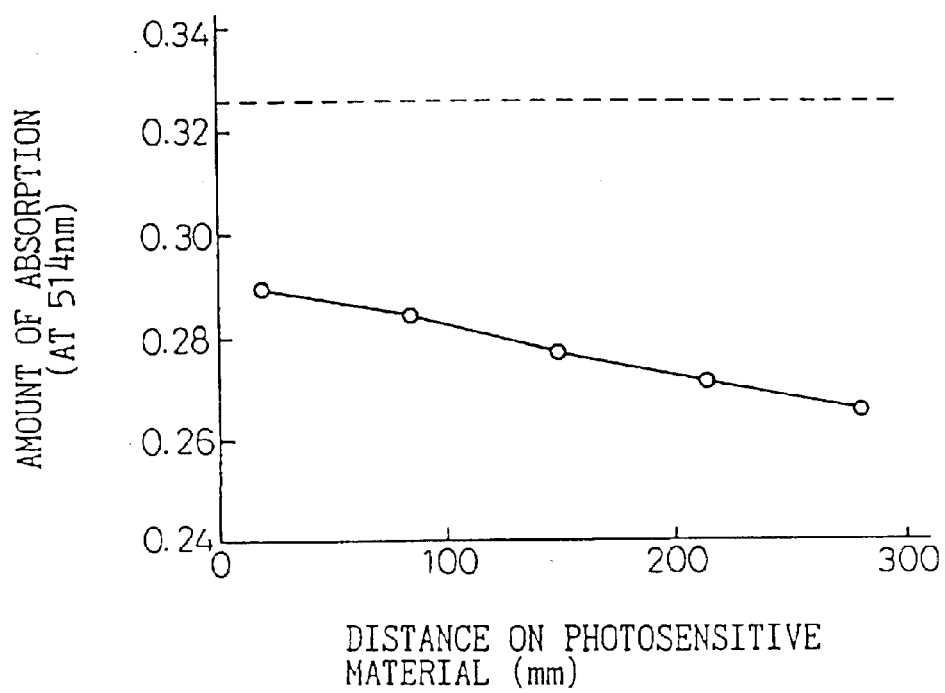
FIG. 17 is a graph for explaining an amount of absorption of the light having the wavelength of 514 nm on the photosensitive material after irradiation of the ultraviolet in the fourth embodiment.

As a result, an amount of absorption of the photosensitive material at the wavelength 414 nm was changed in accordance with the distance P as shown in FIG. 17. In FIG. 17, the dotted line represents the amount of the absorption before irradiation of the ultraviolet, and the solid line represents after irradiation. The hologram screen was made after irradiation of the ultraviolet using the exposure optical apparatus, as well as the third embodiment. In this case, various conditions were determined as follows. That is, the scattering angle of the light diffusion body is 36°, the intensity ratio of the reference light and the object light at the center of the photosensitive material is 4 (=$I_R/I_O$), and the incident angle of the reference light at the center is the same as the incident angle of the reference light, i.e., 30°, when reproducing the image on the hologram screen.

In the above conditions, the color difference between optional two points (see the first embodiment) on the hologram screen was 0.023 in maximum. Further, unevenness of color cannot be recognized when observing the hologram screen in accordance with the same conditions as the first embodiment. Further, the peak wavelength in the spectral characteristic of the hologram screen was measured at the points (1), (2) and (3) in FIG. 3. Further, when the ultraviolet is not irradiated, the spectral characteristic was also measured in order to compare irradiation with non-irradiation of the ultraviolet. As a result, in the case of the spectral characteristic (1), the wavelength 460 nm (in the case of non-irradiation) was 462 nm (in the case of irradiation). In the case of the spectral characteristic (2), the wavelength 510 nm (in the case of non-irradiation) was 480 nm (in the case of irradiation). In the case of the spectral characteristic (3), the wavelength 510 nm (in the case of non-irradiation) was 488 nm (in the case of irradiation).

Figure 18:
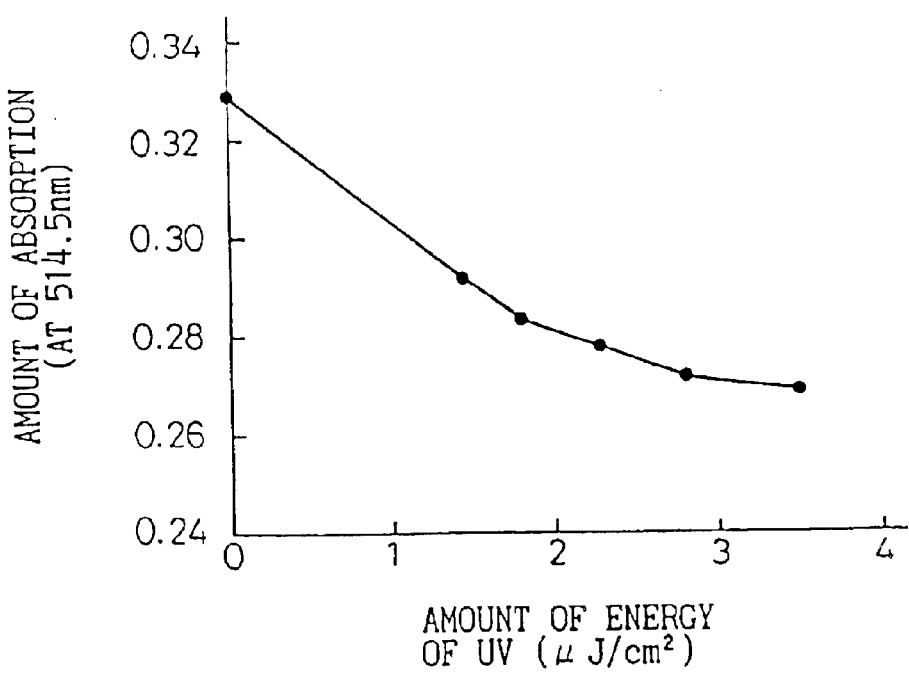
FIG. 18 is a view for explaining the relationship between the amount of absorption of the light (wavelength of 514 nm) and the amount of irradiation of the ultraviolet in the fourth embodiment.

The relationship between an amount of irradiation of the ultraviolet and reduction of sensitivity is explained using the photopolymer made by Dupont Co., Ltd., below. FIG. 18 shows an amount of laser having wavelength 514.5 nm. A coloring matter mixed with the photopolymer absorbs the light so that the polymerization reaction of the monomer is started. Accordingly, when the photopolymer is exposed by the laser having wavelength 514.5 nm in the production of the hologram screen, the amount at this wavelength represents the sensitivity of the photopolymer.

Figure 19:
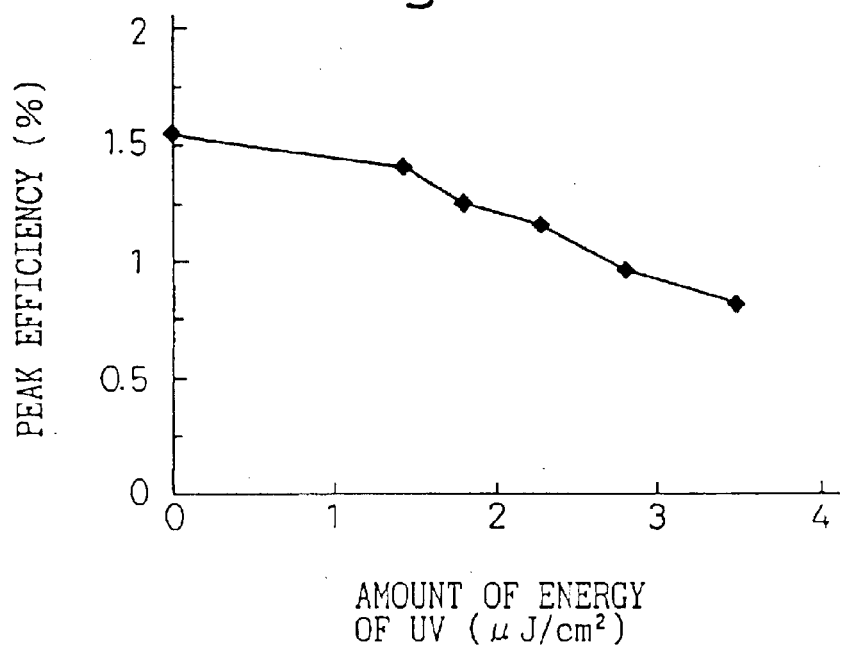
FIG. 19 is a graph for explaining the relationship between the peak wavelength and the amount of irradiation of the ultraviolet in the spectral characteristic of the hologram screen obtained by the photosensitive material after irradiation of the ultraviolet in the fourth embodiment.

As shown in FIG. 18, when the hologram screen was produced by exposing the photopolymer in which the sensitivity was reduced due to irradiation of the ultraviolet, it was clarified that the peak wavelength of the spectrum characteristic was shifted to the short wavelength side due to increase of the amount of the energy as shown in FIG. 19. Accordingly, when showing the spectral characteristic of the hologram screen s shown in FIG. 14 by previously irradiating the ultraviolet on the photosensitive material, it is possible to shift the spectral characteristic to the short wavelength side since the amount of the energy of the ultraviolet become large at the location (see (3)) apart from the incident side of the reference light. That is, it is possible to bring the spectral characteristics (2) and (3) close to that of (1).

Accordingly, by preferably setting the amount of the energy of the ultraviolet to be irradiated, it is possible to arrange the spectral characteristic of the hologram screen, and to reduce unevenness of color until the grade which is difficult to recognize the same. Further, if the spectral characteristic is intended to bring it near to that of (2), it is possible to shift the whole to the long wavelength side by changing the incident angle of the reference light at the exposure and the incident angle of the reproducing light at the reproduction, and by setting the incident angle of the reference light so as to become small. In this case, it is possible to realize a predetermined effect in the difference of the angle of 1 to 2°.

(Fifth Embodiment)

As shown in FIGS. 20 to 25, in this embodiment, the hologram screen is made by providing the incident distance of the reference light at the optional location on the photosensitive material so as to become shorter than the incident distance of the image light which is input from the image projector when reproducing the image on the hologram screen. The hologram screen is made by exposing the photosensitive material using the exposure optical apparatus shown in FIG. 10. At that time, as shown in FIG. 20, the incident distance $R_0$ of the reference light was shortened to the distance $R_0'$. In this case, the distance $R_0'$ is equal to the distance $F_0$ of the image light when reproducing the image (see FIG. 1) on the hologram screen.

The performance of the hologram screen which was made by shortening the distance of the reference light was evaluated as follows. First, the exposure optical apparatus was prepared as shown in FIG. 10. In this case, the incident angle $\theta_0$ of the reference light 1218 was set to 400, and the incident distance $R_0$ of the reference light was set to 1700 mm. Then, the photosensitive material was exposed. Further, the photosensitive material 1220 in which the exposure was completed, was replaced to new one. Further, the exposure was performed after the incident distance $R_0$ of the reference light was shortened to the distance $R_0'$ as shown in FIG. 20. In this case, a photopolymer made by Dupont Co., Ltd. was used as the photosensitive material 1220 having the uniform thickness distribution and the size of 300 mm×400 mm as shown by the comparing sample C1 in FIG. 12 in the third embodiment. Further, the scattering angle of the light diffusion body was set to 36°, and the intensity ratio of the reference light 1218 and the object light 1217 at the center of the photosensitive material 1220 was set to the value 4. Further, the incident angle $f_0$ of the image light of the hologram screen 11 (see FIG. 1) was set to 40°.

Figure 23:
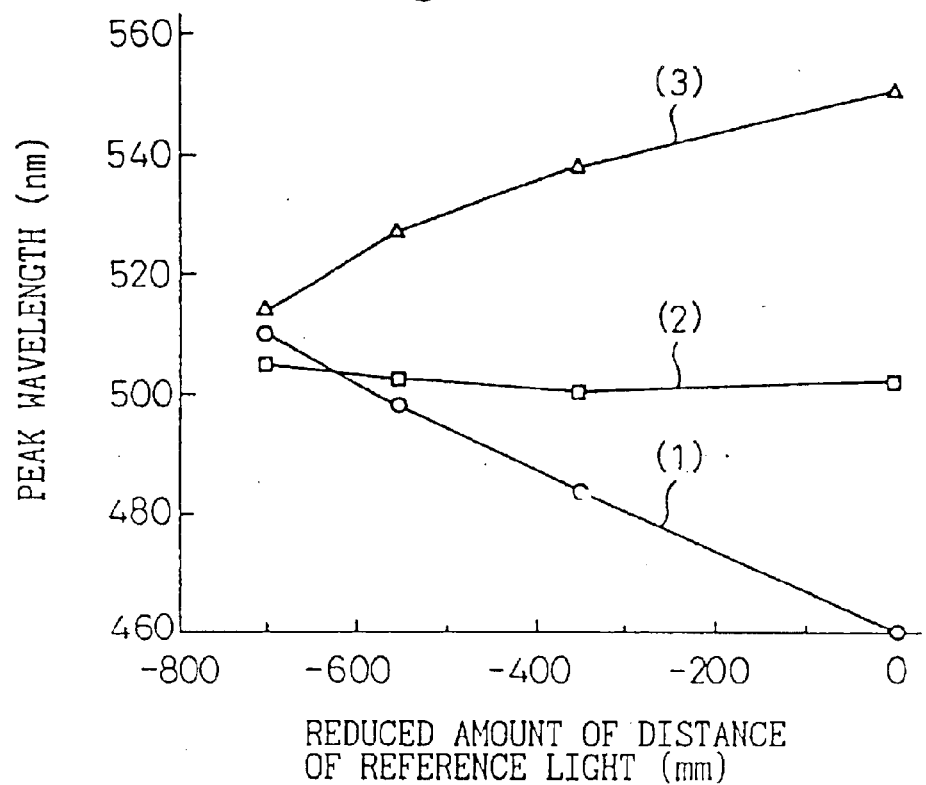
FIG. 23 is a graph for explaining the relationship between a reduced amount of the incident distance of the reference light, and the peak wavelength at the spectral characteristic of each hologram screen after reduction of the incident distance.
Figure 24:
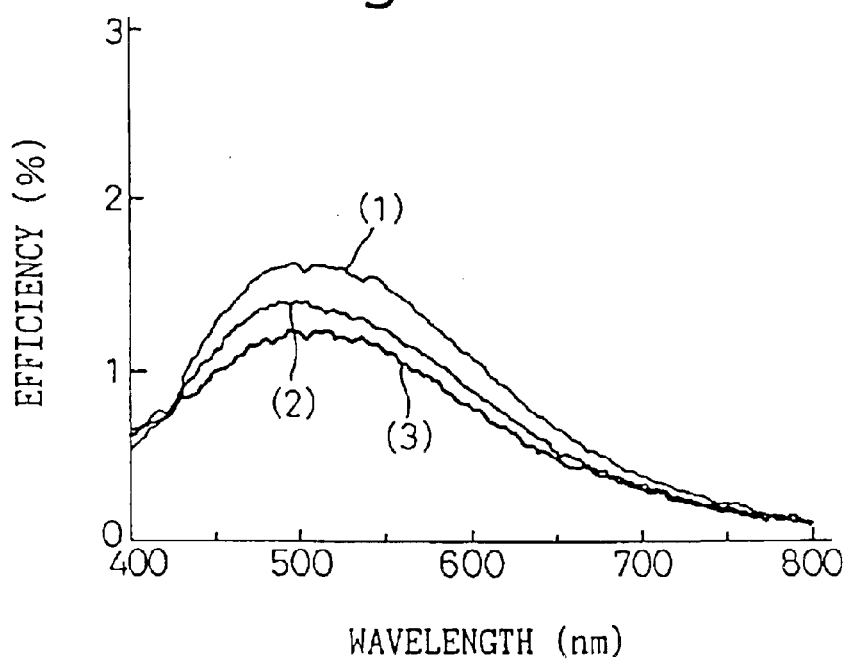
FIG. 24 is a graph for the spectral characteristic of the hologram screen having the reduced amount of −700 mm in the fifth embodiment.

Based on the above conditions, each peak wavelength at the spectral characteristic of each hologram screen, in which the incident distance $R_0$ of the reference light was shortened, was measured as shown in FIG. 23. In FIG. 23, (1), (2) and (3) show the spectral characteristics of the output light at the location shown in FIG. 3. As shown in FIG. 23, when the shortened amount of the reference light becomes large, the peak wavelength of each spectral characteristic (1), (2) and (3) is brought close to each other. When the shortened amount reaches −700 mm, three peak wavelengths (1), (2) and (3) approximately coincide with each other.

Figure 25:
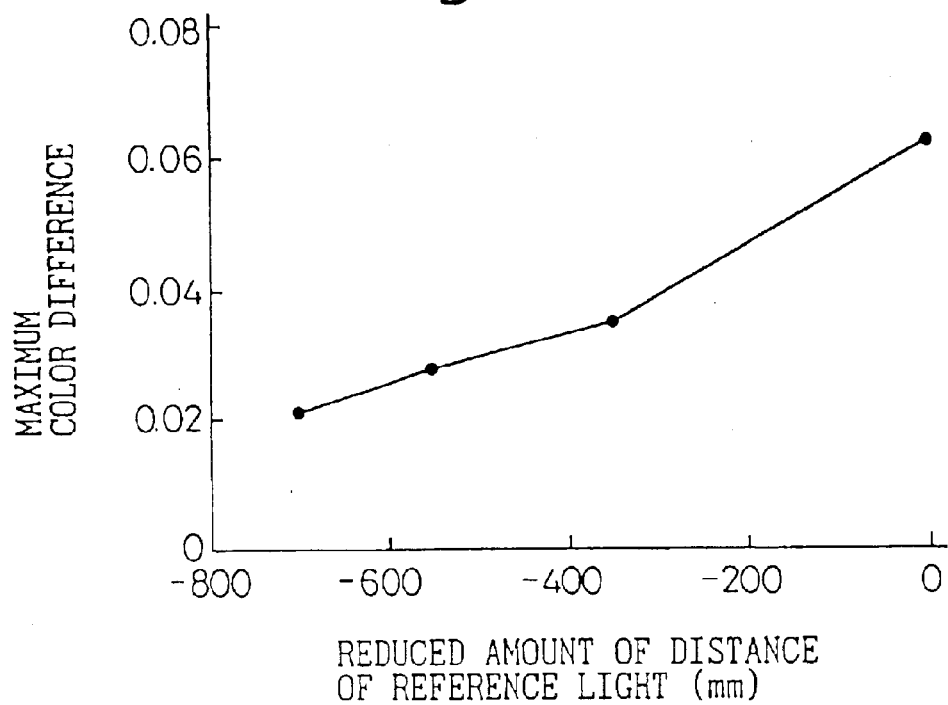
FIG. 25 is a graph for explaining the relationship between the reduced amount of the incident distance of the reference light, and the maximum color difference on the hologram screen after reduction in the fifth embodiment.

Further, FIG. 25 shows the relationship between the maximum value of the color difference and the reduced amount of the distance between the optional two points on the hologram screen. As shown in FIG. 25, when the reduced amount becomes large, the color difference becomes small. For example, when the shortened value was −550 mm, the color difference was 0.03 or less. Further, when the shortened value was −700 mm, the color difference was 0.021 or less. As is obvious from the above, it is possible to realize the hologram screen without unevenness of color by reducing the incident distance of the reference light.

(Sixth Embodiment)

Figure 26:
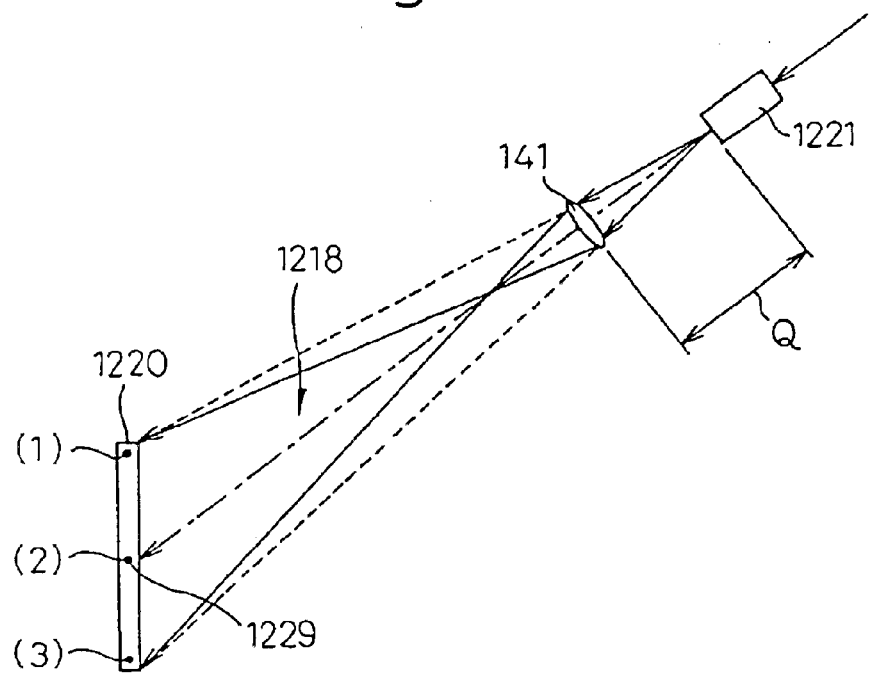
FIG. 26 is an explanatory view for the essential parts of the exposure optical system having a convex lens which is arranged between an object lens and the photosensitive material in order to reduce the incident distance of the reference light according to a sixth embodiment.

In this embodiment, as shown in FIG. 26, a lens 141 was provided between the object lens 1221 and the photosensitive material 1220. Accordingly, it is not necessary to shorten the incident distance of the reference light than the incident distance of the image light in the exposure optical system shown in FIG. 10. As a result, it is possible to substantially shorten the incident distance of the reference light when producing the hologram screen. As shown in FIG. 26, the reference light 1218 and the object light (not shown in this drawing) are irradiated on the photosensitive material 1220, as well as the exposure optical system shown in FIG. 10, so as to expose the photosensitive material. In this case, the convex lens 141 having an f-value of 175 mm was provided at the location of which the distance Q is 350 mm from the object lens 1221.

In this structure, when the divergence light from the object lens 1221 is input to the convex lens 141, this light becomes the convergence light so that this light is focused on the light path. As an effect of the convex lens, it is possible to shorten the incident distance of the reference light, for example, the distance −700 mm, without change of the physical location of the photosensitive material 1220 and the object lens 1221. In this embodiment, other conditions are the same as the fifth embodiment.

Figure 27:
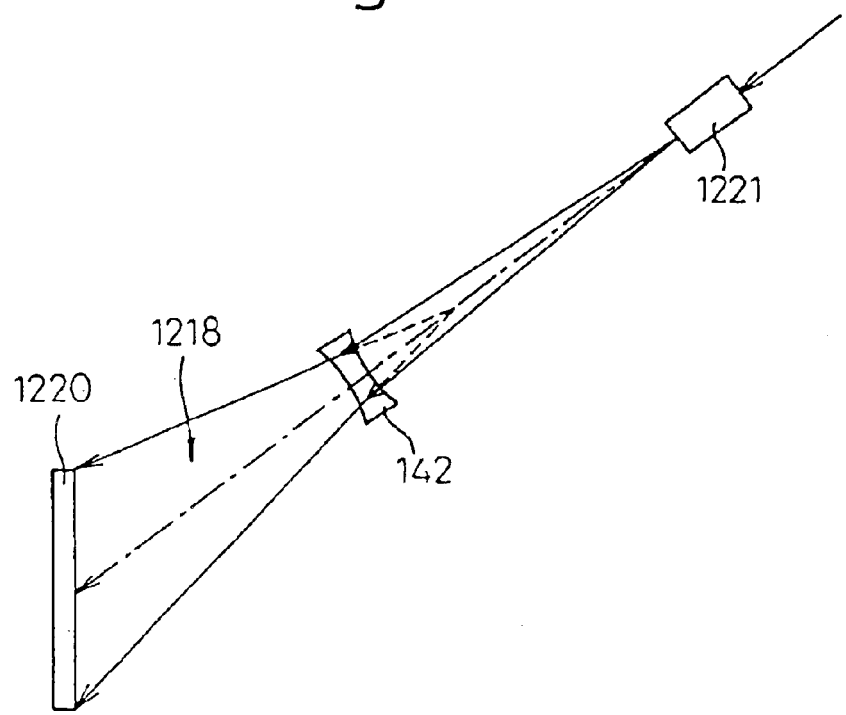
FIG. 27 is an explanatory view for the essential parts of the exposure optical system having a concave lens which is arranged between an object lens and the photosensitive material in order to reduce the incident distance of the reference light in the sixth embodiment.

When the convex lens 141 is provided as mentioned above, it is not necessary to limit the divergence point of the reference light 1218 to the location of the distance 1700 mm from the center 1229 of the photosensitive material 1220, and to freely change the location of the object lens 1221 and the photosensitive material 1220 in accordance with the f-value of the lens to be used. In FIG. 26, although the convex lens 141 was used, it is possible to use a concave lens 142 in order to shorten the incident distance of the reference light as shown in FIG. 27. Further, it is possible to utilize a cylindrical lens instead of the convex lens and the concave lens.

The cylindrical lens is very effective in the case that the color difference is reduced for the incident direction of the reference light, but the color difference is not reduced for the direction perpendicular to the surface of the drawing sheet (FIG. 26). This is because, when the distance of the reference light is shortened in order to arrange the peak wavelength at the points (1), (2) and (3) in FIG. 26, the peak wavelength is extremely shifted to the direction perpendicular to the surface of the drawing sheet so that the color difference may be increased.

(Seventh Embodiment)

Figure 28:
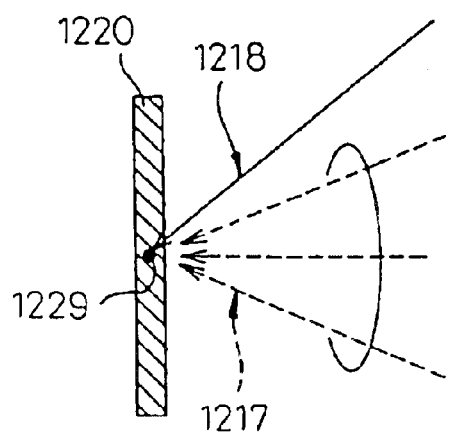
FIG. 28 is an explanatory view for configuration of the reference light and the object light which are input to the photosensitive material.

In this embodiment, in all areas on the photosensitive material, the intensity ratio of the reference light and the object light is defined as $I_R/I_O<10$ (where, $I_R$ is the intensity of the reference light, and $I_O$ is the intensity of the object light). That is, as shown in FIG. 28, the hologram screen was made by changing the intensity ratio of the reference light 1218 and the object light 1217 on the photosensitive screen 1220. Further, the hologram screen was made in such a way that the conditions of the intensity ratio can be established in all areas on the photosensitive material 1220.

As other conditions, the incident angle of the reference light to the center 1229 of the photosensitive material 1220 was set to 40°, and the incident distance of the reference light was set to 1350 mm. Further, the photopolymer made by Dupont Co., Ltd. having the uniform thickness distribution and the size of 300 mm×400 mm, as shown in FIG. 12 in the third embodiment was used as the photosensitive material 1220. Further, the light diffusion body having the scattering angle of 360 was used. Still further, the incident angle of the image light to the center was set to 40°, and the incident distance of the image light was set to 1700 mm.

Figure 29:
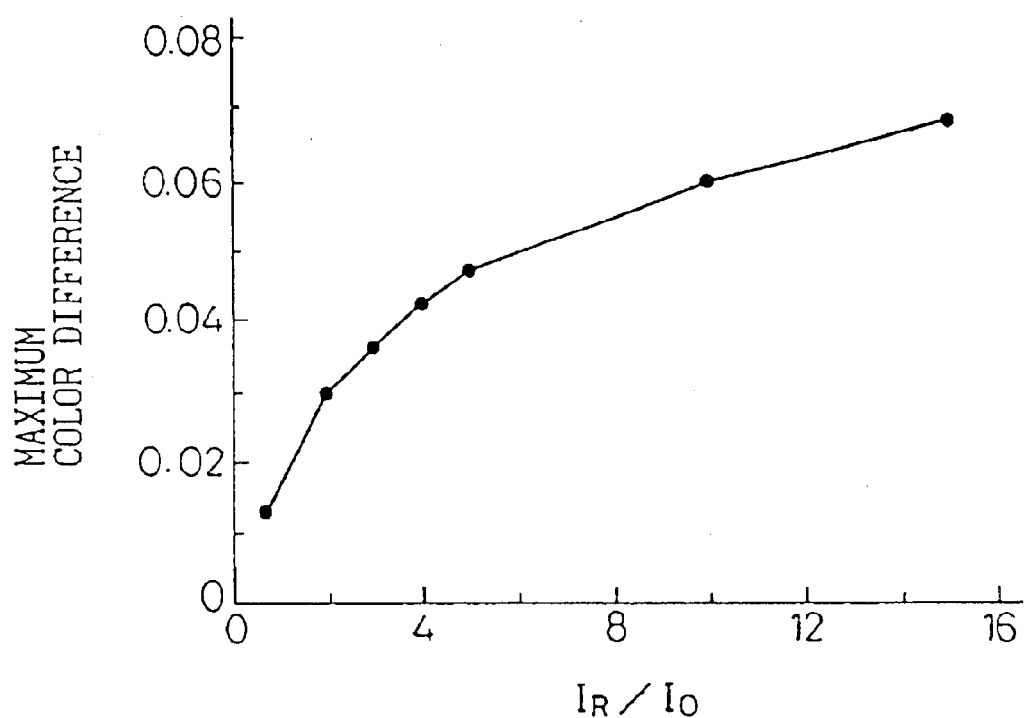
FIG. 29 is a graph for explaining the relationship between the intensity $I_R/I_O$ and the maximum color difference in the seventh embodiment.

The relationship of the maximum value of the color difference and the intensity ratio $I_R/I_O$ between optional two points on the hologram screen is shown in FIG. 29. As shown in FIG. 29, when the $I_R/I_O$ becomes small, the maximum value of the color difference becomes small. For example, when $I_R/I_O$ is 10 or less, the maximum value becomes 0.06 or less. Further, when $—I_R/I_O$ is 0.7, the maximum value of the color difference can be reduced by 0.013. As mentioned above, when $I_R/I_O$ is 10 or less, it is possible to realize the hologram screen without unevenness of color on the image.

Explanations of the Second Aspect of the Present Invention

The second aspect of the present invention relates to a method for producing a hologram element which can be used as a display apparatus for displaying a still image or an animated image by irradiating the image light.

Figure 35:
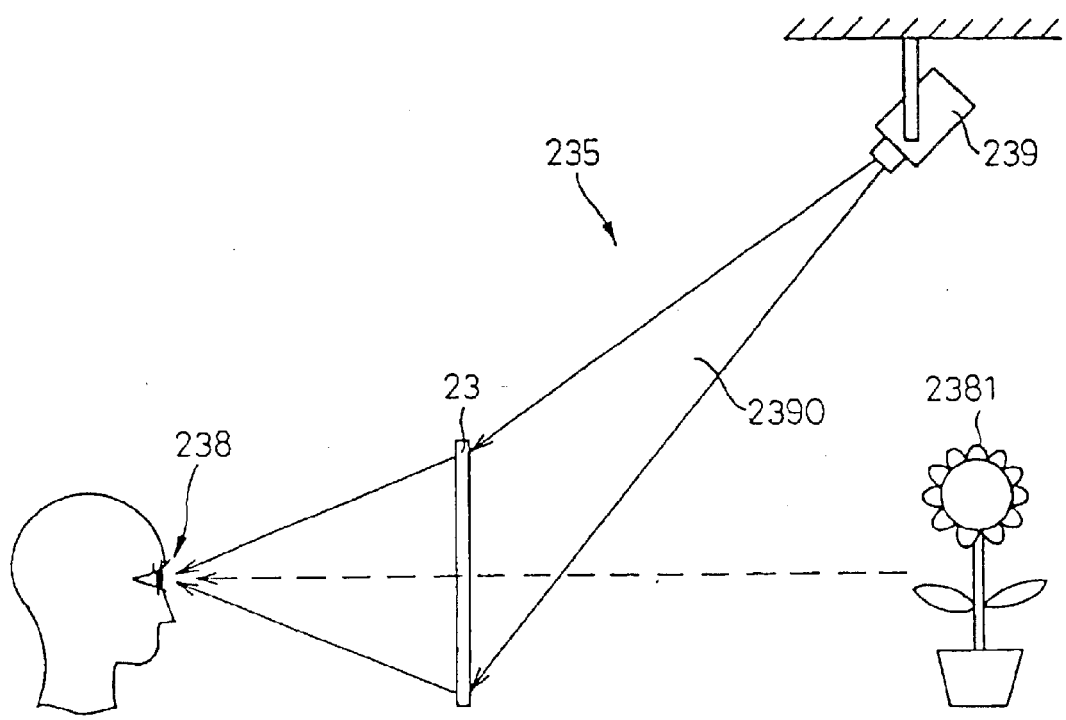
FIG. 35 is an explanatory view of the display apparatus using the hologram screen in the first embodiment.
Figure 52:
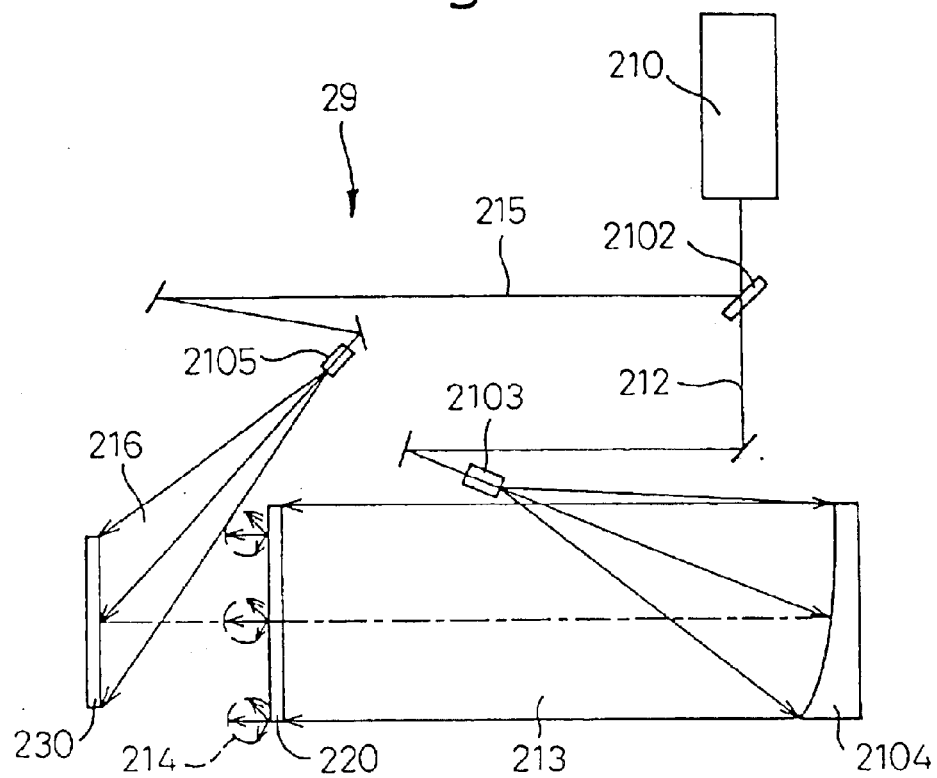
FIG. 52 is an explanatory view for the exposure optical system as another example.

The object light 214 and the reference light 216 are irradiated on the photosensitive material 230 and exposed by using an exposure optical system 29 as shown in FIG. 52. A hologram screen formed by the hologram element, as shown in FIG. 35, can be applied to the display apparatus 235 for displaying the still image or animated image by irradiating the image-light 2390 from the irradiating apparatus 39.

On the other hand, in general, a large size screen has been desired as the display apparatus in order to utilize as an advertizing board in a showroom. However, it is very difficult to produce a large size hologram screen by using the exposure optical apparatus 29 as mentioned above in once projection of the image. That is, although it is necessary to provide a large size photosensitive material in order to produce the large size hologram screen, a lot of time is required for exposure of the photosensitive material. Further, since it is necessary to irradiate the reference light onto the whole of the large size photosensitive material, the intensity of the reference light becomes weak so that the exposure time also becomes long. As a result, the exposure time may exceed the time for stably maintaining the interference fringe on the photosensitive material so that the production efficiency of the hologram element deteriorates.

Further, it is necessary to utilize the large size light diffusion body in order to obtain the object light which can be irradiated on the whole of the large photosensitive material. However, it is very difficult to produce the large light diffusion body. Still further, since the object light which is obtained by the large size photosensitive material is formed by the diffusion light which is diffused in the wide extent, the light intensity becomes weak so that the exposure time for exposing the photosensitive material becomes long.

In order to resolve the above-mentioned problems, the inventor has proposed two methods, i.e., (1) a method of resolving problems by reducing a size of the photosensitive material, and (2) a method of resolving problems by reducing a size of the light diffusion body, in Japanese Unexamined Patent Publication No. 9-349572.

Figure 34:
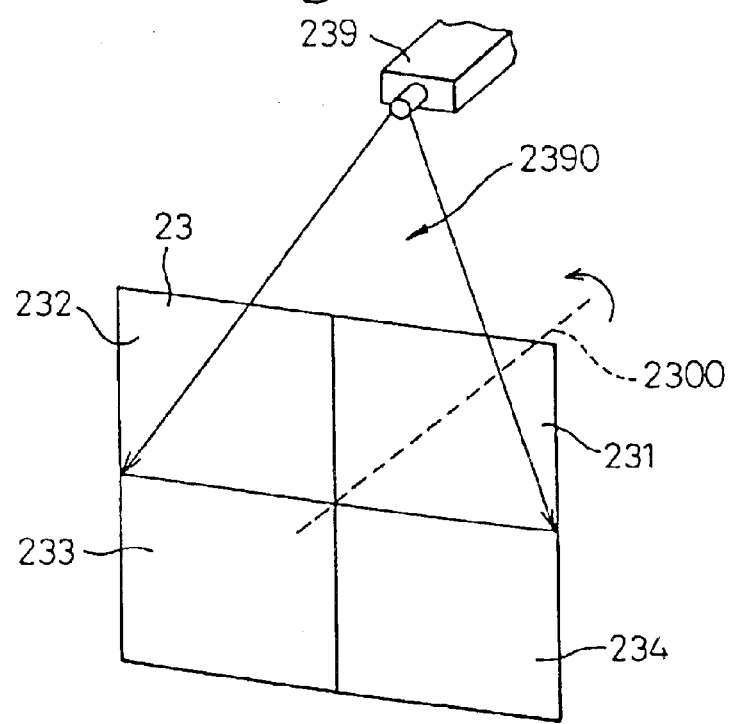
FIG. 34 is an explanatory view of the hologram screen in the first embodiment.

In the method (1), as shown in FIG. 34, a plurality of hologram screens 231 to 234 are integrated two-dimensionally by using a suitable adhesive material in order to obtain the large hologram screen 23. In this case, four hologram screens are separately produced and coupled each other.

Figure 31:
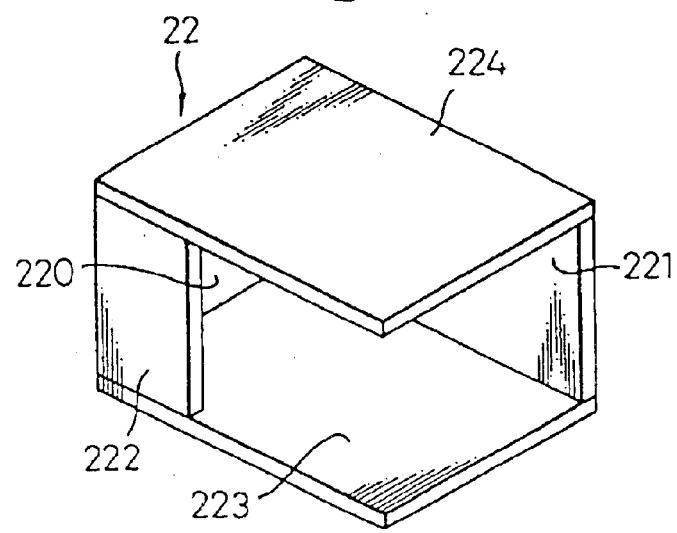
FIG. 31 is a perspective view of the light diffusion body in the first embodiment.
Figure 32:
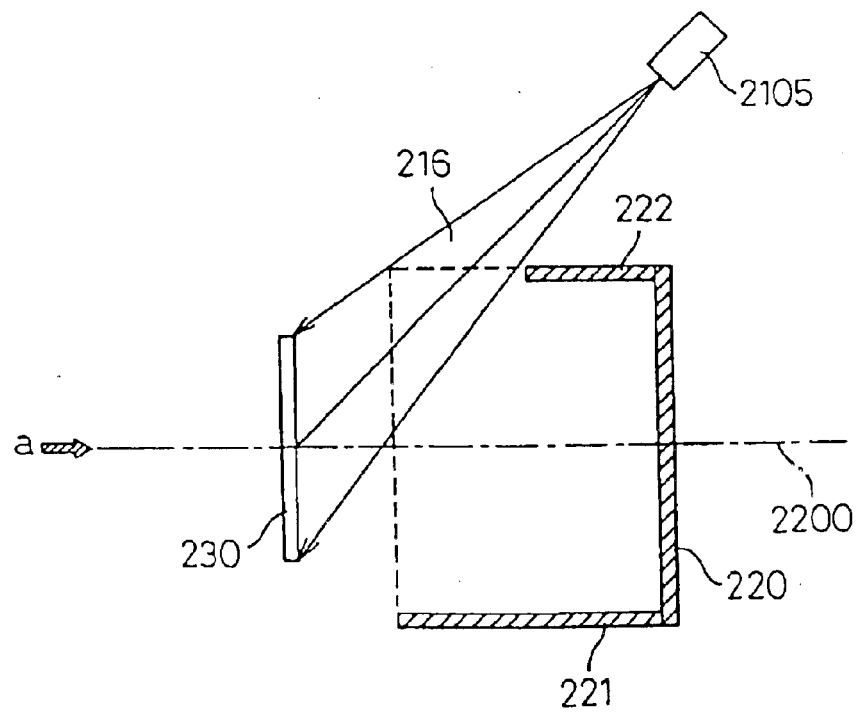
FIG. 32 is an essential view of the light diffusion body in the first embodiment.

In the method (2), as shown in FIGS. 31 and 32, a plurality of mirrors 221 to 224 are provided perpendicularly to the light diffusion body 220. In this case, since the light diffusion body 220 is imaged on the plurality of the mirrors 221 to 224, it is possible to obtain the object light having the large extent as well as the large diffusion body.

There is a problem, however, in the method (2). That is, when combining the method (1) with the method (1), it is impossible to perform sufficient recording on the photosensitive material from the light diffusion body imaged on the mirror, and there is the difference in brightness between an area directly recorded by the light diffusion body and another area indirectly recorded by the light diffusion body through the mirror. As a result, depending on the angle observed by the observer, the image on the hologram screen becomes partially dark, and color are changed. Further, a boundary line between the diffusion body and the mirror may be imaged on the hologram screen so that the observer may has uncomfortable feeling when observing image on the hologram screen.

According to the producing method of the second invention, it is possible to display uniform and bright image on the display apparatus, and to observe the image in the broad angle without changes of brightness and color eye.

According to the invention defined in claim 13, the hologram element is formed by interferencing the reference light with the object light transmitted through the light diffusion body, and by recording the light diffusion body on the photosensitive material in the optical system. There is a mirror arranged approximately perpendicularly to the light diffusion body on the light diffusion body. Further, a rotational center is defined by an axis intersected perpendicularly to the center of the photosensitive material, and the photosensitive material and the light diffusion body are arranged with the angle θ.

According to the second aspect of the present invention, polarized direction of laser light is determined by either P-polarization or S-polarization which are inclined from θ−5 to θ+5. That is, as the feature of the present invention, either P-polarization or S-polarization having the polarized direction in the range of the angle θ−5 to θ+5 is used as the laser light.

When the polarized direction is out of the this range, the light diffusion body which is imaged on the mirror becomes dark, the image becomes partially dark depending on the observer's angle.

The operation of the second aspect of the present invention will be explained below. The mirror is arranged perpendicular to the light diffusion body used in the present invention (see FIGS. 31 and 32). In the recording of the light diffusion body on the photosensitive material, the object light is irradiated from the light diffusion body, a part of the object light is irradiated directly on the photosensitive material, but other object light is irradiated on the photosensitive material after reflected by the mirror. Accordingly, the incident angle of the object light on the photosensitive material becomes broad by using the above compact light diffusion body so that it is possible to obtain the object light having broad extent as well as the large size light diffusion body.

Further, when producing the hologram element, the light diffusion body and the photosensitive material are rotated with the same angle θ around the axis which is intersected perpendicularly to the center point of the photosensitive material and used as the center of the rotation.

Figure 37:
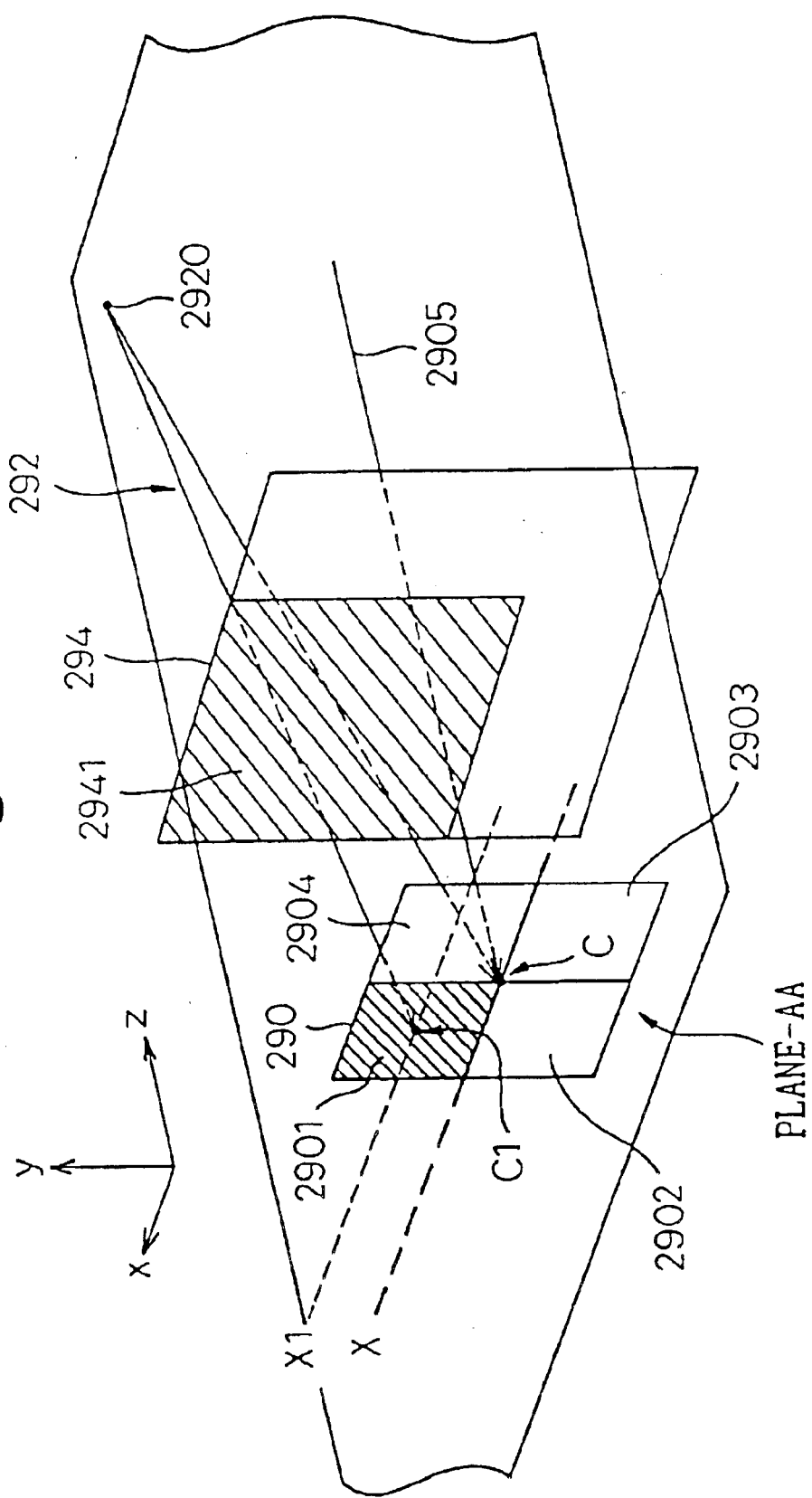
FIG. 37 is an explanatory view for position of the light diffusion body and the reference light when exposing the photosensitive material.

In this case, when the large size hologram screen 3 shown in FIG. 34 is produced by one hologram element, it is necessary to have arrangement relationship among the photosensitive material 290, the light diffusion body 294 and the reference light 292 shown in FIG. 37. Further, as shown in FIG. 34, when one large size hologram screen is formed by coupling four hologram elements 231 to 234, there is the arrangement relationship between the photosensitive material 2901 necessary for producing one hologram element 231 and the light diffusion body 2941 used for the photosensitive material 2901.

In FIG. 37, there is the divergence point 2920 of the reference light 292 on the plane AA formed by the center line X passing the center C and the axis 2905 passing perpendicularly to the center point C of the photosensitive material 290. In this case, the divergence point 2920 becomes the object lens 2105 in the optical system 29. Further, in FIG. 37, the straight line X1 passing the center point C1 and parallel to the line X is provided on the photosensitive material 2901.

Further, the plane AA1 (not shown) including the line X1 is provided parallel to the plane AA. In this case, there is no divergence point 2920 on the plane AA1.

Figure 38:
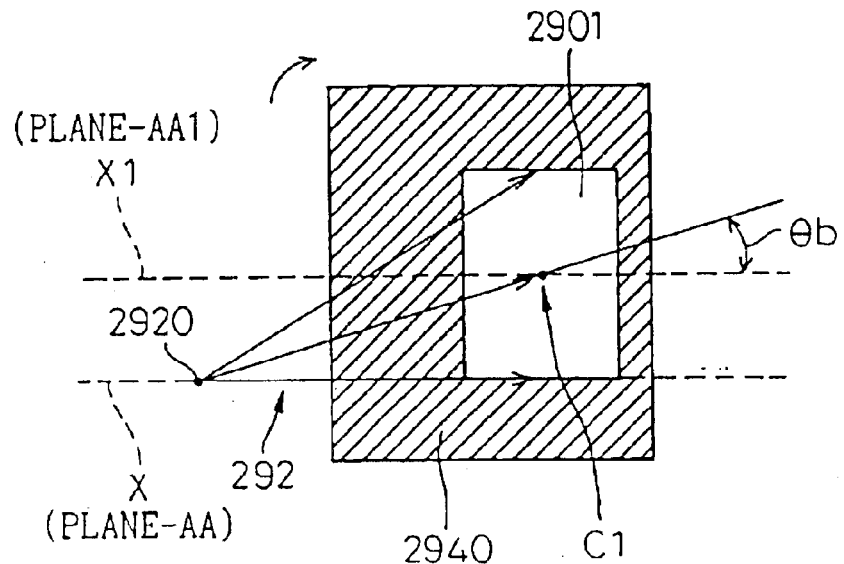
FIG. 38 is a plane view for the photosensitive material, the light diffusion body and the reference light which are observed from the z-axis direction of FIG. 37.

FIG. 38 shows the configuration observed from the Z-axis of FIG. 37. As shown in FIG. 38, it is necessary to irradiate the reference light 292 toward the center point C1 with the angle θb for the center line X (plane AA). That is, when producing the hologram element 231 which partially forms the large size hologram screen 23, it is necessary to irradiate the reference light 292 with a predetermined angle.

Figure 39:
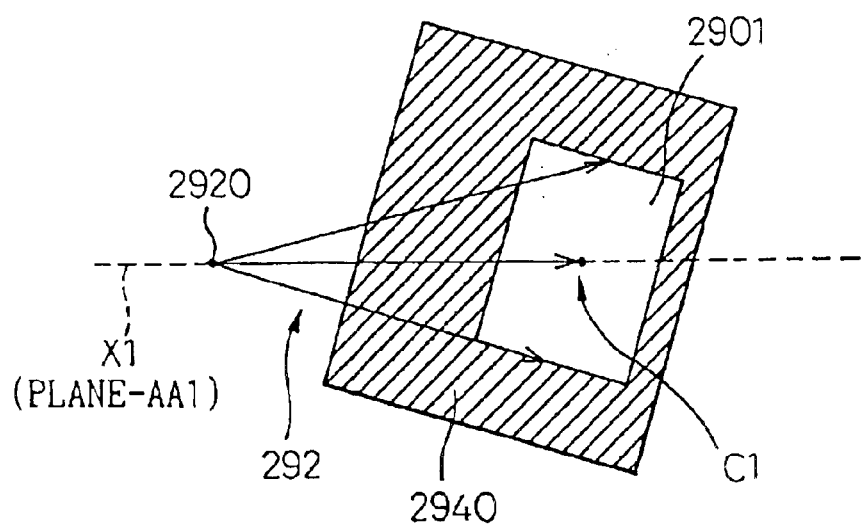
FIG. 39 is a plane view for explaining rotated state of the photosensitive material of FIG. 38, the light diffusion body and the reference light.

In FIG. 38, there is an axis passing the center point C1 and perpendicular to the drawing sheet. The photosensitive material 2901, the light diffusion body 294 and the reference light 292 are rotated with the angle θb to the right direction around the above axis used as the rotational center, as shown in FIG. 39. When these are rotated with the angle θb, the divergence point 2920 of the reference light 292 is moved to the plane AA1.

Accordingly, when producing the hologram element, the light diffusion body and the photosensitive material are rotated with the same angle θ as mentioned above. Further, the reference light is irradiated to the photosensitive material on the same horizontal plane as the object light. When θ=θb, it is possible to easily and safety produce the hologram element since the optical system for exposing the photosensitive material can be easily provided.

Figure 33:
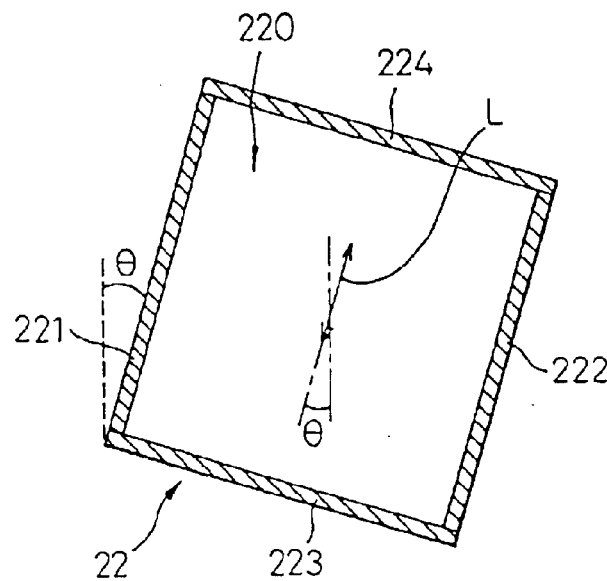
FIG. 33 is a plane view of the light diffusion body in the first embodiment.
Figure 40:
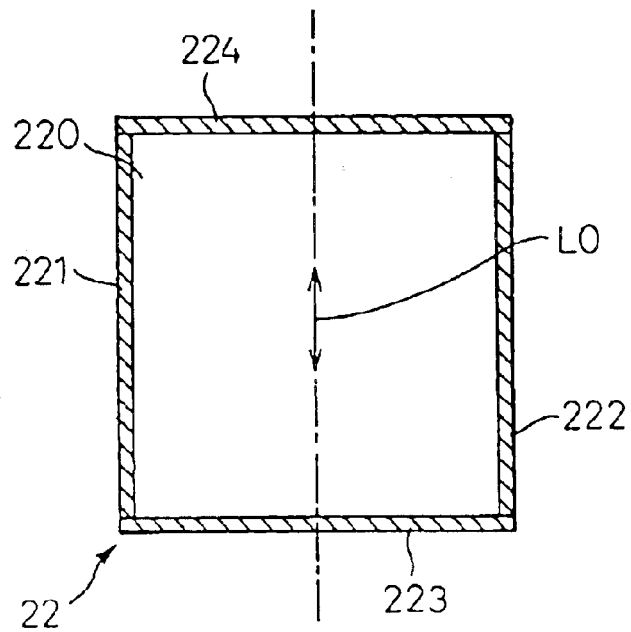
FIG. 40 is a plane view for the relationship between the light diffusion unit and the polarized direction.

In the present invention, either the P-polarization or the S-polarization having the polarization direction in the extent from the angle θ−5 to θ+5 is used as the laser light, as shown in FIG. 33. In this case, FIG. 33 show the configuration observed from the direction shown by the arrow "a" in FIG. 32. It is assumed that the laser light of the S-polarization having the polarized direction shown by the arrow line LO in FIG. 40 is irradiated to the light diffusion body. In this case, the polarized direction is perpendicular to the mirrors 223 and 224 as shown in FIG. 40.

Figure 41:
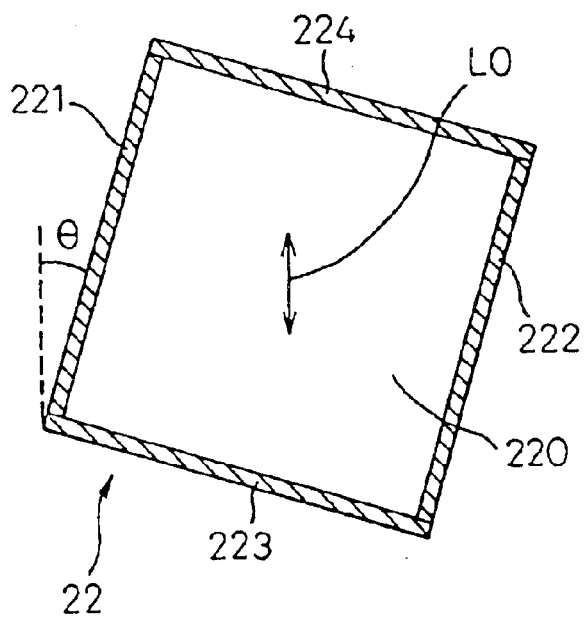
FIG. 41 is a plane view for rotated state of the light diffusion unit of FIG. 40.

There are the light diffusion body 220 and the mirrors 221 to 224 provided thereto, which are rotated with the angle θ around the axis intersected perpendicularly to the center point of the light diffusion body 220 and used as the rotational center as shown in FIG. 41. In this case, since the polarized direction of the laser light is not changed and directed by the arrow line LO, the perpendicular direction (i.e., S-polarization) is maintained.

Figure 42:
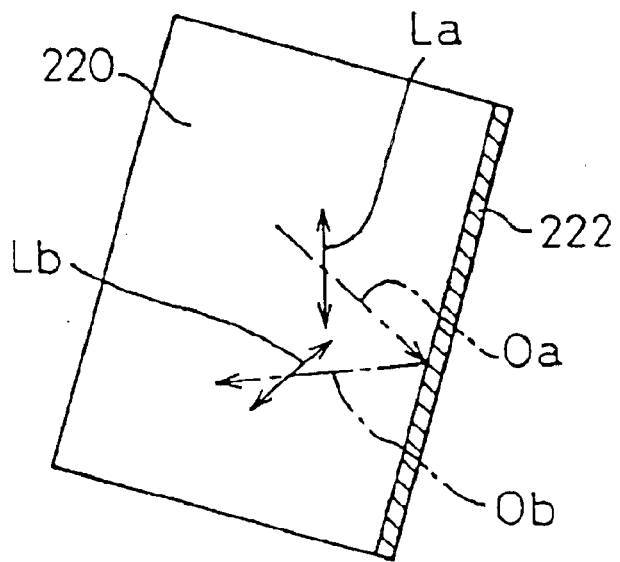
FIG. 42 is an explanatory view for the polarized direction of the object light Oa transmitted through the light diffusion unit, and the object light Ob reflected by the mirror.

The laser light is transmitted through the light diffusion body 220 as shown in FIG. 42, and reflected by the mirror 222 so that the object light Ob is formed. In this case, the polarized direction of the object light is considered. As shown in FIG. 42, the polarized direction of the object light Oa, which transmits the light diffusion body 224 and reaches the mirror 222, is shown by the arrow line La. However, since the mirror 222 is inclined with the angle θ, the polarized direction of the object light Ob which is reflected by the mirror 222 is shown by the arrow line Lb. That is, this polarized direction is inclined with 2×θ for the polarized direction before reflection.

Figure 43:
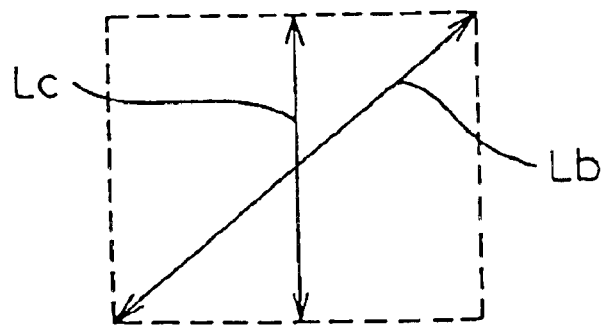
FIG. 43 is an explanatory view for the relationship between the object light Ob of FIG. 42 and the reference light at the optical system.

In this case, the polarized direction of the reference light which reaches the photosensitive material is the same as that of the laser light and has the S-polarization. Accordingly, in the object light Ob after reflection, the object light which can contribute to form the interference fringe with the reference light, as shown in FIG. 43, is only the same direction component as the arrow line Lc which indicates perpendicular component of the arrow line Lb. That is, the substantial intensity of the object light reflected by the mirror deteriorates so that it becomes weaker than the intensity of the object light which was directly input to the photosensitive material after transmitting the light diffusion body. As a result, the efficiency of the interference fringe becomes lower than the efficiency of the interference fringe formed by the object light which was directly input to the photosensitive material.

As mentioned above, the sufficient recording to the photosensitive material cannot be performed from the light diffusion body which was imaged on the mirror, and the difference in brightness occurs between the recorded area directly imaged by the light diffusion body and the recorded area indirectly imaged by the light diffusion body through the mirror. As a result, there is a problem in which the image becomes partially dark on the hologram screen, depending on the observing angle from the observer.

In the present invention, as mentioned above, the P-polarization or the S-polarization having the polarized direction in the range from the angles θ−5 to θ+5 is used as the laser light. Accordingly, it is possible to provide the state of the P-polarization or S-polarization for the light diffusion body and the mirror inclined with the angle θ. That is, in the present invention, the object light is reflected by the mirror so that the large change of the polarization direction is prevented, and it is possible to prevent a partially dark image which depends on the observing angle from the observer.

In the S-polarization, for example, in FIG. 33, the polarized direction of the laser light is inclined with the angle θ so that the polarized direction of the laser light becomes parallel to the mirrors 221 and 222. The laser polarization is called "S-polarization having angle θ" in the present invention, and the polarized direction (i.e., parallel to mirrors 23 and 24) perpendicular to the S-polarization is called "P-polarization having angle θ".

The laser light used in the present invention is generated by a known laser oscillator, and it is possible to prepare the P-polarization or the S-polarization having the polarized direction in the range from the angles θ−5 to θ+5 by providing a half-wave plate for the laser oscillator. The wavelength plate is an optical element which can change the polarization state of the optical wave by providing the phase difference based on the difference in the refractive index for the polarized component of the optical crystal having the optical anisotropy. Further, the half-wave plate is an optical element which can change the polarized direction of the linear polarization.

When the linear polarized light is irradiated with the angle θ for the optical axis of the half-wave plate, the polarized direction of the output light has the direction which is inclined with the angle 2×θ for the incident light. Further, the angle θ can be changed continuously. As a result, it is possible to easily obtain the laser light having the desired polarized direction. Further, it is possible to utilize the wavelength plate having the above function utilizing the optical anisotropy of the optical crystal as the half-wave plate. Further, it is possible to utilize a Fresnel rhomb plate which utilizes the total reflection in the optical element as the half-wave plate. Particularly, the Fresnel rhomb wavelength plate can be used for the high power laser light, and can be used widely since the usable wavelength band of the laser light is wide. Accordingly, the Fresnel rhomb wavelength plate can be preferably used as the half-wave plate.

Further, as a method for integrating a plurality of hologram elements, for example, there are two representative methods, i.e., one being a method for bonding the hologram element to a predetermined film (for example, a PTE film) with an adhesive material, and the other being a method for bonding the hologram element to a large glass plate using a transparent and optical adhesive material. Further, it is possible to utilize the light which is generated by an argon (Ar) laser oscillator as the laser light. Further, it is possible to utilize the photopolymer, or the dichromated gelatin, etc., as the photosensitive material. Still further, it is possible to utilize ground glass or opal glass as the light diffusion body.

According to the second invention, it is possible to produce the transparent hologram element in order to form the hologram screen. In this case, it is possible to obtain the transparent hologram screen by using a transparent adhesive material. As a result, the display apparatus having the hologram screen can be effectively used as, for example, not only an advertising board for a show window, showroom, etc., in a shopping center, but also as a transparent screen which can see through an opposite person when the display apparatus is not used, in a ticket window.

Preferable embodiments in the second embodiment will be explained in detail with reference to the attached drawings.

(First Embodiment)

The first embodiment will be explained in detail with reference to FIGS. 30 to 35. In this embodiment, as shown in FIG. 34, four hologram elements 231 to 234 are integrated two-dimensionally by using a predetermined adhesive material in order to form the hologram screen 23.

Figure 30:
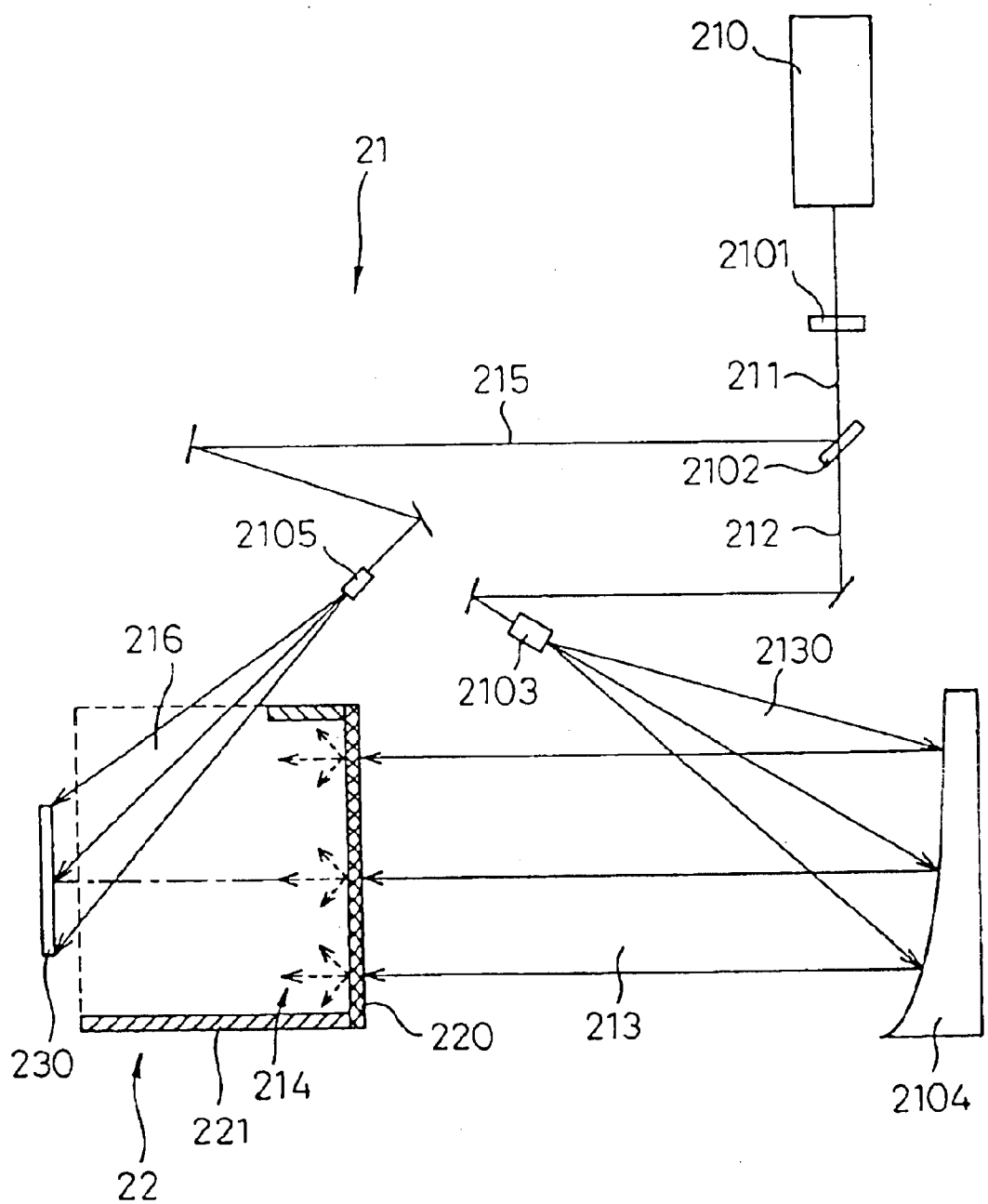
FIG. 30 is an explanatory view for the exposure optical system according to a first embodiment of the second aspect of the present invention.

In the optical system shown in FIG. 30, the laser light 211 is splitted to two separated lights 211 and 212. The separated light 212 becomes the object light 214 after transmitting the light diffusion body 220, and the other separated light 215 becomes the reference light 215. The object light 214 and the reference light 216 are irradiated on the photosensitive material 230 in the same horizontal plane, and the light diffusion body 220 is recorded on the photosensitive material 230 so that each of hologram elements 213 to 234 is produced. After the hologram elements 231 to 234 were integrated, the large hologram screen 23 is produced as shown in FIG. 34.

When producing the hologram elements, the mirrors 221 to 224 are provided perpendicularly to the light diffusion body 220 thereon as shown in FIGS. 30 to 32. Further, as shown in FIG. 32, the light diffusion body 220, mirrors 221 to 224 and the photosensitive material 230 are rotated with the same angle θ around the axis 2000 which is intersected perpendicularly to the center point of the photosensitive material 230 and used as the rotational center, and the S-polarization having the polarized direction of the angle θ is used as the laser light 211. The rotational angle θ is different in each hologram elements 213 to 234.

In the optical system 21 shown in FIG. 30, the wavelength plate 2101 is provided between the laser oscillator 210 and the beam splitter 2102, and the S-polarization having the polarized direction with the angle θ can be obtained when the laser light is passed through the wavelength plate 2101. Further, the wavelength plate 2101 is formed by the Fresnel rhomb half-wave plate. Further, the laser oscillator 210 is formed by the Ar laser oscillator. Still further, the laser light emitted from the laser oscillator 210 and passed through the wavelength plate 2101 is split by the beam splitter 2102 into two beams so that the separated lights 212 and 215 can be obtained.

After one separated light 212 became the divergence light 2130 by the object lens 2103, and the divergence light 2130 becomes the parallel light 213 by the parabolic mirror 2104. Further, the diffusion light is formed after the parallel light 213 was passed through the light diffusion body 220, and becomes the object light 214. Further, when another separated light 215 is passed through the object lens 2105 so that the reference light 216 can be obtained.

As shown in FIGS. 31 and 32, a light diffusion unit 22 is formed by the square and plate-like light diffusion body 220 made of, for example, cloudy glass, and the mirrors 221 to 224 provided perpendicularly to the light diffusion body 220. Further, in the light diffusion unit 22, the length of the mirror 221 is shorter than those of mirrors 222 to 224 in order to form a space which delivers the reference light 216. Further, the mirrors 221 to 224 are formed by a dielectric-multilayer film, and there is no slippage of the phase of the reflection light in each mirror. Further, it is possible to use a metal-vapoured film as the mirror. In this case, the mirror is arranged in such a way that the surface thereof is faced inside.

As shown in FIG. 33, the light diffusion unit 22 is arranged to the right direction with the angle θ. On the other hand, the light diffusion unit 22 is arranged perpendicularly to the light diffusion body 220 so that the light diffusion body 220 is arranged with the angle θ. Further, although the drawing is omitted, the photosensitive material 230 is arranged with the same angle. Still further, the polarized direction of the parallel light 213 which is input to the light diffusion body 220 is the direction shown by the arrow line L in FIG. 33. That is, the polarized direction is directed to the angle θ.

When the object light 214 and the reference light 216 are irradiated on the photosensitive material 230, the interference fringe formed by these lights is recorded on the photosensitive material 230. As a result, the light diffusion body 220 is recorded on the photosensitive material 230 so that the hologram screen is formed thereon.

Next, the hologram elements 231 to 234 each having width across corners of twenty inches were prepared in accordance with the above-mentioned method as explained below. In this case, the rotational angle θ is different each other in four hologram screens. For example, in FIG. 5, when the image light 2390 is irradiated with the angle 35° at the center of the hologram screen 23, i.e., at the center of the width-across-corners of forty inches in the hologram screen 23, the hologram element 231 is 15° to the right direction, the hologram element 232 is 15° to the left direction, the hologram element 233 is 11° to the right direction, and the hologram element 234 is 11° to the left direction.

Figure 36A:
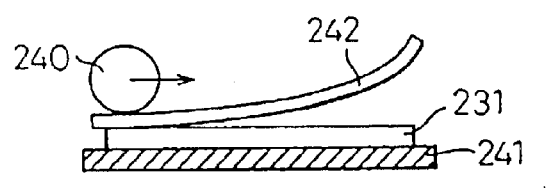
FIGS. 36A and 36B are explanatory views for explaining connection method of the hologram screen in the first embodiment.

The method for coupling the hologram screens 231 to 234 will be explained in detail below. As shown in FIG. 36A, the hologram element 231 is laminated on the glass substrate 241, and the transparent PET film 242 (a size of twenty inches) with the adhesive material is bonded by using a roller 240 on the glass substrate 241. After the peripheral portion of the hologram element 231 and the transparent PET film 242 which exceed the size of twenty inches was cut off, the glass plate 241 is removed.

Figure 36B:
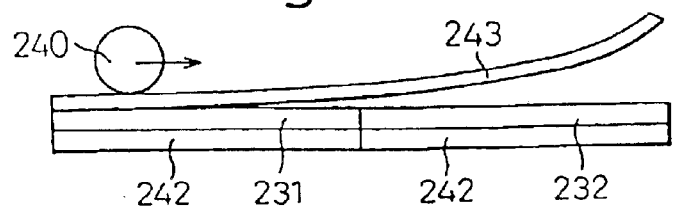

After the above steps, the transparent PET film 242 was bonded to the remaining three hologram screens 232, 233 and 234. Further, as shown in FIG. 36B, after the four hologram screens 231 to 234 were closely arranged so as not to provide a gap between hologram elements, the transparent PET film 243 with the adhesive material and being forty inches wide was bonded on the surface of the hologram element 232 using the roller 240. As a result, it is possible to obtain the large size hologram screen 23 having the width across corners of forty inches.

Next, the display apparatus 235 using the hologram screen 23 according to the second invention will be explained in detail below.

As shown in FIG. 35, the image projector 239 is arranged at the back and upper portion of the hologram screen 23. The image projected by the image projector 239 is focused on the hologram screen 23 so that the observer 238 can observe the image on the hologram screen 23. That is, when the image light is irradiated on the hologram screen, the light diffusion body 220 which is recorded on the hologram elements 231 to 234 is reproduced, and the image light is diffracted and diffused on the hologram elements 231 to 234. As a result, the hologram screens 231 to 234 can be functioned as the hologram screen.

Further, the hologram elements 231 to 234 are formed by the transparent material, and the adhesive material for these hologram elements is the transparent PET films 242 and 243. Accordingly, the observer can observe the background 2381 as well as the image on the hologram screen.

The operation of this embodiment will be explained in detail below. As shown in FIGS. 31 and 32, the mirrors are provided perpendicularly to the light diffusion body. In the exposure process of the photosensitive material, the separated light is irradiated to the light diffusion body, and the object light is output from the light diffusion body. In this case, a part of the object light directly reaches the photosensitive material, and the remaining object lights are once reflected by the mirror and reaches the photosensitive material.

Accordingly, the incident angle of the object light to the photosensitive material becomes wide so that it is possible to obtain the object light having the same extent as the large light diffusion body by using the small light diffusion body according to this embodiment.

As mentioned above, four hologram elements are produced separately, and integrated to form the hologram screen. When producing the hologram screen, the light diffusion body and the photosensitive material are rotated by the same angle θ. In this case, the angle θ is different in each of four hologram elements. Further, the reference light and the object light are irradiated to the photosensitive material on the same horizontal plane.

Further, in this embodiment, the S-polarization having the polarized direction of the angle θ as the laser light. Accordingly, it is possible to set the polarized direction of the object light to the S-polarization for the light diffusion body and mirrors which are inclined by the angle θ. That is, according to this embodiment, since it is possible to prevent large change of the polarized direction due to the reflection of the object light by the mirror, it is possible to prevent a partially dark portion on the hologram screen and a partially dark image which occurs depending on the observing angle by the observer. As a result, it is possible to display uniform and bright image on the hologram screen and to observe the image from the wide angle without change of the brightness and the color eye.

(Second Embodiment)

The second embodiment according to the second aspect of the present invention will be explained with reference to FIGS. 44 to 51 below. In the following explanations, the producing method was compared between two kinds of the S-polarization used as the laser light, i.e., one S-polarization having the polarized direction of the angle of 15° according to the first embodiment, and the other S-polarization having the polarized direction of the angle of 0°. Two kinds of the hologram screen 23 were prepared in accordance with the above two kinds of the S-polarization.

Figure 44:
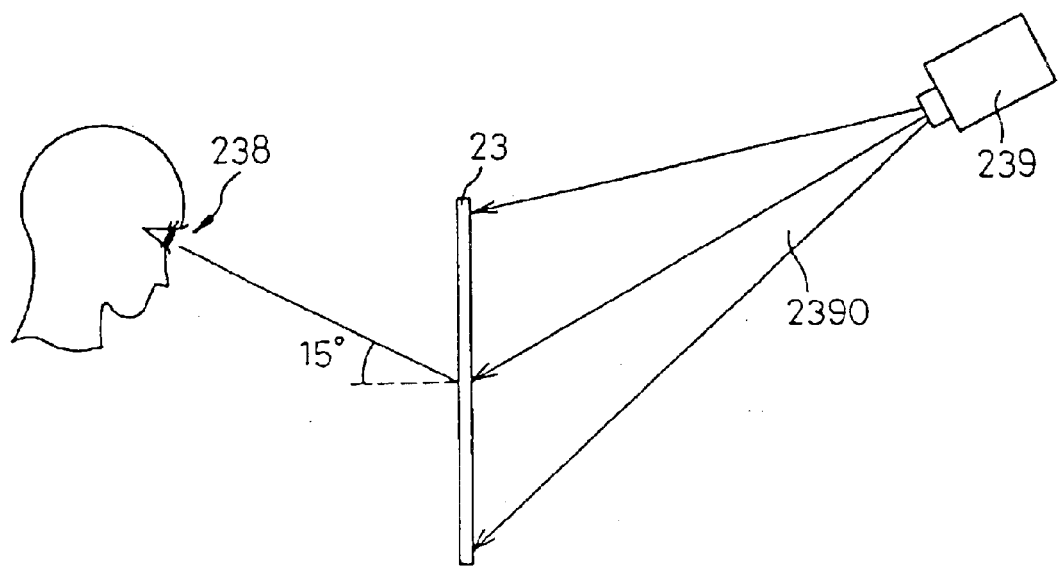
FIG. 44 is an explanatory view for an observing method of the hologram screen in the second embodiment of the second aspect of the present invention.

As shown in FIG. 44, the white image was projected by the image projector 239 from the upper and slant location to the hologram screen 23. The observer 238 observed the hologram screen 23 with the naked eye from the upper location of the angle 15°. As a result of observation, the whole of the screen becomes uniformly white on the hologram screen 23 according to the first embodiment. On the other hand, in the case of the S-polarization having the polarized direction of the angle of 0°, there was unevenness of brightness, i.e., bright portion "n" and dark portion "m", on the hologram screen as shown in FIG. 45.

Figure 45:
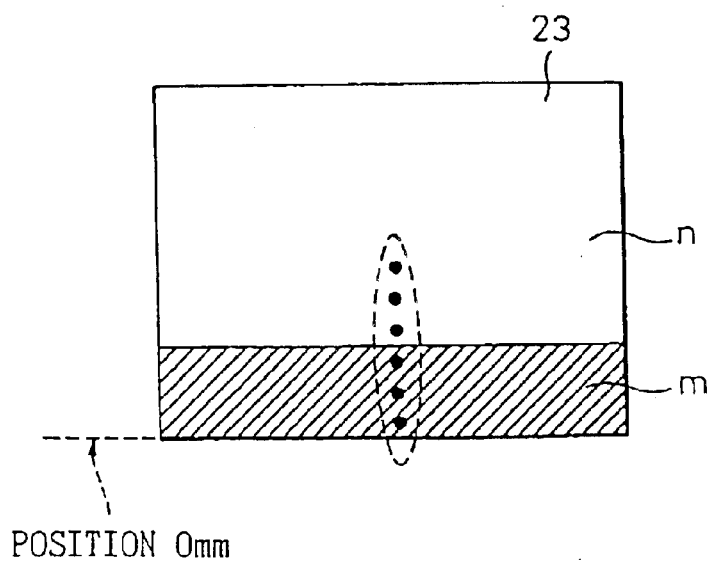
FIG. 45 is an explanatory view for a measuring method of the hologram screen in the second embodiment.
Figure 46:
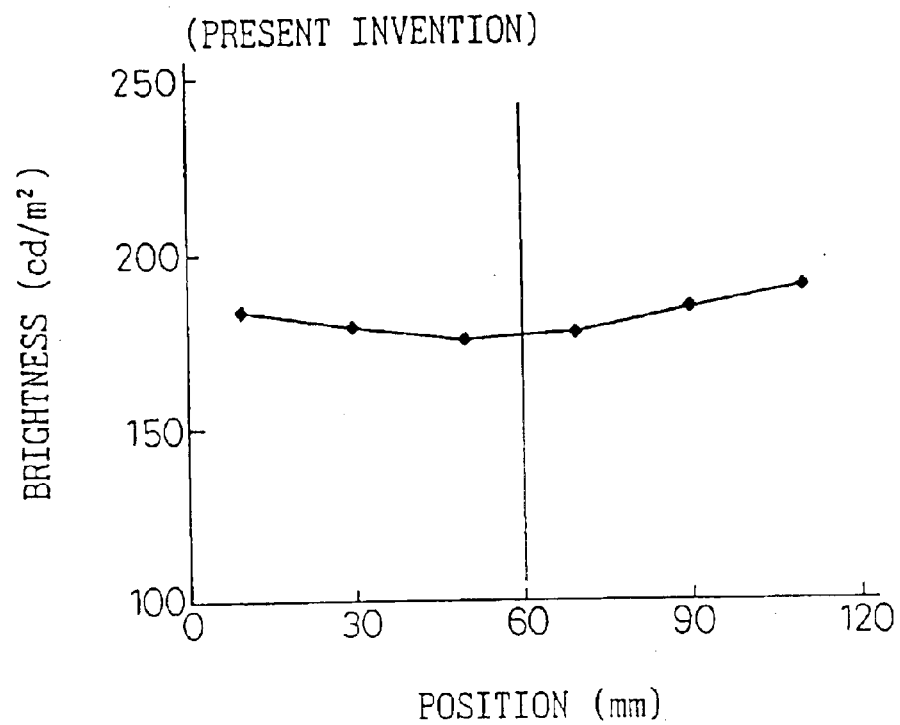
FIG. 46 is a graph for the relationship between measuring points and brightness on the hologram screen in the second embodiment.
Figure 47:
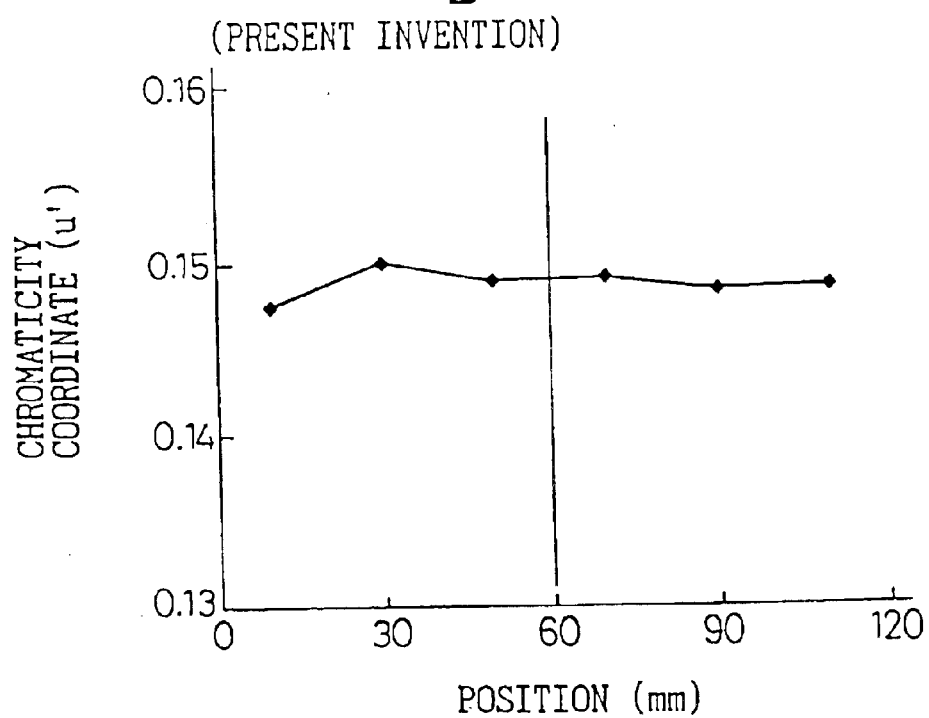
FIG. 47 is a graph for the relationship between measuring points and chromaticity coordinate (u') on the hologram screen in the second embodiment.
Figure 48:
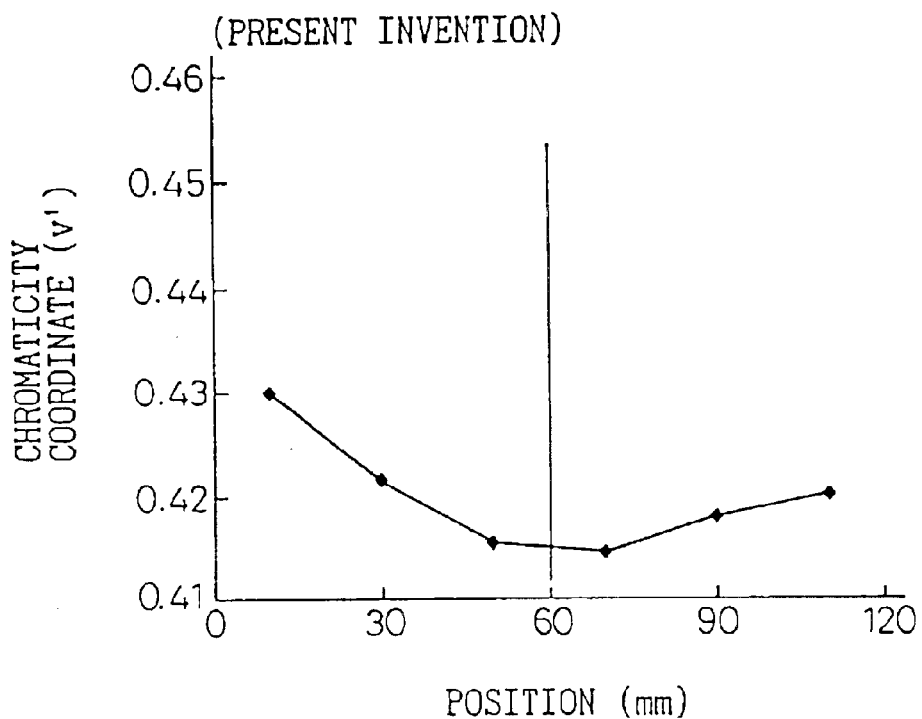
FIG. 48 is a graph for the relationship between measuring points and chromaticity coordinate (v') on the hologram screen in the second embodiment.
Figure 49:
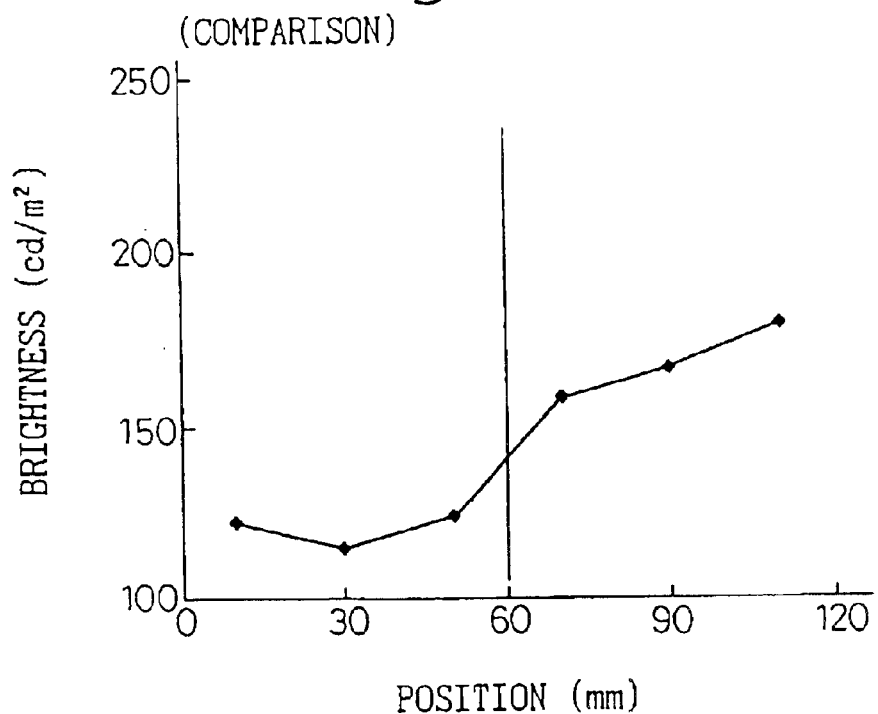
FIG. 49 is a graph for the relationship between measuring points and brightness on the hologram screen (compared example) in the second embodiment.
Figure 50:
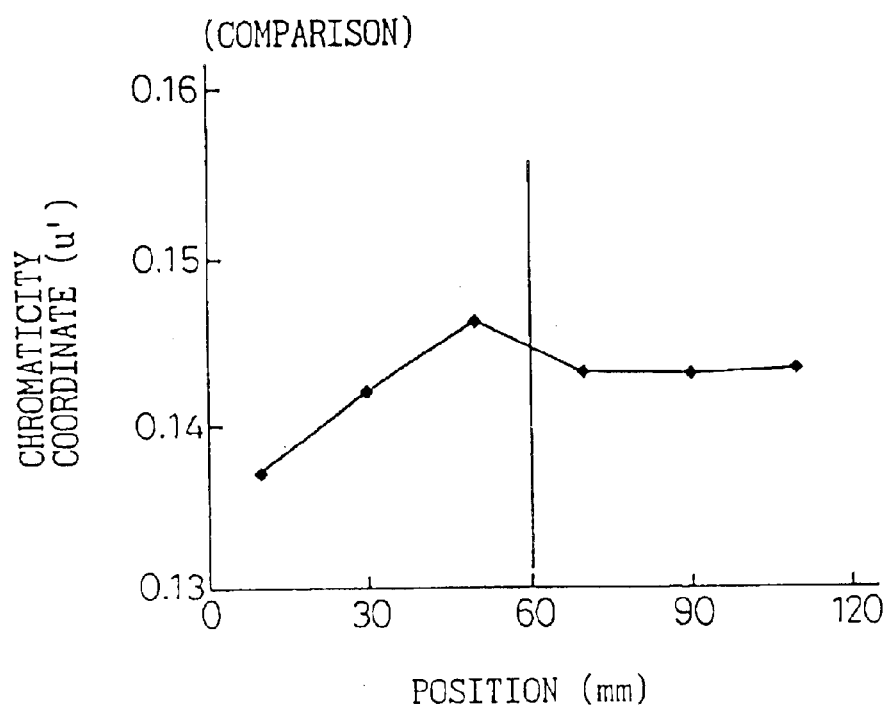
FIG. 50 is a graph for the relationship between measuring points and chromaticity coordinate (u') on the hologram screen (compared example) in the second embodiment.
Figure 51:
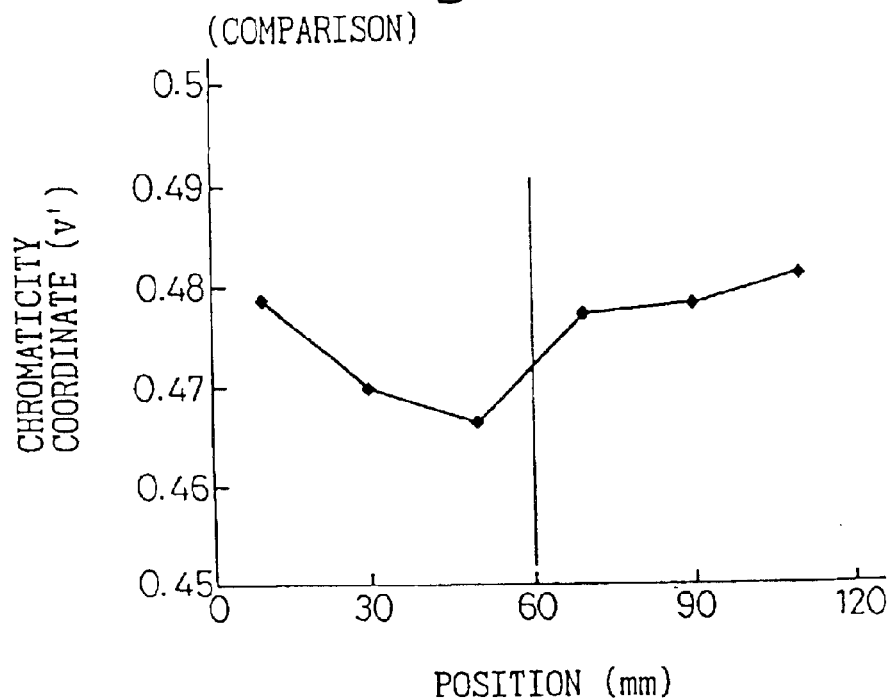
FIG. 51 is a graph for the relationship between measuring points and chromaticity coordinate (v') on the hologram screen (compared example) in the second embodiment.

That is, in FIG. 45, a boundary line was clearly imaged between the bright portion "n" and the dark portion "m" on the hologram screen 23, and the boundary line was located at the height of 60 mm from the bottom of the hologram screen. In this case, the dark portion "m" is considered as the range in which the light diffusion body was recorded by the object light which was reflected by the mirror. As is obvious, the above hologram screen corresponds to the hologram element 234 shown in FIG. 34.

In order to investigate in detail, a color brightness meter was arranged at the location of the observer's eye 238 as shown in FIG. 44, and the brightness and the chromaticity (u', v') were measured at six points (see, six dots in FIG. 45) for the CIE 1976 chromaticity coordinate (u', v') and JIS STANDARD Z-8729. The results of measurement were shown in FIGS. 46 to 51.

In FIGS. 46 to 51, the "position" on the abscissa is the height from the bottom of the hologram screen 23, and the measuring points is located at the distance of 200 mm from the left end of the hologram screen 23. As is obvious from FIGS. 46 to 51, in the hologram screen 23 according to the present invention, it is possible to eliminate the boundary line between the mirror and the light diffusion body, and to provide a screen having no difference in brightness and chromaticity.

Explanations of the Third Aspect of the Present Invention

Before describing the preferred embodiments, a conventional art and its problem are explained below. For example, a known hologram screen formed by the hologram elements has been disclosed in the Japanese Examined Patent Publication No. 52-12568. The above hologram screen is formed by the hologram element and the substrate for reinforcement in which the hologram element is bonded. As shown in FIG. 56, the image light 331, which is irradiated by the image projector 33 and formed by the still image or animated image, is scattered and diffused on the hologram element so as to form the output light 332. The output light 332 reaches the observer 35 so that the image is reproduced. The hologram element can be produced by irradiating the reference light 3118 and the object light 3117 on the photosensitive material 3120 in the exposure optical system 310 shown in FIG. 55.

Figure 61:
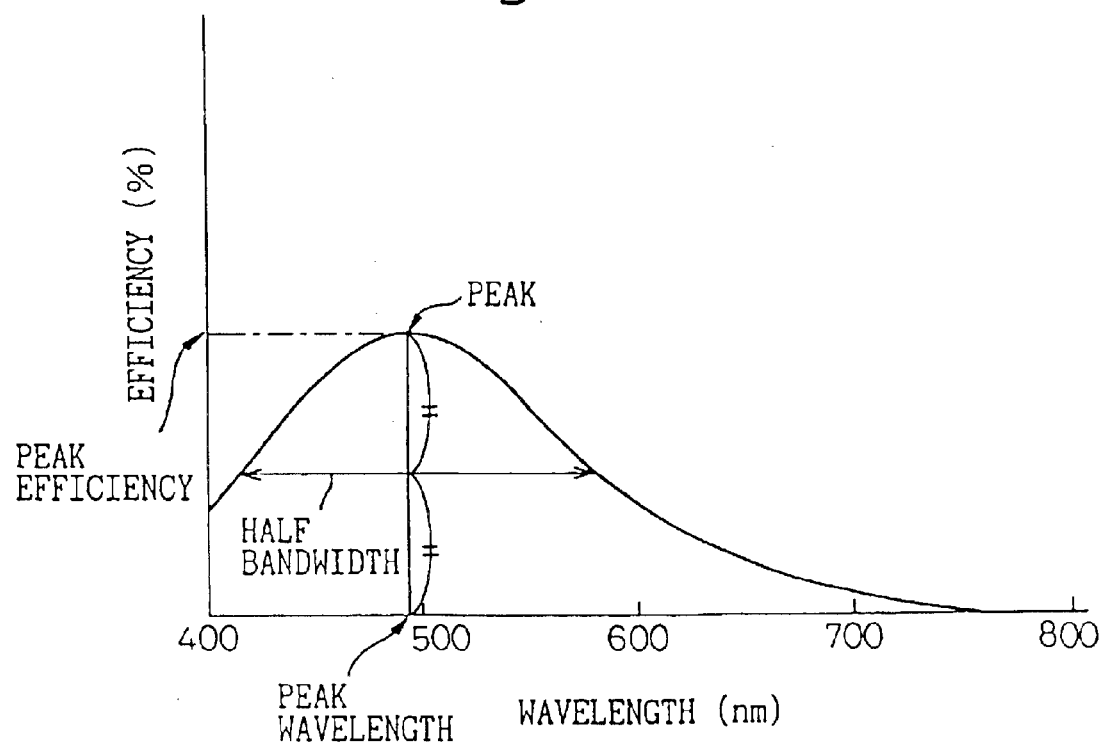
FIG. 61 is a graph for the relationship among the half bandwidth, the peak wavelength, and the peak efficiency in the spectrum of the hologram.

However, in the conventional hologram screen, the reproduced color tone of the image is different from the color tone of the image light 331 which is generated from the image projector 33. For example, the reproduced image becomes slightly green so that the quality of image deteriorates. This is because, as shown in FIG. 61, there is a peak at a particular wavelength range on the hologram spectrum in the hologram screen.

In the above mentioned document, i.e., JPP-52-12568, the laser oscillator which can generates red, green and blue light is provided in the exposure optical system 310, and one photosensitive material 3120 is multiply exposed by the red, green and blue lights, in order to resolve the above problem. Further, there is another method which has been already disclosed. That is, according to this method, the red, green and blue laser lights are separately used for exposing each photosensitive material, and three photosensitive materials each of which was exposed by the red, green and blue lights, are laminated each other so that one hologram element is produced.

In this method, however, it is necessary to prepare at least three laser oscillators each of which can generate the red, green and blue laser lights, or each of which can generate three kinds of wavelength. As a result, there is a problem in which a cost of the exposure optical system becomes high and production cost of the hologram screen is increased. Further, although it is necessary to arrange balance of each intensity of the red, green and blue laser lights, it is very difficult to perform this arrangement, and a lot of time is required in the manufacturing process.

Further, in this method, since the red, green and blue laser lights are used for exposing the photosensitive material, it is very difficult to arrange characteristic balance (i.e., RGB balance) between hologram elements each of which is recorded by the red, green and blue laser lights. As a result, strong unevenness of color partially occurs on the hologram screen so that color of the image, which is reproduced on the hologram screen, becomes worse.

Still further, in the above hologram element, three kinds of light diffusion bodies are recorded by the red, green and blue laser lights. As a result, an external light is easily diffracted and scattered in this hologram screen so that the hologram element becomes cloudy. The transparency becomes worse on the cloudy hologram element so that appearance also becomes worse.

The third aspect of the present invention aims to solve the above problems. That is, the third invention has superior color reappearance on the hologram screen. Further, when producing the hologram element which forms the hologram screen, it is possible to utilize either a single laser light, or two color (red and green) laser lights. Still further, it is possible to provide the hologram screen having a low producing cost and a simplified producing process, as explained in detail below.

According to the invention defined in claim 14, the image light, which is irradiated from the image projector, is scattered and diffused on the hologram screen so that the output light is obtained and the image is reproduced on the hologram screen.

The method of producing the hologram element is characterized in that the half bandwidth of the hologram spectrum is 100 nm or more, and the diffusion light obtained by the light diffusion body in which the light diffusion angle is large, is used as the object light, and the non-diffusion light is used as the reference light; and both lights are irradiated on to the photosensitive material in order to form the interference fringe thereon.

Figure 53:
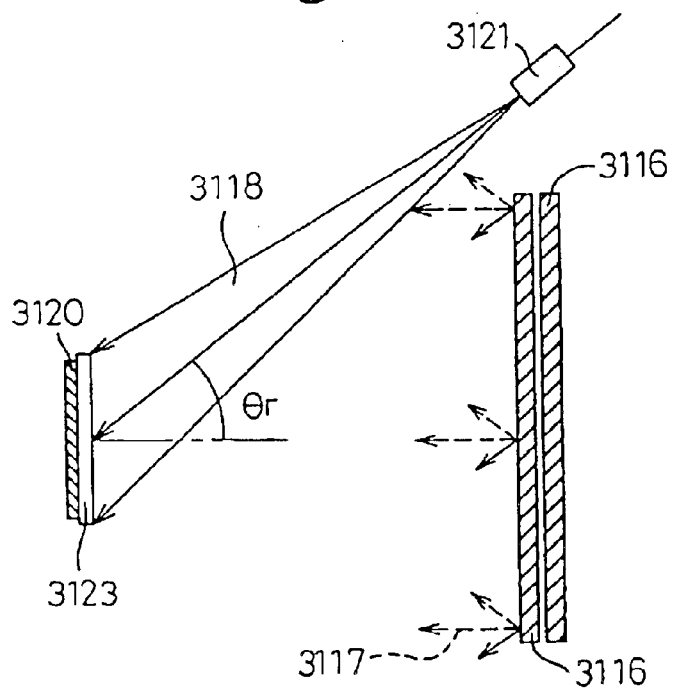
FIG. 53 is an explanatory view for the essential parts of the exposure optical system according to a first embodiment of the third aspect of the present invention.

The hologram spectrum is defined as the intensity (i.e. efficiency) for each wavelength of the output light which is scattered and diffused on the hologram screen (see FIGS. 53 and 61). The abscissa is the wavelength, and the ordinate is the efficiency. Further, the efficient is a ratio of the intensity of the output light and the intensity of the incident light.

As shown in FIG. 61, in the hologram spectrum, the wavelength at the extreme value of the efficiency is the peak wavelength, and the width of the peak at the location of a half of the extreme value is defined as the half bandwidth. When the half bandwidth becomes small, the peak of the hologram spectrum becomes sharp. When the half bandwidth becomes large, the peak of the hologram spectrum becomes gentle. Further, the shape of the hologram spectrum becomes flat when the half bandwidth is large, and the efficiency for each wavelength becomes uniform.

As mentioned above, in the third aspect of the present invention, the half bandwidth of the hologram spectrum is 100 nm or more. Accordingly, it is possible to obtain the output light by scattering and diffusing without emphasis of the particular wavelength of the image light, and to obtain the hologram screen which can reappear clearly the color tone of the image light (see FIGS. 62 and 63).

Further, as mentioned above, the object light is prepared by the light diffusion body in which the light diffusion angle is large, the scattering extent becomes large. Since the object light is irradiated, the half bandwidth of the hologram spectrum of the hologram element becomes 100 nm or more (see FIGS. 57 and 58).

Further, since the hologram element is prepared by the laser light having the monochrome or two colors (i.e., red and green), there is no problem mentioned in the conventional art. That is, since the hologram element is prepared by using the exposure optical system having the laser oscillator which can generate the laser light having the single color or two colors, it is possible to realize low producing cost. Further, since it is not necessary to arrange the intensity balance of three laser lights each having different wavelength, it is possible to realize easy production. Further, since the hologram element is prepared by the laser light having the monochrome or two colors, there is no scattering and diffusion due to the external light and no cloudiness on the hologram screen so that it is superior in the transparency.

In the third aspect of the present invention, since the hologram element is transparent, the observer can see through the back of the hologram screen when the image is reproduced. Accordingly, it is very effective to utilize the hologram screen of the third aspect of the present invention as the advertising board in the shopping center, or as the ticket window. When the image light is not irradiated on the hologram screen, the hologram screen is merely transparent plate so that there is no influence for the view field.

On the other hand, when the half bandwidth of the hologram screen is 100 nm or less, since the output light is emphasized for the particular wavelength band, the color reappearance of the image light may become worse. Since the half bandwidth becomes large, the hologram spectrum becomes flat and the color reappearance of the image light is improved. However, since a human eye can recognize only visible ray, it is sufficient to set the half bandwidth to approximately 400 nm.

As the light diffusion body in which the light diffusion angle is large, it is possible to utilize a double-faced ground glass, an one-faced ground glass, and an opal glass. Further, as a method for enlarging the light diffusion angle of the light diffusion body, for example, there is the method for enlarging the light diffusion angle by laminating a plurality of light diffusion bodies. Further, there is the method for changing the scattering characteristic of the light diffusion body itself by changing the material of the light diffusion body, or providing the surface process on the light diffusion body. Still further, it is possible to realize the large light diffusion angle by combining lens array. In this case, by partially changing the f-value of the lens, it is possible to partially change the scattering characteristic of the light diffusion body, and to obtain the good scattering characteristic.

The above light diffusion angle will be explained in detail below. The scattering light is generated by irradiating the laser light perpendicularly to the light diffusion body. At that time, when the intensity of the laser light which transmitted perpendicularly to the light diffusion body is set to 100, the efficiency of the scattering light for each output angle is measured. In this case, the output angle at the efficiency of 50% is the light diffusion angle (see the first embodiment).

According to the invention defined in claim 15, the light diffusion angle is preferable at the time when the light diffusion angle of the hologram screen is 10° or more. In this angle, it is possible to obtain the hologram screen having superior reappearance. When the light diffusion angle of the hologram screen is 100 or less, the scattering extent of the object light becomes small, it is difficult to obtain the hologram element having the half bandwidth mentioned above. Further, although the color reappearance becomes good when the light diffusion angle of the light diffusion body becomes large, the brightness of the image becomes worse so that it is difficult to watch the image. Accordingly, it is preferable to set the upper limit of the light diffusion angle to the angle 60°. Still further, when the hologram screen shown in FIG. 56 is used as the display apparatus, it is preferable to set the light diffusion angle in the range from 36° to 50°.

According to the invention defined in claim 16, the half bandwidth of the hologram spectrum is 100 nm or more. The diffusion light obtained by the light diffusion body is used as the object light, and the non-diffusion light is used as the reference light. The object light and the reference light are irradiated on the photosensitive material having the thickness of 1 to 20 μm in order to from the interference fringe on the hologram element. Accordingly, it is possible to obtain the scattered and diffused output light without emphasis of the particular wavelength of the image light. As a result, it is possible to realize the hologram screen which can preferably represent the color tone of the image.

Figure 64:
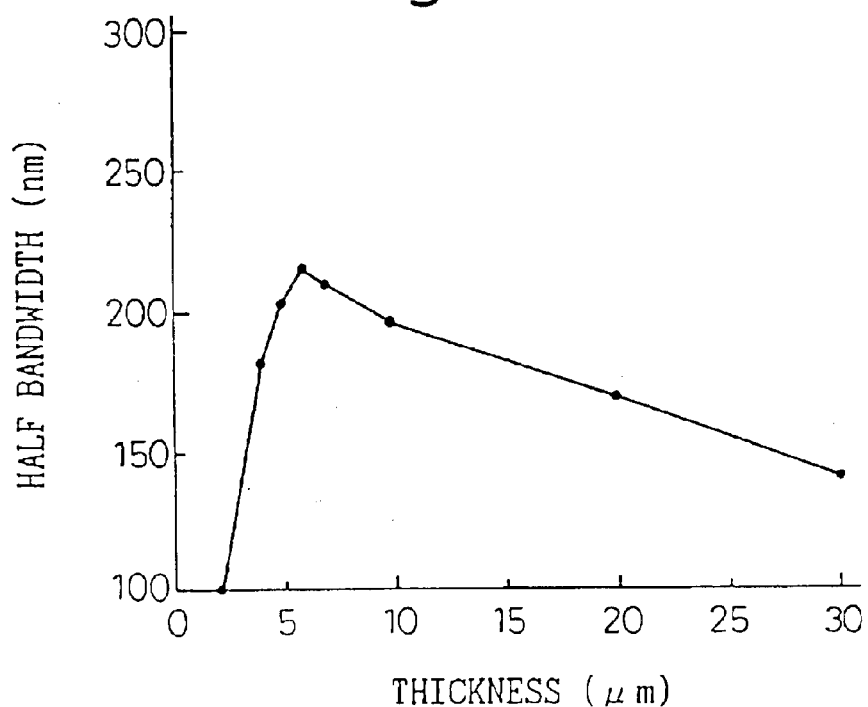
FIG. 64 is a graph for the relationship between thickness of the photosensitive material and the half bandwidth in the second embodiment of the second aspect of the present invention.
Figure 65:
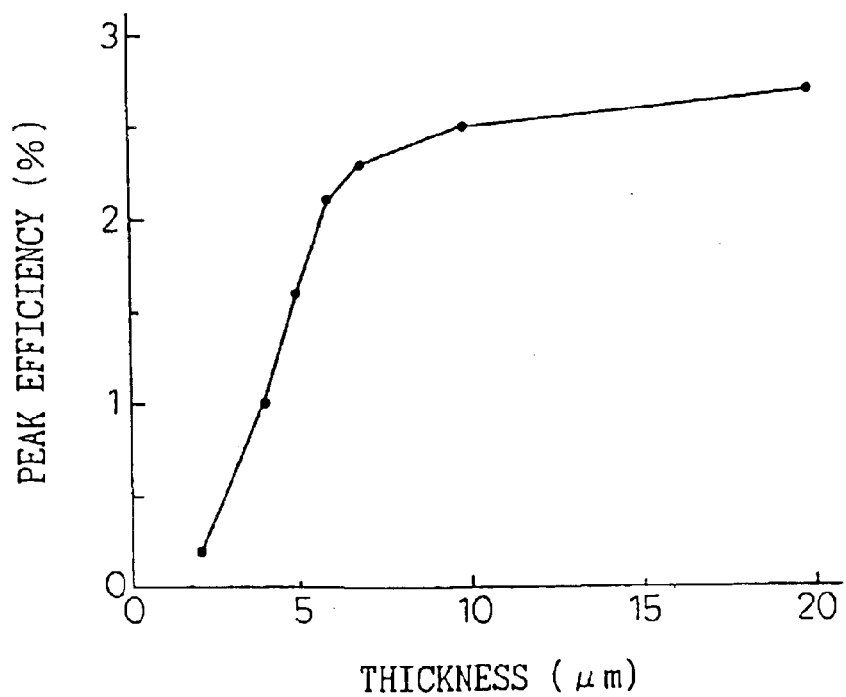
FIG. 65 is a graph for the relationship between the thickness of the photosensitive material and the peak efficiency in the second embodiment.

As shown in FIGS. 64 and 65, and in the second embodiment, when the thickness of the photosensitive material is changed, the half bandwidth is changed and the peak efficiency (the efficiency at the extreme value of the hologram spectrum) is also changed. Accordingly, it is possible to obtain the hologram element having the above mentioned half bandwidth by using the photosensitive material having the above mentioned thickness.

Since the above mentioned hologram element can be produced by using laser light having the monochrome or two colors, it is possible to obtain the hologram screen having the following features, i.e., low producing cost, simplified producing processes, and high transparency.

On the other hand, when the thickness of the photosensitive material is 1 μm or less, the image becomes very dark since the efficiency of the hologram element is too low so that the observation of the image becomes very difficult. Further, when the thickness of the photosensitive material is 20 μm or more, the half bandwidth is 100 nm or less so that the color at the particular wavelength becomes strong and the color reappearance becomes worse.

According to the invention defined in claim 17, the peak wavelength of the hologram spectrum is either 525 nm or less, or 585 nm or more. Further, the half bandwidth of the hologram spectrum is 100 nm or more. After the interference fringe was formed on the photosensitive material, the hologram element is produced by adjusting the refractive index of the photosensitive material.

Figure 68:
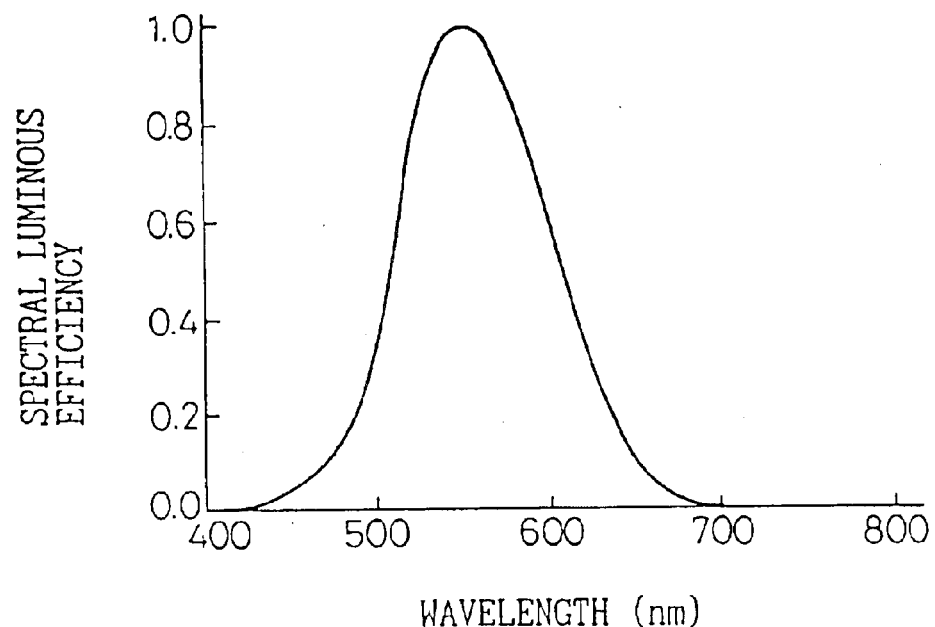
FIG. 68 is a graph for the relationship between a spectral luminous efficiency and the wavelength in the fourth embodiment.

On the other hand, there is a wavelength dependency in the sensitivity of the human eye (a relative luminosity factor (i.e., a sensitivity of a human eye)) as shown in FIG. 68. That is, as shown in FIG. 68, the spectral luminous efficiency becomes the highest (strongest) when the wavelength is 555 nm.

In the third aspect of the present invention, the peak wavelength of the hologram spectrum is either 525 nm or less, or 585 nm or more. The spectral luminous efficiency at these wavelengths are 80% for the sensitivity at the peak wavelength, i.e., 555 nm. Accordingly, it is possible to obtain the hologram screen which can reappear the original color tone of the image light without the particular wavelength on the image light.

That is, an amount of change of the refractive index of the photosensitive material is controlled by adjusting the process conditions from before exposure of the photosensitive material until after production of the hologram screen, and it is possible to realize the hologram screen having good color-reappearance.

In the case of a volume phase type hologram which records the interference fringe by utilizing a refractive index modulation of the photosensitive material, although the extent of the amount of change of the refractive index is slightly changed depending on the photosensitive material to be used, the above extent is strongly depended to the exposure conditions and the process conditions before and after the exposure.

According to the Bragg's formula, $$2nd \cdot \sin \theta = \lambda \qquad (8)$$

Where, "n" is a refractive index of the photosensitive material, "d" is a pitch of the interference fringe, θ is a half of an intersected angle of the reference light and the object light, and λ is a recorded wavelength.

The pitch "d" of the interference fringe is determined at the exposure, and the amount of change Δn of the refractive index is determined after completion of all processes. The reproduced wavelength λ' at the reproduction of the hologram element can be expressed by the following formula.

$$\lambda' = 2(n+\Delta n)d \cdot \sin \theta \qquad (9)$$

As is obvious from the formula (9), when the amount of change Δn of the refractive index becomes large, the reproduced wavelength λ' becomes long. As mentioned above, it is possible to obtain a desired peak wavelength by suitably determining the amount of change Δn.

Further, a diffractive efficiency η is also changed depending on the amount of change Δn. When the hologram is the phase and transmittion-type hologram, the following formula is given theoretically.

$$\eta = \sin 2\theta$$

$$\theta = n \cdot \pi \cdot \Delta n \cdot T/(\lambda c) \cdot (n^2 - \sin^2 \theta)^{1/2} \qquad (10)$$

As is obvious from the above formula, the diffractive efficiency η is influenced by the amount of change Δn.

Further, there is a feature in which the diffractive efficiency η is changed sinusoidally. In this case, however, since the above formula is given for a simple lattice (i.e., the hologram is formed by one reference light and one object light), the above formula becomes more complicated when there are a plurality of object lights according to the present invention.

Figure 84:
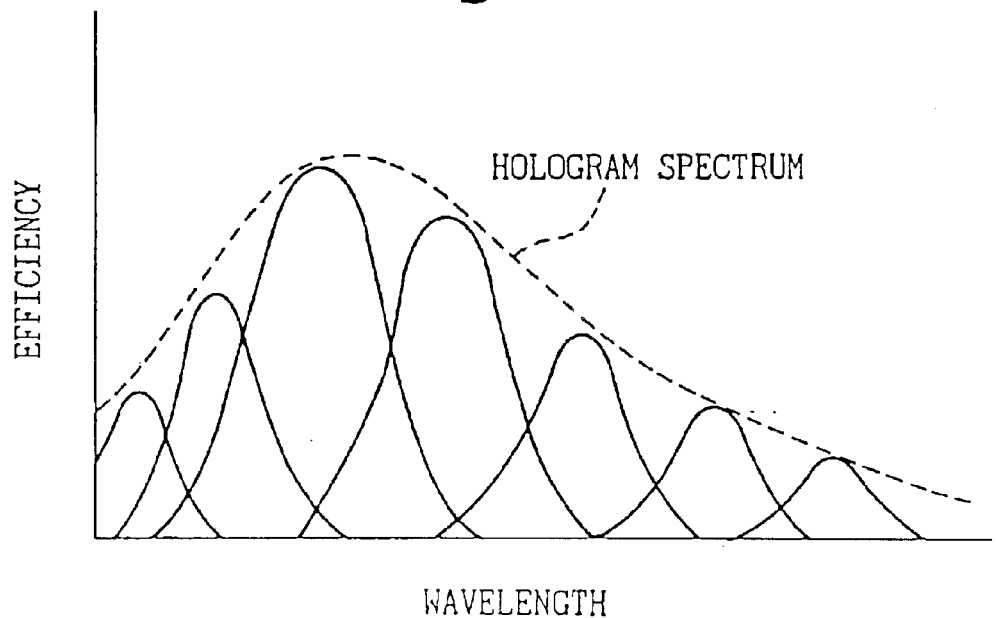
FIG. 84 is a graph for the relationship between the efficiency and the wavelength in the spectrum of the hologram.

The hologram spectrum is formed as shown in FIG. 84. When there are a plurality of object lights according to the present invention, one inclined interference fringe (i.e., a diffraction lattice) is formed for one object light (i.e., an object light having one direction). That is, it is possible to form the interference fringe which has different inclinations (i.e., diffraction lattice) depending on the irradiated direction of the object light at the location on the light diffusion body. The difference of the wavelength occurs depending on the difference of inclination when reproducing the white light.

Figure 78:
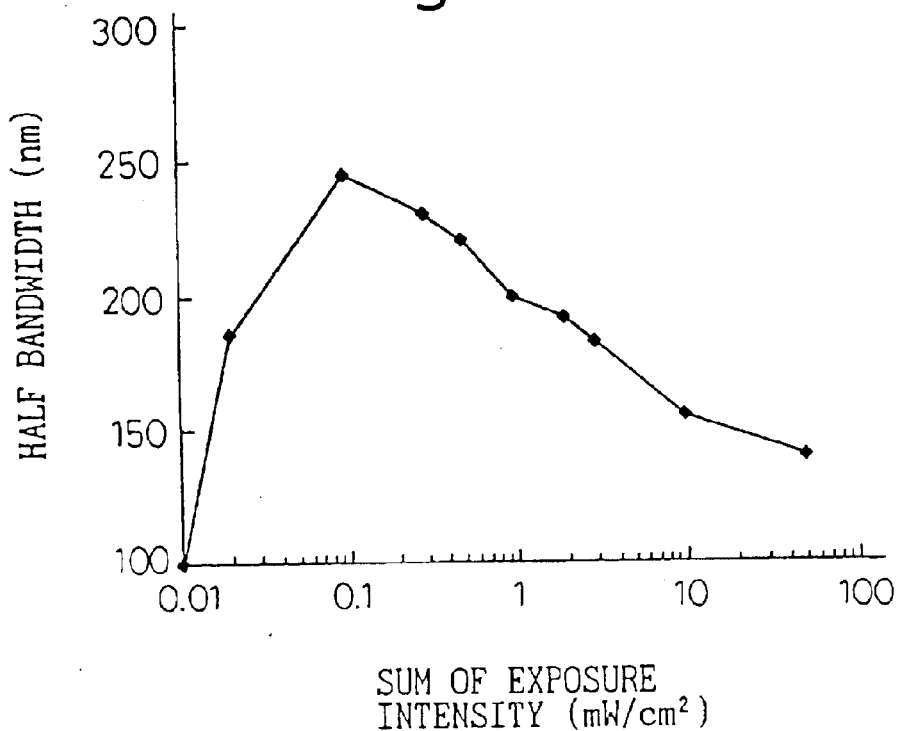
FIG. 78 is a graph for the relationship between a sum of the exposure intensity and the half bandwidth in the seventh embodiment.

The difference of the wavelength is shown by the solid lines in FIG. 84. The diffraction efficiency η is also changed depending on the reproduced wavelength λc. Accordingly, the efficiency is different due to the reproduced wavelength as shown in FIG. 78. As a result, the hologram spectrum on the hologram screen is formed as shown by dotted line in FIG. 84, from a sum of the wavelengths shown by the solid lines. Accordingly, the efficiency is changed based on the amount of change Δn of the refractive index for each wavelength, and the shape of the hologram spectrum, i.e., the half bandwidth is also changed.

As mentioned above, by changing the amount of change Δn of the refractive index of the photosensitive material after completion of all processes, it is possible to change not only the reproduced wavelength, but also the half bandwidth. As a result, by suitably adjusting the amount of change Δn of the refractive index, it is possible to adjust the peak wavelength at the hologram spectrum to either 525 nm or less, or 585 nm or more, and to adjust the half bandwidth to 100 nm or more. Further, it is possible to adjust the half bandwidth based on the exposure intensity, the intensity ratio of the reference light and the object light (R/O), and the heat conditions after exposure.

According to the invention defined in claim 18, after completion of the interference fringe, the heating process is provided to the photosensitive material in the range of 80° to 150°. There are some kinds of photosensitive materials in which the refractive index can be adjusted by the heating process after exposure and the efficiency of the hologram element is increased. The amount of change Δn of the refractive index is changed based on the heating conditions.

When the heating process is performed, as is obvious from the formula (9), the peak wavelength at the hologram spectrum can be adjusted to 525 nm or less, or 585 nm or more, and the half bandwidth can be adjusted to 100 nm or more. In this case, when the temperature at the heating process is 80° C. or less, the image becomes dark so that it is difficult to observe the image. On the other hand, when the temperature exceeds 150° C., and when a film is used as the photosensitive material, the film may be deformed. Further, the color of the image may be worse due to color of the photosensitive material itself.

Further, it is preferable to set the continuous heating time in the range of 1 minute to 10 hours. When the heating time is 1 minute or less, the efficiency may be worse. On the other hand, when the heating time exceeds 10 hours, deformation and color may occur in the photosensitive material, and productivity of the hologram screen becomes worse.

Figure 80:
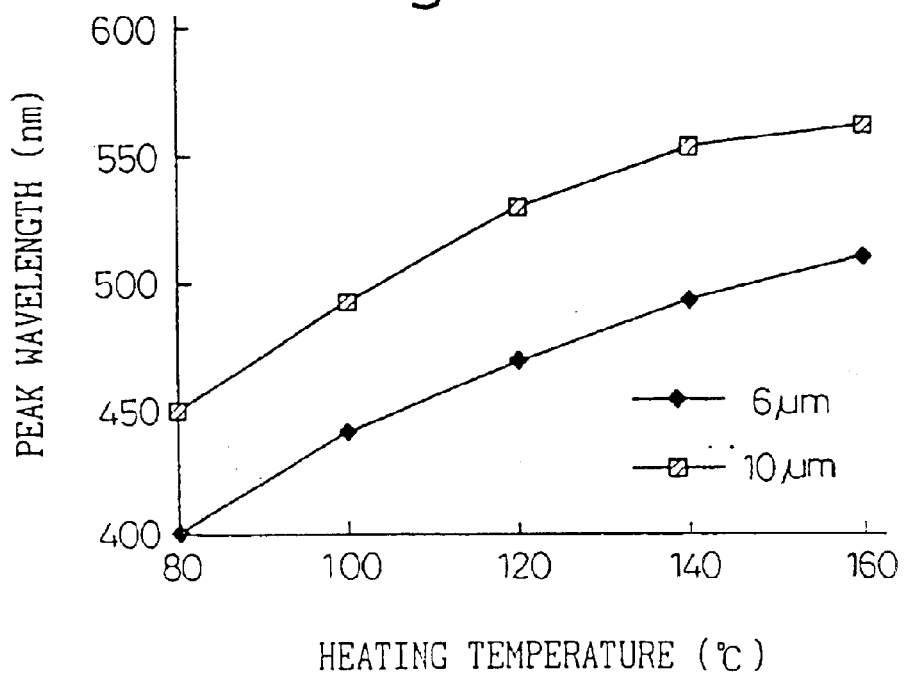
FIG. 80 is a graph for the relationship between the heating temperature and the peak wavelength in the eighth embodiment.
Figure 81:
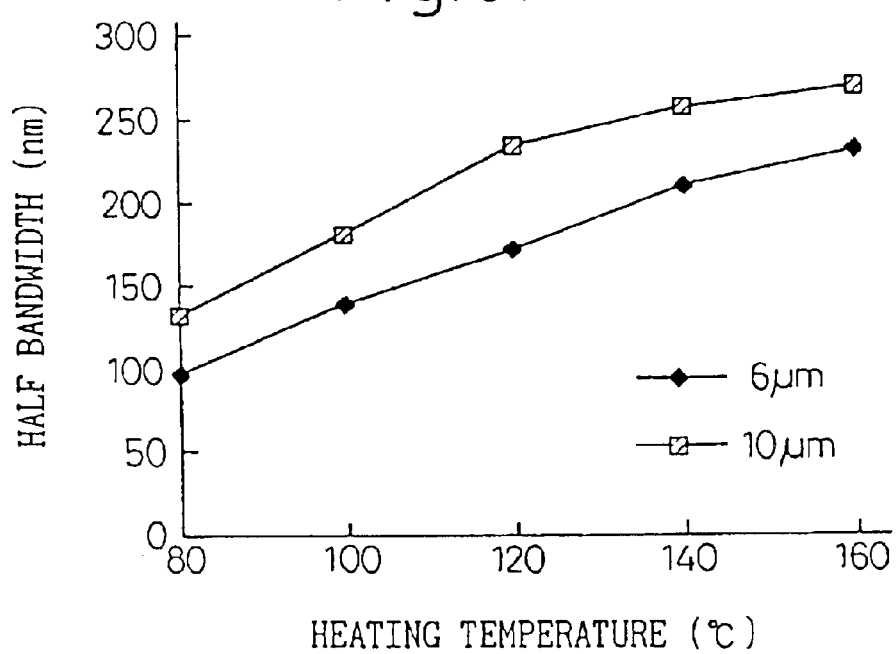
FIG. 81 is a graph for the relationship between the heating temperature and the half bandwidth in the eighth embodiment.

Still further, the optimum temperature for the heating process is different in accordance with kinds of photosensitive material to be used. For example, as shown in FIGS. 80 and 81, the peak wavelength is changed in accordance with the heating temperature and the heating time. The heating conditions is changed in accordance with kinds of photosensitive material, various conditions of the exposure optical system, and desired characteristics so that it is very difficult to uniformly determine the conditions. However, in the case of the photopolymer made by Dupont Co., Ltd., it is preferable to set the temperature to 100° C. to 150° C., and to set the heating time to 2 hours or less.

Further, the heating method is performed within a oven so as not to contact the photosensitive material (front and back surfaces) to other parts during the heating. If the photosensitive material contacts to other parts, the difference in thermal conductivity occurs between these parts so that unevenness of color brightness occur when reproducing the image.

According to the invention defined in claim 19, a sum of an exposure intensity of the object light and the exposure intensity of the reference light is set within 0.02 to 50 mW/cm$^2$, and the object light and reference light are irradiated onto the photosensitive material to form the interference fringe in order to provide the hologram element.

As mentioned in the formula (8), the reproduced wavelength is changed in accordance with the amount of change Δn of the refractive index which can be changed by the exposure intensity.

For example, in the case of the polymer made by Dupont Co., ltd., as disclosed in the document "Holographic transmission elements using improved photopolymerfilms" by William J. Gambogi et al., SPIE Vol. 1555, Computer and Optically Generated Holographic Optics (Fourth in a Series), 1991, pp 256–267, when the exposure intensity becomes weak, the amount of change Δn of the refractive index becomes large after completion of all processes.

Accordingly, when the exposure intensity becomes weak, the reproduced wavelength λ' becomes long. On the other hand, when the exposure intensity becomes strong, the reproduced wavelength λ' becomes short. As mentioned above, since it is possible to change the reproduced wavelength by changing the exposure intensity, it is possible to adjust the peak wavelength at the hologram spectrum to either 525 nm or less, or 585 nm or more, by suitably adjusting the exposure intensity. Further, based on the formula (10), it is possible to adjust the half bandwidth so as to become 100 nm or more.

When the sum of the exposure intensity is 0.02 mW/cm$^2$ or less, there are problems in which the intensity becomes very weak, and the exposure time becomes very long, so that unevenness of color may be occur on the hologram screen. On the other hand, when the sum of the exposure intensity is 50 mW/cm$^2$ or more, there are problems in which the peak wavelength becomes very short, and the half bandwidth becomes very narrow, so that the color of the reproduced image becomes considerably worse.

When the exposure intensity is constant, it is possible to change the peak wavelength and the half bandwidth at the hologram spectrum in accordance with the intensity ratio (R/O) of the object light and the reference light. That is, as defined in claim 20, the intensity ratio of the object light (O) and the reference light (R) is set to 0.1 to 30, and the object light and the reference light are irradiated onto the photosensitive material in order to form the interference fringe. As is obvious in FIGS. 66 and 67, and the third embodiment, when the intensity ratio R/O becomes small, the half bandwidth becomes large so that it is possible obtain the superior hologram element.

Since the hologram element can be prepared by using the laser light having the monochrome or two colors (red and green), there is no problem in the third invention compared to the conventional art which utilizes the multicolor laser. That is, it is possible to realize the hologram element having low producing cost, easy producing process, and good transparency.

When the intensity ratio R/O is 0.1 or less, the transparency of the hologram screen becomes worse. However, when there is no problem if the transparency becomes worse, it is possible to set the intensity ratio R/O to a small value in the range in which the hologram efficiency is not decreased. In this case, the half bandwidth becomes wide, and the color reappearance becomes very good. Further, when the intensity R/O is larger than 30, the half bandwidth becomes small and the color reappearance becomes worse.

According to the invention defined in claim 21, the peak wavelength of the hologram spectrum is either 525 nm or less, or 585 nm or more. The hologram element is produced by adjusting the thickness of the photosensitive material after completion of the interference fringe.

When the thickness of the photosensitive material is changed from the thickness at the exposure after completion of all processes, the pitch "d" of the interference fringe is also changed after completion of all processes. When the amount of change is given to $\Delta d$, the reproduced wavelength $\lambda'$ is given by the formula (1) as follows when the hologram is reproduced.

$$\lambda' = 2n(d+\Delta d)\sin\theta \qquad (11)$$

Accordingly, if the thickness of the photosensitive material after completion of all processes is larger than the thickness at the exposure, the reproduced wavelength $\lambda'$ becomes long. On the other hand, if the thickness of the photosensitive material after completion of all processes is smaller than the thickness at the exposure, the reproduced wavelength $\lambda'$ becomes short.

According to the invention defined in claim 22, the peak wavelength of the hologram spectrum is either 525 nm or less, or 585 nm or more, in order to avoid the peak wavelength for the relative luminosity factor. Further, the reference light and the image light are irradiated onto the photosensitive material to form the interference fringe in such a way that the incident angle $\theta r$ of the reference light on the photosensitive material is different from the incident angle $\theta e$ of the image light on the hologram screen. As a result, it is possible to reproduce the image light with superior color tone without emphasis of the particular wavelength of the image light.

In this case, the reproduced wavelength $\lambda c$ is given by the following formula (5).

$$2nd\cdot\sin\theta e = \lambda c \qquad (12)$$

Where, "n" and "d" are not changed after exposure and after production of the hologram element. Accordingly, when the incident angle $\theta e$ of the image light onto the hologram screen is larger than the incident angle $\theta r$ of the reference light, the reproduced wavelength $\lambda c$ becomes shorter than the recorded wavelength. On the other hand, when the incident angle $\theta e$ of the image light onto the hologram screen is smaller than the incident angle $\theta r$ of the reference light, the reproduced wavelength $\lambda c$ is shifted to the wavelength which is longer than the recorded wavelength (see FIG. 22). As a result, it is possible to obtain the hologram element having the peak wavelength of either 525 nm or less, or 585 nm or more.

According to the invention defined in claim 23, it is preferable that an amount of angle correction, which is the difference between the incident angle $\theta r$ of the reference light and the incident angle $\theta e$ of the image light, is in the range of −50 to +50. As a result, it is possible to obtain the hologram screen having the superior color reappearance. When the amount of angle correction is out of the above range, there is a problem in which the efficiency of the hologram is decreased, and the image becomes dark.

According to the invention defined in claim 24, the half bandwidth of the hologram spectrum is 100 nm or more. As a result, it is possible to obtain the scattered and diffused output light without emphasis of the particular wavelength of the image light. As a result, it is possible to obtain the same effect as the case which enlarges the scattering extent of the object light, and the half bandwidth of the hologram spectrum becomes 100 nm or more.

The preferred embodiments of the third aspect of the present invention will be explained in detail below.

(First Embodiment)

The first embodiment is explained in detail with reference to FIGS. 53 to 63. As shown in FIG. 56, the image light 331 from the image projector 22 is scattered and diffused on the hologram screen 31 so that it is possible to obtain the output light 332. As a result, the image is reproduced on the hologram screen 31. In this case, the half bandwidth of the hologram spectrum is 100 nm or more on the hologram screen (see FIG. 61).

Figure 54:
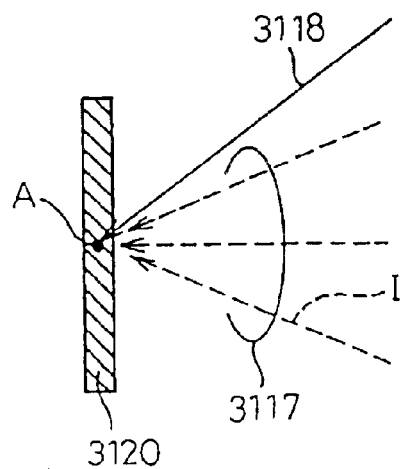
FIG. 54 is an explanatory view for the object light, the reference light and the photosensitive material in the exposure optical system in the first embodiment shown in FIG. 53.
Figure 55:
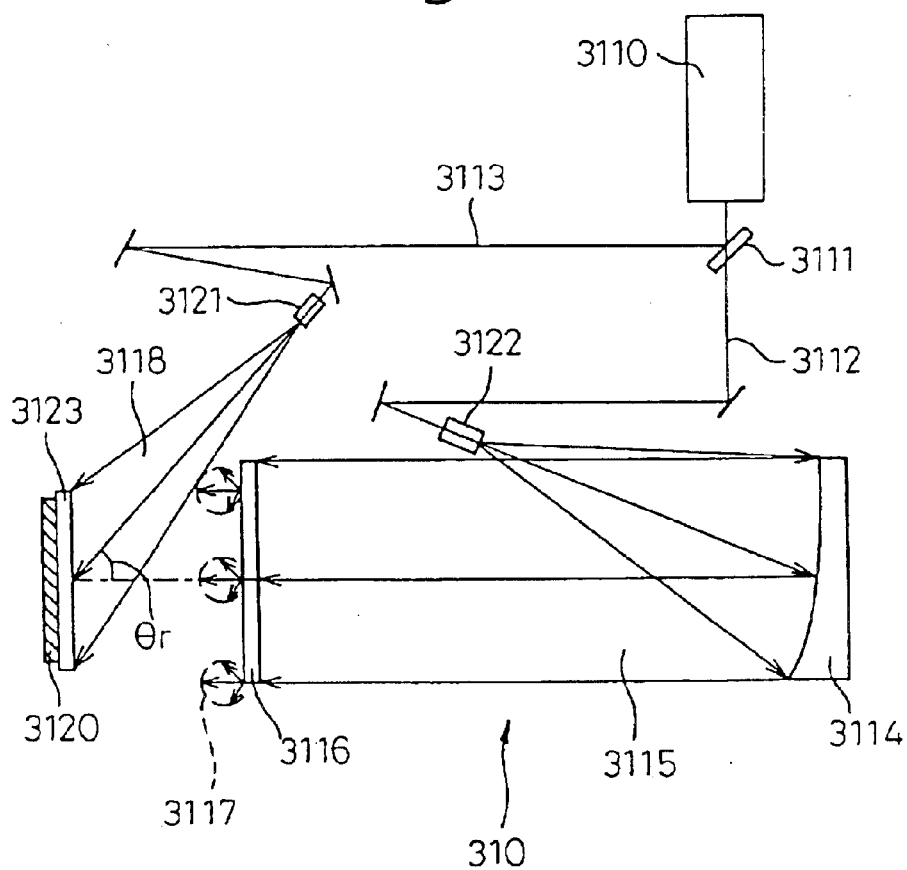
FIG. 55 is an explanatory view for the exposure optical system according to the first embodiment.
Figure 56:
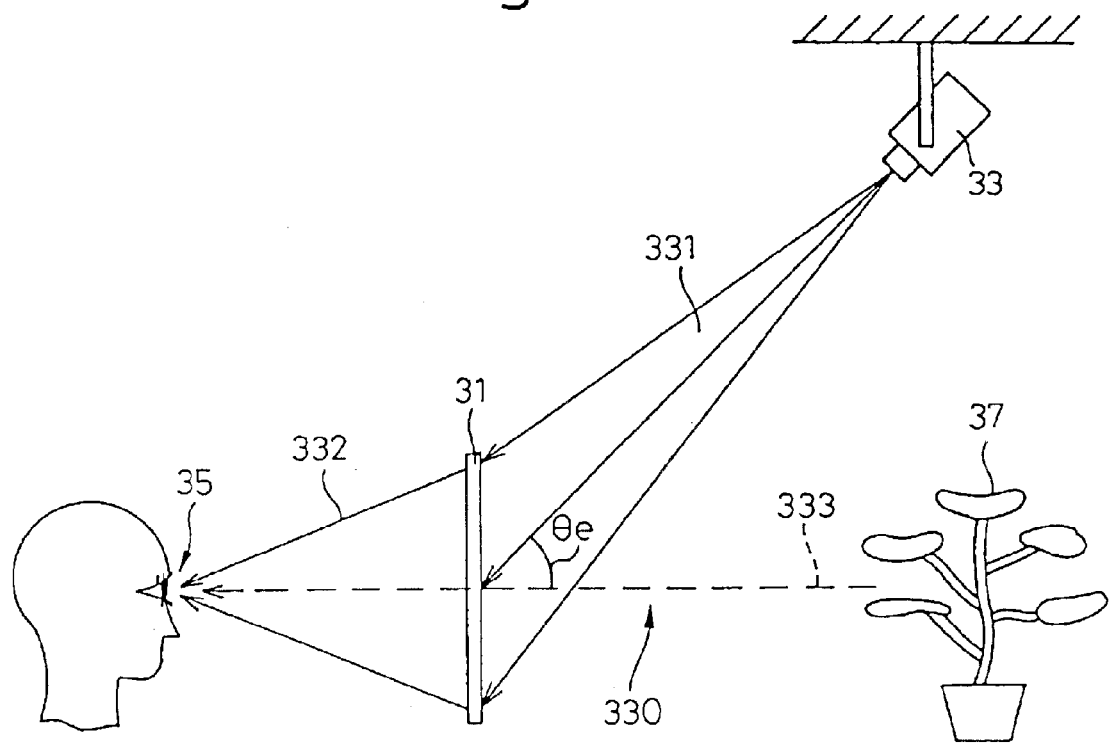
FIG. 56 is an explanatory view for the display apparatus using the hologram screen according to the first embodiment of the present invention.

As shown in FIGS. 53 to 55, the hologram screen 31 is formed by the hologram element which is prepared by the interference fringe. That is, the diffusion light passing through the light diffusion body 3116 having the large light diffusion angle is used as the object light 3117, and the non-diffusion light is used as the reference light 3118. The object light 3117 and the reference light 3118 are irradiated onto the photosensitive material 3120 in order to form the interference fringe.

As shown in FIG. 56, the display apparatus 330 is formed by the hologram screen 31, the image projector 33 and an image supply apparatus (not shown). The image projector 33 is arranged to the upper location opposite to the observer 35. In this embodiment, the hologram element is the transmission type, and the hologram screen is formed by the hologram element and the transparent board bonded to the hologram element in order to support the same.

The image light 331 from the image projector 33 is scattered and diffused on the hologram screen 31 so that it is possible to obtain the output light 332. As a result, the observer 35 can observe the reproduced image on the hologram screen 31. Since the hologram element is formed by the transparent material, it is possible to transmit the back light 333 of the background 37 which is arranged opposite to the observer 35. Accordingly, the observer can observe the background 37 with the image on the hologram screen 31. In this case, the image projector 33 may be arranged to the location lower than the observer 35 in the opposite side of the observer 35. On the other hand, it is possible to form the hologram screen by using the reflection type hologram element.

In the exposure optical system 310 shown in FIG. 55, the laser light oscillated by the laser oscillator 3110 is separated into two lights by the beam splitter 3111 so as to form two separated lights 3112 and 3113. The separated light 3112 becomes the divergent light after passing through the object lens 3122, and divergent fight becomes the parallel light 3115 after reflected by the parabolic mirror 3114. The parallel light 3116 passes through the light diffusion body 3116 so that it is possible to obtain the diffusion light which is used as the object light 3117. The other separated light 3113 becomes the divergent light after passing through the object lens 3121, and the divergent light becomes the reference light 3118. In this case, the light diffusion body 3116 is formed by the double-faced ground glass having the surface roughness of #1000, and "#1000" means that the surface of the glass is treated by sands each having a diameter of ¹⁄₁₀₀₀ inches in order to form the cloudy glass.

The object light 3117 and the reference light 3118 are irradiated on the photosensitive material 3120 (i.e., the photopolymer plate made by Dupont Co.) which is bonded on the glass plate 3123, and the interference fringe formed by these lights is recorded on the photosensitive material 3120. As a result, it is possible to obtain the hologram element in which the light diffusion body 3116 is recorded on the photosensitive material 3120.

When the image light is irradiated on the hologram element, the light diffusion body 3116 is reproduced. Accordingly, when irradiating the image light on the hologram element, the image light is scattered and diffused so that the image light becomes the output light, as well as the diffusion light output from the light diffusion body 3116.

Figure 57:
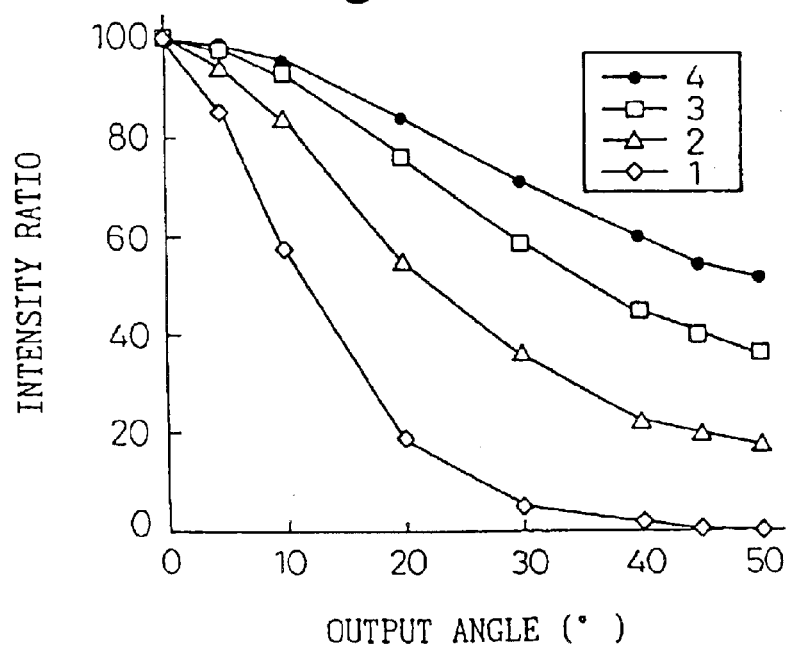
FIG. 57 is a graph for the relationship among the number of double-faced ground glass, the output angle from the light diffusion body, and the intensity ratio in the first embodiment.

The performance evaluation of the hologram screen according to the third embodiment will be explained in detail below. In this case, when producing the hologram element, the number of the double-faced ground glass, which forms the light diffusion body 3116, was changed in order to change the scattering characteristic of the light diffusion body 3116. In FIG. 57, when the number of double-faced ground glass (#1000) is changed from 1 to 4, the scattering characteristic of the light diffusion body 3116 made by the double-faced ground glass was also changed.

That is, the laser light is irradiated perpendicular onto the surface of the double-faced ground glass so as to obtain the diffusion light, the intensity ratio of the diffusion light for each output angle was measured. In measurement of the intensity, the intensity of the diffusion light was set to "100" when the output angle was 0° (i.e., the direction perpendicular to the surface of the light diffusion body). As is obvious from the drawing, when the number of the double-faced ground glass is increased, it is possible to obtain the diffusion body having the large scattering extent.

In this case, the light diffusion angle of the light diffusion body means the output light in which the intensity ratio of the scattering light becomes 50. Accordingly, as shown in FIG. 57, the light diffusion angle of the light diffusion body formed by only one double-faced ground glass is 12°. Further, when two double-faced ground glasses are used, the light diffusion angle is 22°. When three double-faced ground glasses are used, the light diffusion angle is 36°. When four double-faced ground glasses are used, the light diffusion angle is 50°. Still further, the same measurement was performed for one-faced ground glass. As a result of measurement, the light diffusion angle was 7°.

Figure 58:
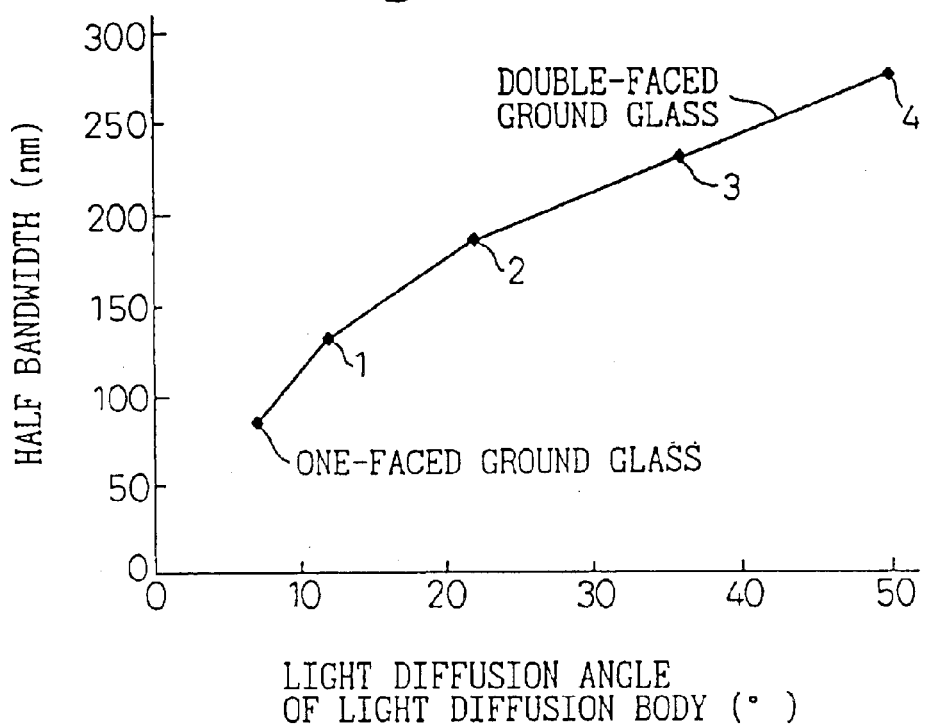
FIG. 58 is a graph for the relationship between the light scattering angle of each light diffusion body and the half bandwidth of the hologram element in the first embodiment.

Next, in the exposure system shown in FIG. 55, the hologram element was produced by using one one-faced ground glass, one double-faced ground glass, and 2 to 4 laminated ground glasses, as the light diffusion body 3116. The half bandwidth of the hologram spectrum of the hologram element is shown in FIG. 58. In this case, as other conditions besides the light diffusion body 3116, the thickness of the photosensitive material 3120 is 6 μm, the intensity ratio R/O of the reference light 3118 and the object light 3117 at the center of the photosensitive material is 4, and the incident angle θr of the reference light 3118 and the incident angle θe of the reproduced light on the hologram screen 31 are 30° (see FIGS. 55 and 56). As is obvious from FIG. 58, the half bandwidth of the hologram spectrum becomes broad when the number of the double-faced cloudy glass is increased, i.e., when the light diffusion angle of the light diffusion body 3116 becomes large.

Figure 60:
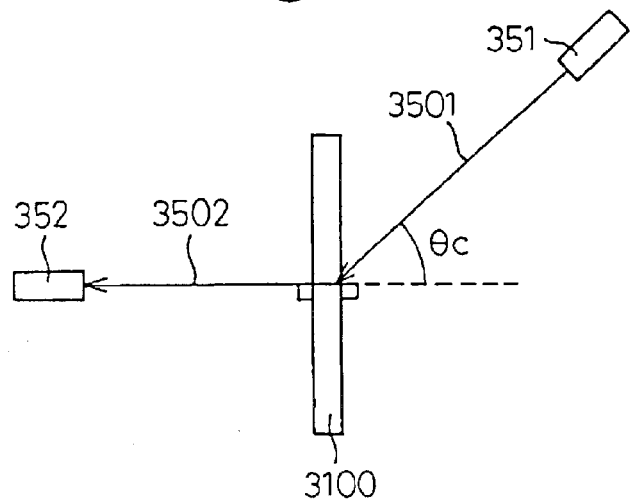
FIG. 60 is an explanatory view for a measuring method of the spectrum of the hologram.

The measuring method of the hologram spectrum will be explained below. In FIG. 60, when measuring the hologram spectrum at the center of the hologram element 100, the measuring light 3501 is irradiated with the angle θc(θc=θe) from a projector 351, and the output light 3502 is output from the center of the hologram element 100. In this case, a light receiver 352 is suitably moved, and the intensity of the output light 3502 is measured. In this case, the projector 351 corresponds to the image projector at the display apparatus, and the light receiver corresponds to the observer. Further, it is possible to obtain the peak wavelength and the peak efficiency from the hologram spectrum shown in FIG. 61. In this case, the peak efficiency corresponds to the extreme value of the efficiency at the hologram spectrum.

Further, in the above producing method, the hologram elements each having the half bandwidth of 60, 80, 100, 120, 140, 160 and 180 nm were made by suitably changing kinds, the number and other producing conditions, of the double-faced ground glass. The above hologram screens were provided in the display apparatus, and the image light was irradiated from the image projector in order to reproduce the image.

The image on the hologram screen was observed by sixteen observers, and the evaluation was performed by the observers in accordance with the following seven grades regarding the color tone of the image. In this case, the seven grades of the evaluation are as follows.

GRADE 7→very good color tone, and natural color;
GRADE 6→good color tone, and no feeling of difference;
GRADE 5→slightly different color tone, but no feeling of difference;
GRADE 4→either of them;
GRADE 3→different color tone, and slight feeling of difference;
GRADE 2→different color tone, and feeling of difference; and
GRADE 1→entirely different color tone, and feeling of difference.

Figure 62:
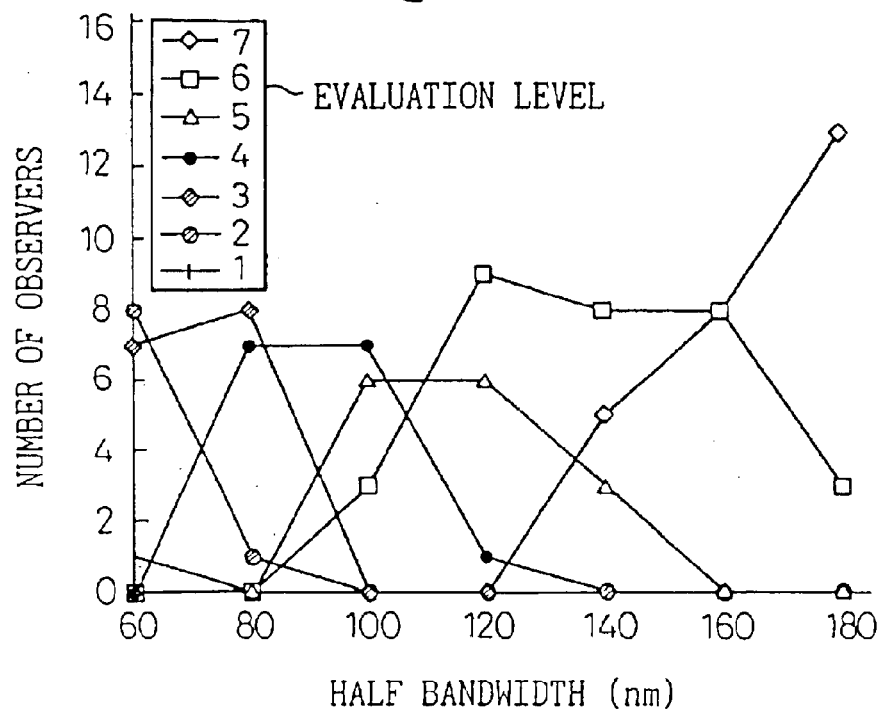
FIG. 62 is a graph for the relationship among the half bandwidth, an evaluation level, and the number of observers in the spectrum of the hologram.
Figure 63:
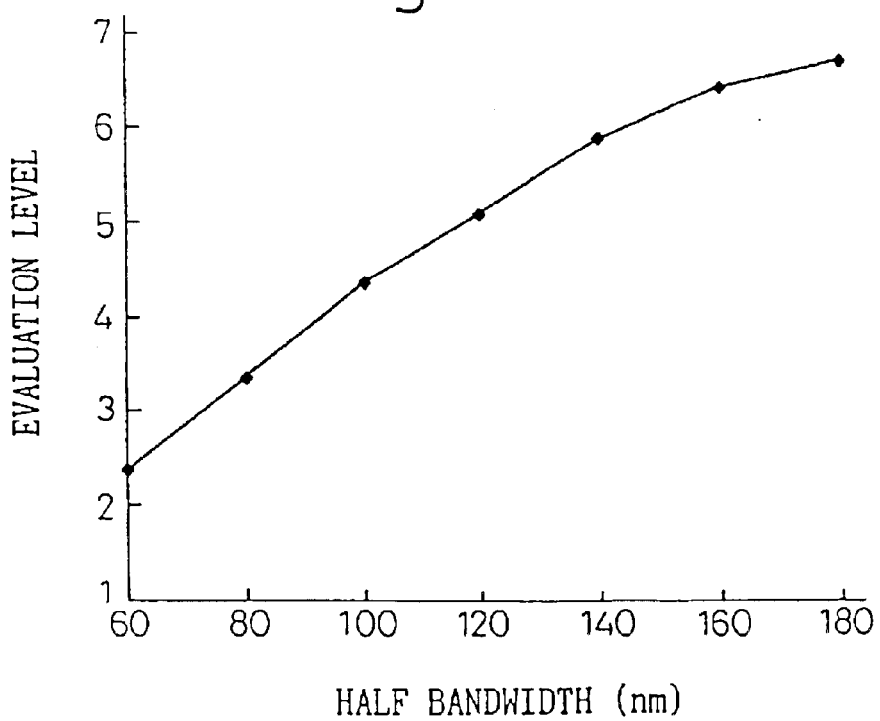
FIG. 63 is a graph for the relationship between the half bandwidth and the evaluation level in the spectrum of the hologram.

The result of the evaluation is shown in FIGS. 62 and 63. In FIG. 62, the ordinate is the number of the observers, and the abscissa is the half bandwidth of the hologram spectrum. In FIG. 63, the ordinate is the evaluation level, and the abscissa is the half bandwidth of the hologram spectrum. As shown in FIG. 63, the grade 4 or more, i.e., the evaluation level having no feeling of difference, is 100 nm or more as the half bandwidth. Further, when the half bandwidth is 140 nm or more, all observers see the grade 5 or more. Accordingly, it is obvious that the desirable half bandwidth is 140 nm or more.

Figure 59:
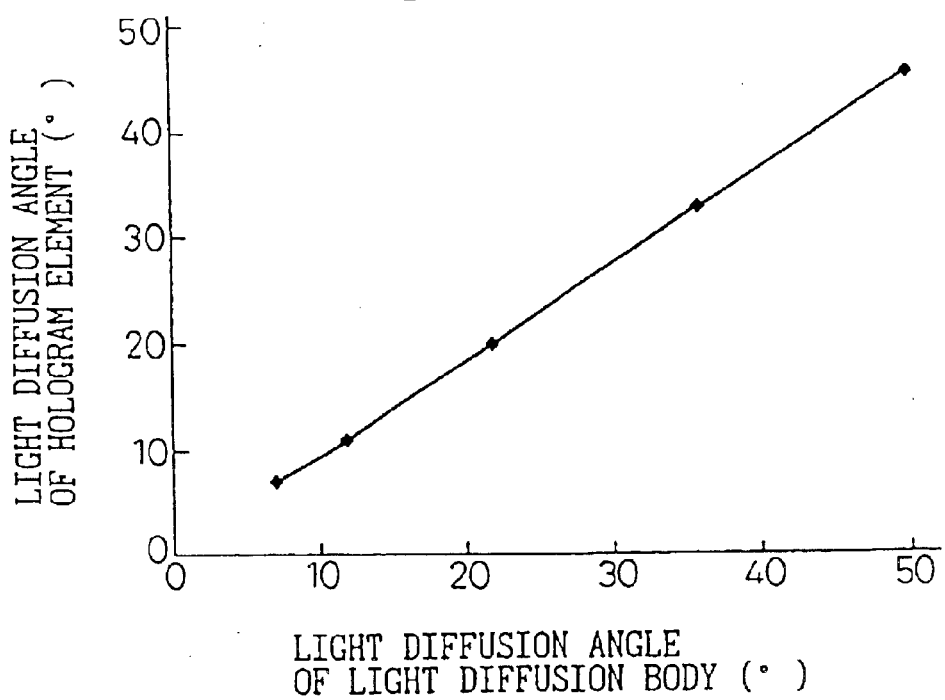
FIG. 59 is a graph for the relationship between the light diffusion angle of each light diffusion body and the light diffusion angle of the hologram element in the first embodiment.

As shown in FIG. 58, when the half bandwidth of the hologram spectrum is 100 nm or more, the light diffusion angle of the diffusion body is approximately 9° or more. The relationship of the light diffusion angle between the hologram element and the light diffusion body is shown in FIG. 59. In this case, the measuring method of the light diffusion angle is the same method as the diffusion body. That is, in FIG. 56, the white light from the image projector 33 is irradiated onto the hologram screen 31, and the brightness of the output light at the center of the hologram screen 31 is set to "1". The brightness of the output light was measured when the view line was swang to left and right directions. In this case, the angle which becomes a half of brightness of the front was set to the light diffusion angle of the hologram screen.

As shown in FIG. 59, it is obvious that the light diffusion angle of the hologram screen approximately coincides with the light diffusion angle of the light diffusion body. Accordingly, when the light diffusion angle of the hologram screen is at least 10° or more, the half bandwidth of the hologram spectrum becomes 100 nm or more so that it is possible to obtain the color tone of the image having no feeling of difference.

The operation of the third aspect of the present invention will be explained in detail blow. The hologram spectrum of the hologram element is shown in FIG. 61. As shown in FIG. 61, when the half bandwidth becomes small, the peak of the hologram spectrum becomes sharp. On the other hand, when the half bandwidth becomes large, the peak of the hologram spectrum becomes gentle. The shape of the hologram spectrum becomes flat when the half bandwidth is large, the efficiency for each wavelength becomes uniform.

In the hologram screen in this embodiment, the half bandwidth of the hologram element is 100 nm or more. Accordingly, it is possible to obtain the scattered and diffused output light without emphasis of the particular wavelength of the image light, and to obtain the hologram screen which can reappear the good color tone of the image light (see FIGS. 62 and 63).

(Second Embodiment)

The object light and the reference light are irradiated onto the photosensitive material having the thickness of 1 to 20 $\mu$m (for example, the photopolymer made by Dupont Co. Ltd. was used.) in order to form the interference fringe on the hologram element. The half bandwidth of the hologram element is 100 nm or more. The light diffusion body is formed by laminating three double-faced ground glasses. Further, the intensity ratio R/O of the reference light and the object light at the center of the photosensitive material is 3, and the incident angle $\theta r$ of the reference light on the photosensitive material (see FIGS. 53 and 55 in the first embodiment) and the incident angle $\theta e$ of the image light on the hologram screen (see FIG. 56 in the first embodiment) are 40°.

The half bandwidth and peak efficiency of the hologram element, which were prepared in accordance with the above conditions, were measured based on the method of the first embodiment. The result of measurement is shown in FIGS. 64 and 65. As shown in FIG. 64, all half bandwidth of all hologram elements are 100 nm or more. As shown in FIG. 65, when the thickness becomes thin, the peak efficiency becomes small. It is obvious that the hologram element has very good color reappearance of the image as shown in FIGS. 62 to 65. Further, when the peak efficiency becomes small, the image becomes dark. Accordingly, when the thickness of the photosensitive material is 6 $\mu$m, it is possible to obtain the best hologram element.

(Third Embodiment)

Figure 66:
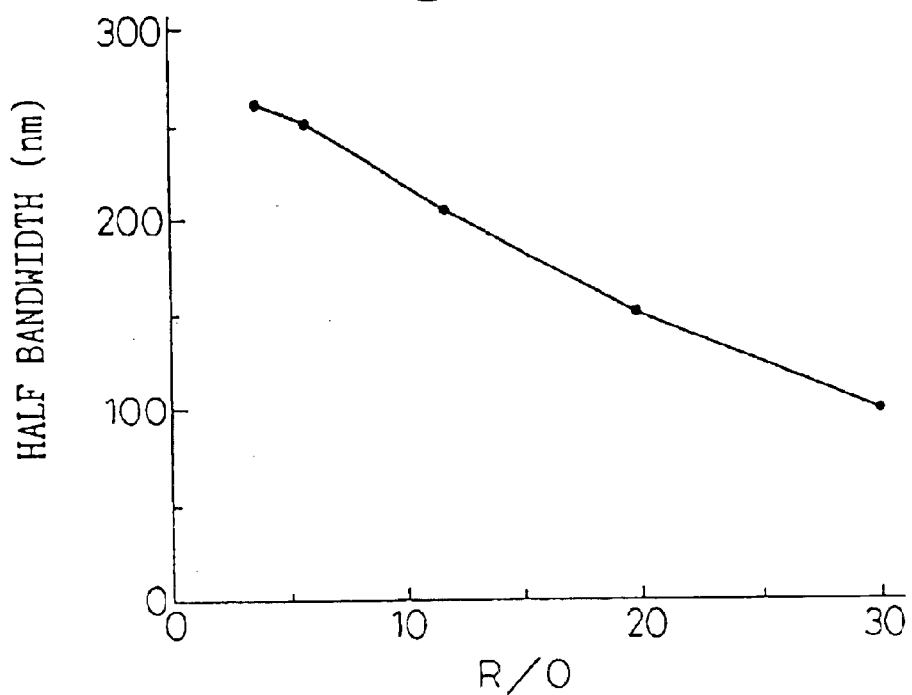
FIG. 66 is a graph for the relationship between the intensity R/O and the half bandwidth in the third embodiment.

In the third embodiment, the intensity ratio R/O of the reference light (R) and the object light (O) is set to 0.1 to 30, and the reference light and the object light are irradiated on the photosensitive material in order to form the interference fringe on the hologram element. In this case, the half bandwidth of the hologram spectrum is 100 nm or more. The light diffusion body is formed by laminating four double-faced ground glasses. The intensity ratio R/O of the reference light and the object light is 3, and the incident angle $\theta r$ and the incident angle $\theta e$ are 30°. As shown in FIG. 66, when the intensity ratio R/O is in the range of 0.1 to 30, the half bandwidth is 100 nm or more. It is obvious that the hologram element has the good color reappearance of the image.

(Fourth Embodiment)

In this embodiment, the peak wavelength of the hologram spectrum is either 525 nm or less, or 585 nm or more. The thickness of the photosensitive material (for example, the photopolymer made by Dupont Co.) is 6 $\mu$m. The light diffusion body is formed by laminating three double-faced ground glasses, and the intensity ratio R/O of the reference light and the object light is 0.8, 3 and 5. Further, the incident angle $\theta r$ and the incident angle $\theta e$ are 30°.

Figure 67:
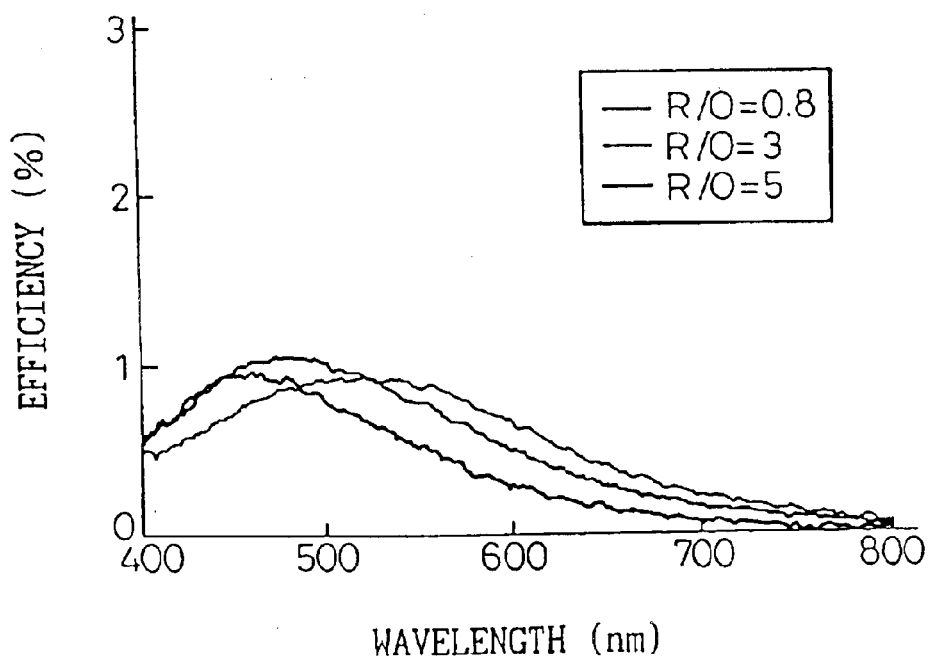
FIG. 67 is a graph for the relationship between the intensity R/O and the efficiency in the third embodiment.

As shown in FIG. 67, as well as the first embodiment, the intensity ratio R/O becomes large, the peak wavelength of the hologram is shifted to the short wavelength side. Further, the peak wavelength of the hologram spectrum is either 525 nm or less, or 585 nm or more. When the half bandwidth is 100 nm or more, particularly, when it is 140 nm or more, it is not necessary that the peak wavelength is 525 nm or less, or 585 nm or more. When the peak wavelength is either 525 nm or less, or 585 nm or more, it is possible to obtain the hologram element having good color reappearance.

Even if the intensity ratio R/O is in the range of 0.1 to 30, there is the case that the peak wavelength becomes out of extent. In FIG. 67, when the intensity ratio R/O is 0.8, the peak wavelength is approximately 525 nm. When the intensity ratio is less than 0.8, the peak wavelength becomes 525 nm or more. This is because the peak wavelength and the optimum intensity ratio R/O are changed depending on the following conditions, i.e., the incident angle of the reference light, the recording wavelength of the hologram element, the thickness of the photosensitive material, and the scattering characteristic of the light scattering body. Accordingly, although the intensity ratio R/O is changed in order to set the peak wavelength within the above extent for every change of conditions of the hologram production, when the intensity ratio R/O is adjusted in the range of 0.1 to 30, it is possible to set the peak wavelength to either 525 nm or less, or 585 nm or more.

Further, there is a wavelength dependency in the sensitivity of a human eye. Accordingly, in the display apparatus shown in FIG. 56, an image state which was caught by the human eye is preferably reflected by the characteristic which multiplies the hologram spectrum of the image light by the wavelength dependency of the human eye shown in FIG. 68.

Figure 69:
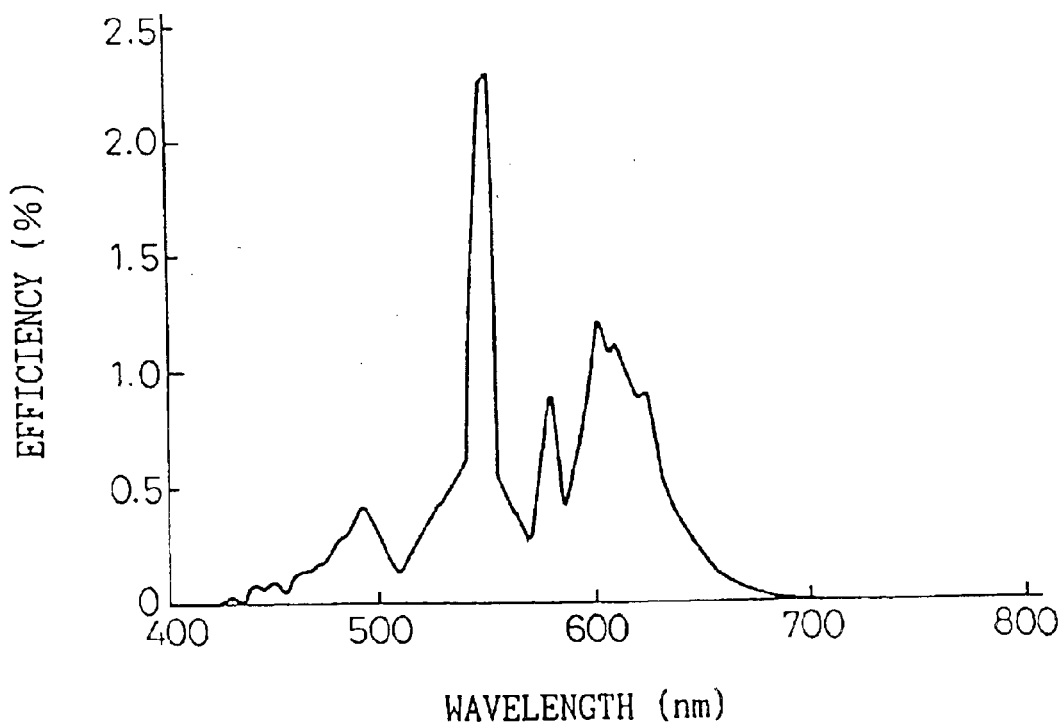
FIG. 69 is a graph for the relationship between the efficiency and the wavelength in the spectrum of the hologram in the fourth embodiment.

The hologram spectrum which was multiplied by the spectral luminous efficiency is shown in FIG. 69. Since the human spectral luminous efficiency has the large peak at the wavelength of 555 nm, the large peak occurs in the vicinity of the wavelength of 555 nm as shown in FIG. 69.

Figure 70:
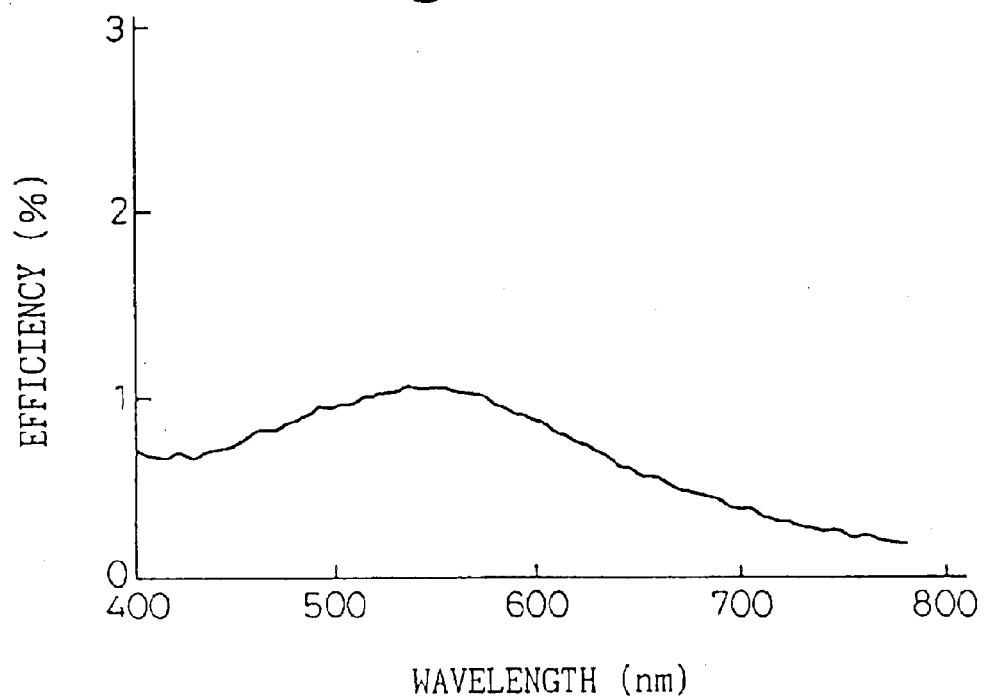
FIG. 70 is a graph for the spectrum of the hologram when R/O is 2, and when the peak wavelength is 547 nm, in the fourth embodiment.
Figure 71:
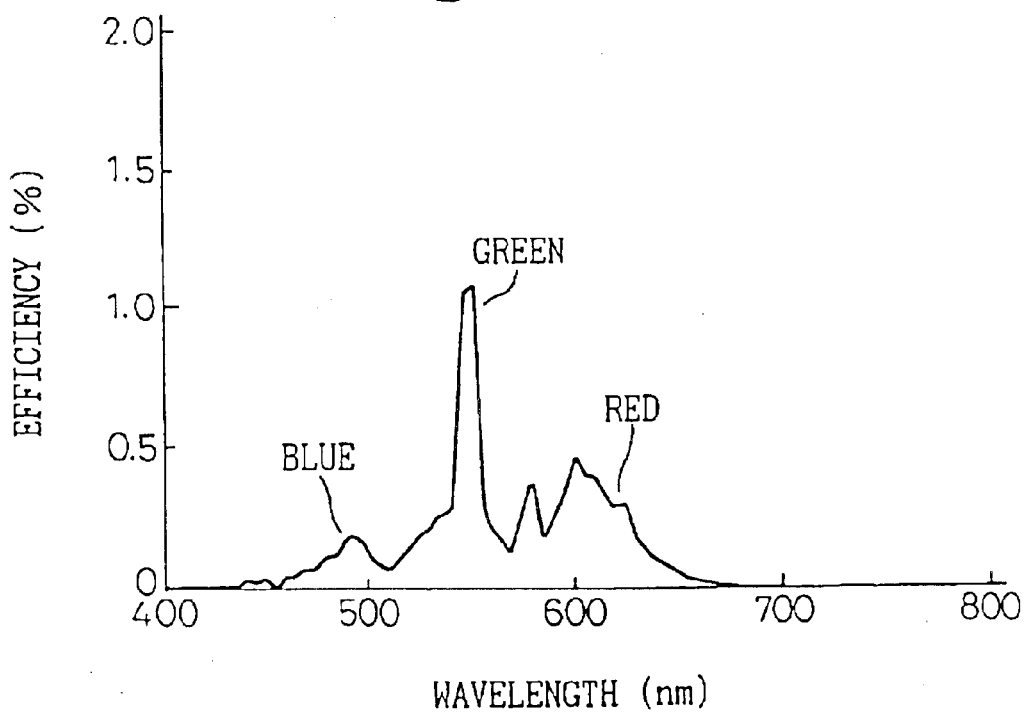
FIG. 71 is a graph for the relationship between the spectrum of FIG. 69 and the spectrum of FIG. 70 in the fourth embodiment.

When the image light is reproduced by using the hologram screen in which the intensity ratio R/O is 1 and the peak wavelength is 547 nm as shown in FIG. 70, the reproduced image light has the hologram spectrum which multiplies the hologram spectrum of FIG. 69 by the hologram spectrum of FIG. 70. The new hologram spectrum is shown in FIG. 71. As shown in FIG. 71, the green color is emphasized in the image by overlapping the emphasis of the green due to the hologram screen with the emphasis of the green due to the spectral luminous efficiency.

Figure 72:
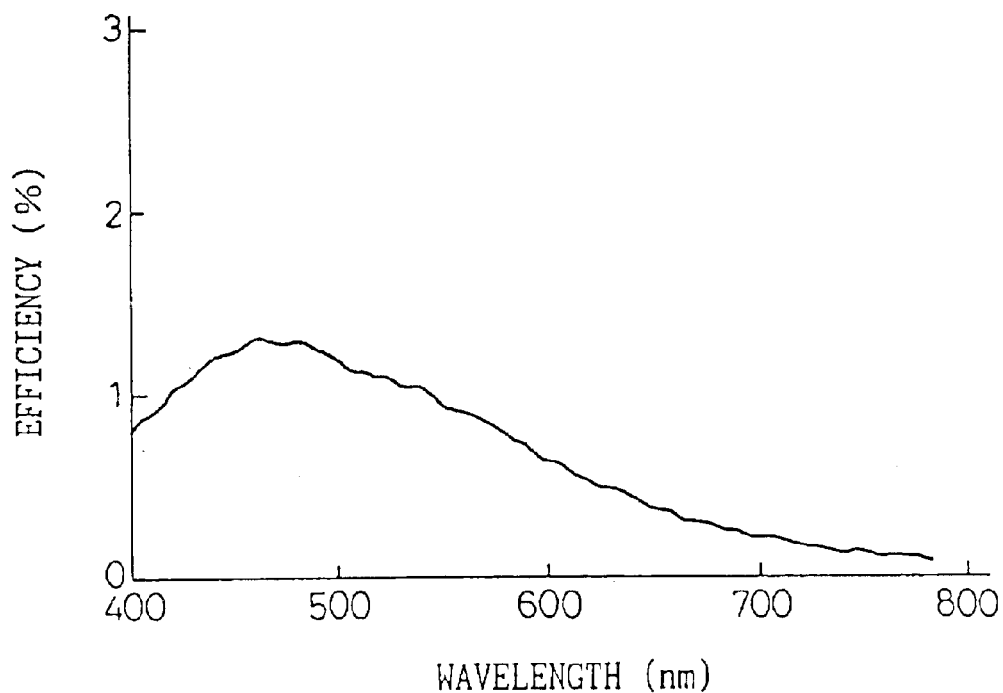
FIG. 72 is a graph for the spectrum of the hologram when R/O is 5, and when the peak wavelength is 460 nm, in the fourth embodiment.
Figure 73:
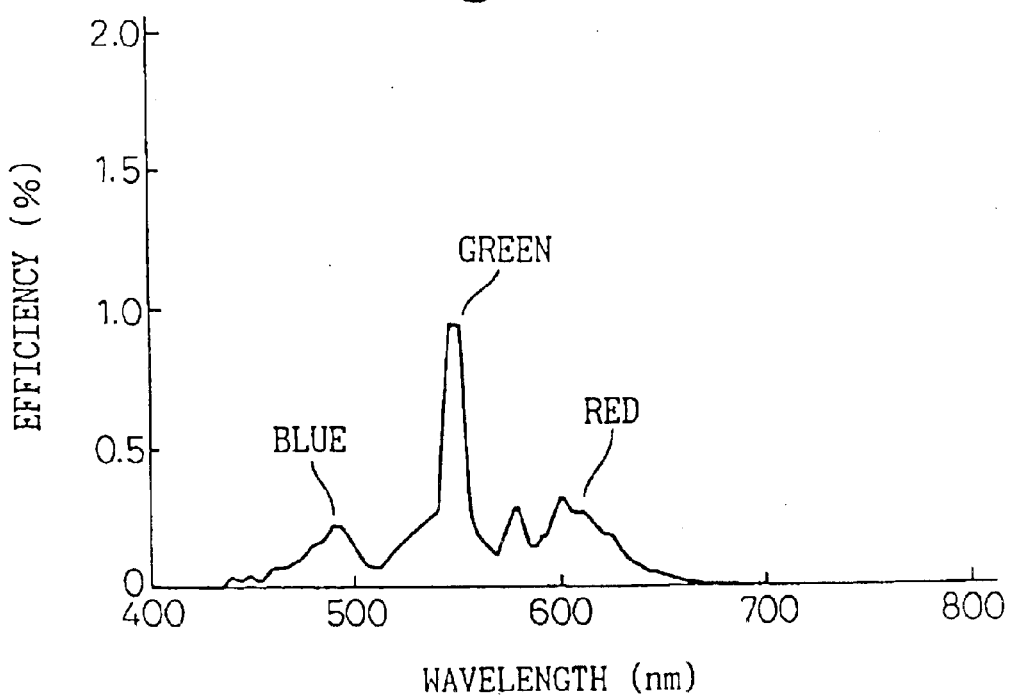
FIG. 73 is a graph for the relationship between the spectrum of FIG. 69 and the spectrum of FIG. 72 in the fourth embodiment.

The image is reproduced by using the hologram screen having the hologram spectrum shown in FIG. 72, and the peak wavelength of this hologram spectrum is 460 nm. The reproduced image light has the hologram spectrum which multiplies the hologram spectrum of FIG. 69 by the hologram spectrum of FIG. 72. The new hologram spectrum is shown in FIG. 73. When the peak wavelength of the hologram spectrum becomes small, the peak level of the green of the hologram spectrum is reduced as shown in FIG. 73.

Accordingly, when providing the hologram screen formed by the hologram spectrum having the peak wavelength at the wavelength of either 525 nm or less, or 585 nm or more and avoiding the peak wavelength of the spectral luminous efficiency, it is possible to provide good appearance of color tone of the original image without emphasis of the particular wavelength of the image light, and to realize the hologram element having superior color-reappearance.

(Fifth Embodiment)

In this embodiment, the incident angle θr of the reference light on the photosensitive material is different from the incident angle θe of the image light on the hologram screen, and the reference light and the object light are irradiated on the photosensitive material in order to form the interference fringe. The peak wavelength of the hologram spectrum is either 525 nm or less, or 585 nm or more. In this case, the thickness of the photosensitive material (for example, the photopolymer made by Dupont Co. Ltd.) is 6 μm, and the light diffusion body is formed by laminating three double-faced ground glass. Further, the intensity ratio R/O of the reference light and the object light is set to 3.

Figure 74:
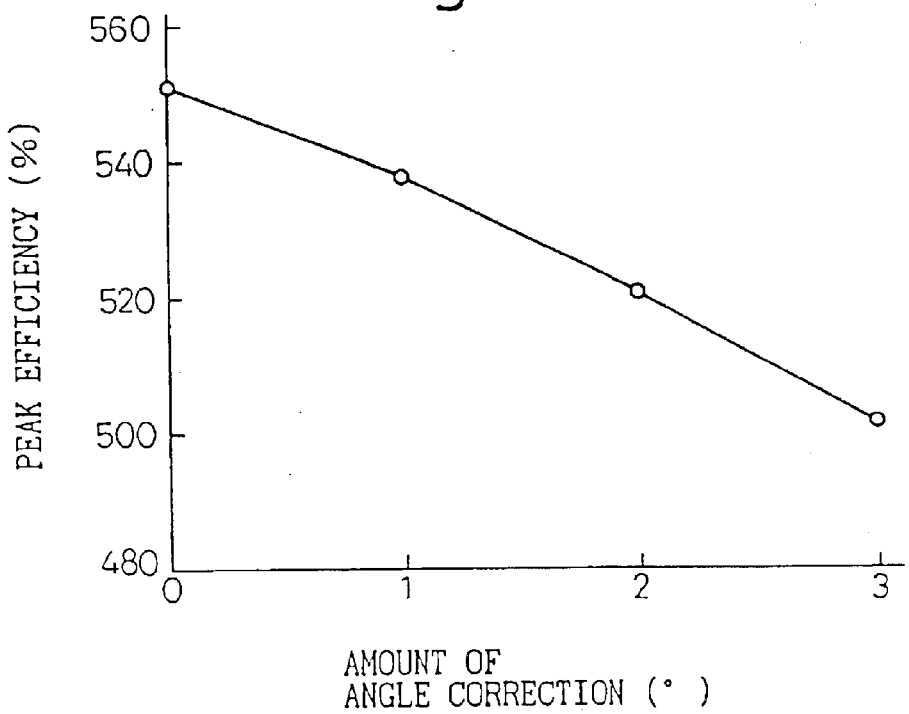
FIG. 74 is a graph for the relationship between the amount of angle correction and the peak efficiency in the fifth embodiment.

The hologram screen having the angle 40° as the incident angle θe of the image light was prepared. In this case, the incident angle θr of the reference light was changed by 40°, 41°, 42° and 43°. That is, the amount of the angle correction (i.e., θr−θe) was determined as 0°, 1°, 2° and 3°. The relationship between the peak efficiency and the amount of the angle correction is shown in FIG. 74. As shown in FIG. 74, when the amount of the angle correction is changed by 0°, 1°, 2° and 3°, the peak wavelength is shifted to the short wavelength. That is, the wavelength is shifted to the short wavelength by 13 nm at +1° for 0°, and shifted to the short wavelength by 18 nm at +2° for +1°. In this case, when the wavelength is shifted to the long wavelength, the amount of the angle correction becomes minus, and the incident angle θr of the reference light is set so as to become smaller than the incident angle θe of the reproduced light.

As mentioned above, by changing the incident angle θr of the reference light and the incident angle θe of the reproduced light, the peak wavelength of the hologram spectrum can be set to either 525 nm or less, or 585 nm or more. Since the hologram element according to this embodiment is slipped from the peak of the spectral luminous efficiency, it is possible to realize good color reappearance of the image.

(Sixth Embodiment)

In this embodiment, a plurality of object lights each of which have different angle are irradiated onto the photosensitive material in order to form the interference fringe. Further, the half bandwidth of the hologram spectrum is 100 nm or more.

Figure 75:
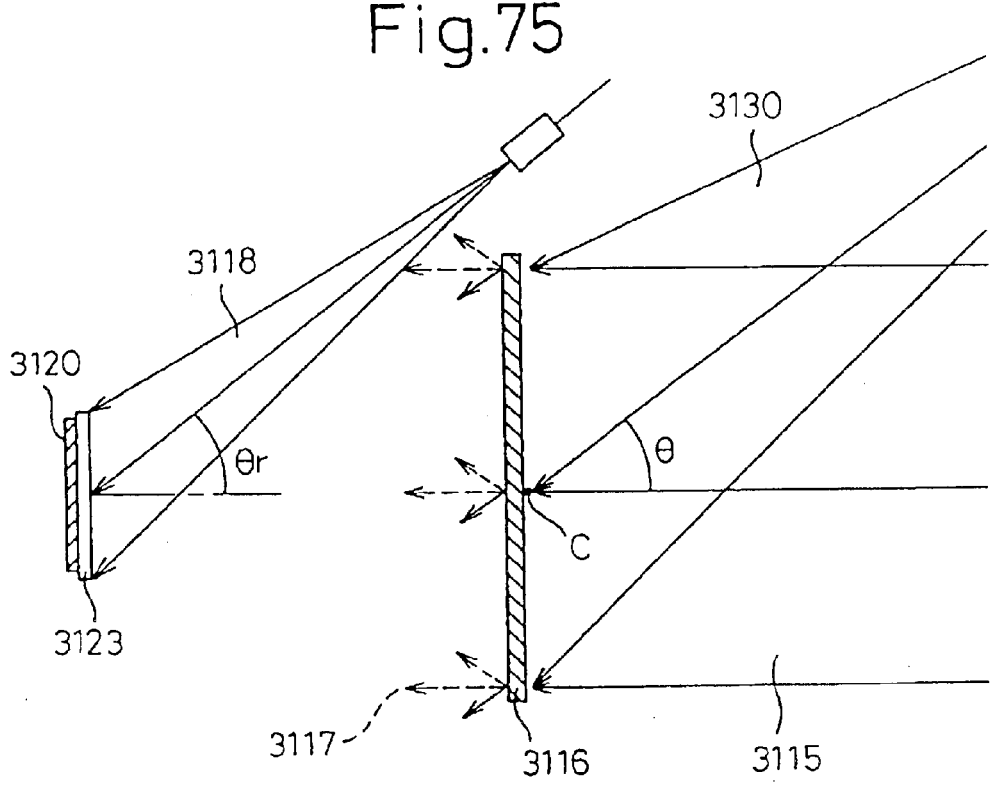
FIG. 75 is an explanatory view for the essential parts of the exposure optical system in the six embodiment.

As shown in FIG. 75, the separated light 3112 (see FIG. 55) is further separated by the beam splitter into two lights, i.e., the parallel light 3115 and the divergence light 3130. The divergence light 3130 is intersected by the parallel light 3115 with the angle θ at the center C of the light diffusion body 3116. The parallel light 3115 and the divergence light 3130 are irradiated onto the light diffusion body 3116 so that it is possible to obtain the diffusion light which is used as the object light 3117. On the other hand, the separated light 3113 (see FIG. 55) becomes the divergence light through the object lens 3121, and the divergence light is used as the reference light 3118. The diffusion body 3116 is formed by two laminated double-faced ground glass having the surface roughness of #1000.

Figure 76:
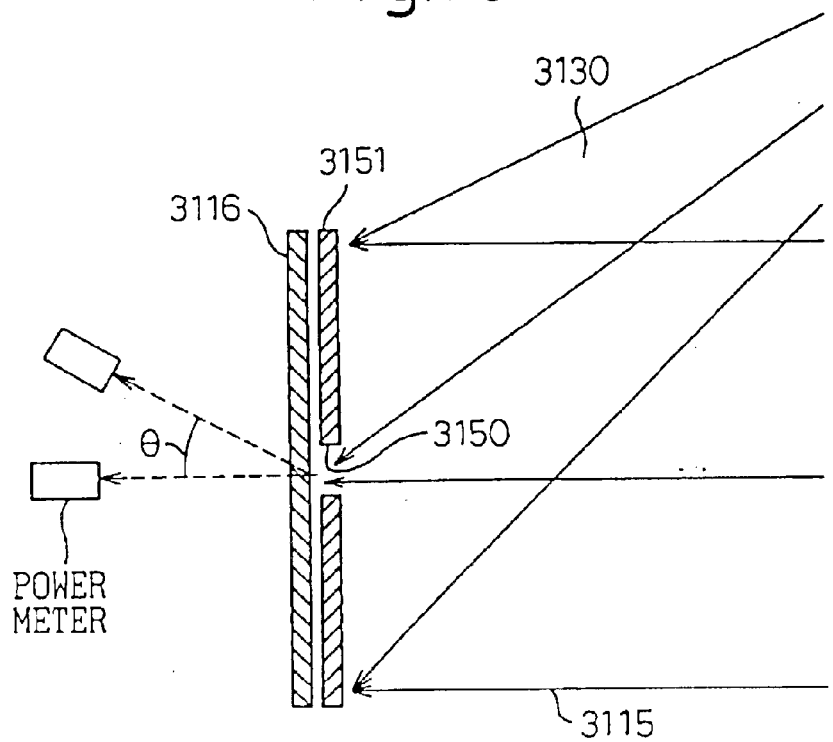
FIG. 76 is an explanatory view for a measuring method of the scattering extent of the object light in the sixth embodiment.

The scattering extent of the object light was measured by the following method. That is, as shown in FIG. 76, a non-transparent plate 3151 having a hole 3150 at the center thereof is provided before the diffusion body 3116. The hole 3150 has a diameter φ10. The parallel light 3115 and the divergence light 3130 are irradiated to the hole 3150, and output to the diffusion body 3116 with the angle θ. In this embodiment, the intensity of the output light of the angle θ from the hole through the diffusion body 3116 was measured by using a power meter. That is, the intensity ratio of the output light of the angle θ and the output perpendicular to the diffusion body 3116 (i.e., the angle 0°) was measured by the power meter.

Figure 77:
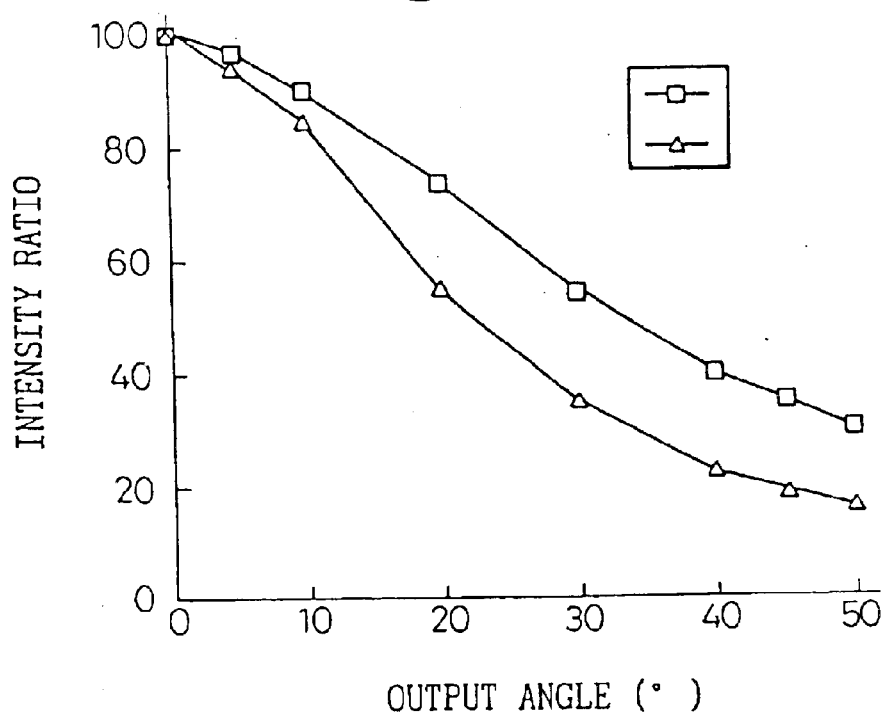
FIG. 77 is a graph for the scattering extent of the object light in the sixth embodiment.

The result of measurement is shown in FIG. 77. The curve indicated by the mark "Δ" is in the case that only parallel light 3115 was irradiated onto the light diffusion body 3116, and the curve indicated by the mark "□" is in the case that the parallel light 3115 and the divergence light 3130 were irradiated onto the light diffusion body 3116.

As is obvious from the drawing, it is possible to improve the scattering extent of the object light by adding the divergence light 3130 to the parallel light 3115. When the scattering extent of the object light is increased, it is possible to produce the hologram element having board peak wavelength so that it is possible to obtain the hologram element having good color reappearance.

(Seventh Embodiment)

In this embodiment, a sum of the exposure intensity of the intensity of the object light and the intensity of the reference light was determined in the range of 0.02 to 50 mW/cm², and the object light and the reference light were irradiated on the photosensitive material in order to form the interference fringe on the hologram element. The thickness of the photosensitive material, for example, photopolymer, was 6 μm, and the light diffusion body was formed by three double-faced ground glass. The intensity ratio of the reference light and the object light was 4. The incident angle θr of the reference light on the photosensitive material and the incident angle θe of the image light on the hologram screen were 35°. The amount of exposure was 20 mJ/cm².

Figure 79:
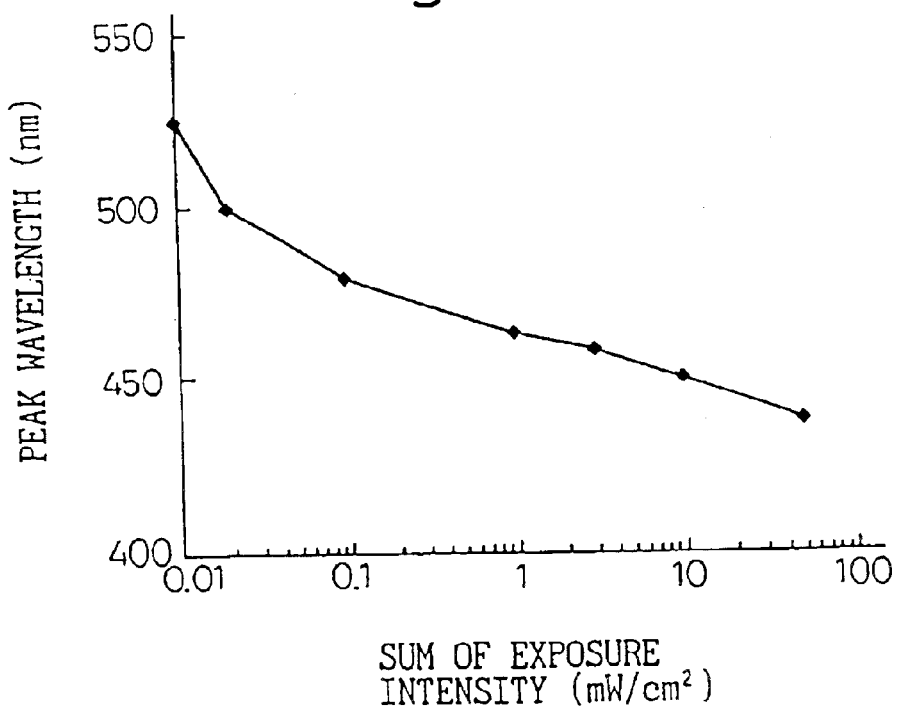
FIG. 79 is a graph for the relationship between the sum of the exposure intensity and the peak wavelength in the seventh embodiment.

As shown in FIGS. 78 and 79, when the sum of the exposure intensity (mW/cm²) becomes small, the half bandwidth becomes broad so that the peak wavelength is shifted to the long wavelength. However, in FIG. 78, when the sum of the exposure intensity is 0.02 mw/cm² or less, the half bandwidth becomes narrow. This is because the efficiency of the hologram element was decreased due to very long exposure time. In this case, it is possible to prevent a narrow half bandwidth at the sum of intensity of 0.02 mW/cm² or less, if the stability of the optical system or the sensitivity of the photosensitive material are improved.

In this embodiment, it is possible to set the peak wavelength at the hologram spectrum to either 525 nm or less, or 585 nm or more, and to set the half bandwidth to 100 nm or more, by adjusting the sum of the exposure intensity in the range of 0.02 to 50 mW/cm².

(Eighth Embodiment)

In this embodiment, after completion of the interference fringe, the ultraviolet light (UV light) having the intensity 0.1 mW/cm² was irradiated onto the photosensitive material, and the heating conditions was adjusted in the range of 80 to 150° in order to form the hologram element. In this case, the peak wavelength is either 525 nm or less, or 585 nm or more, and the half bandwidth is 100 nm or more.

Figure 82:
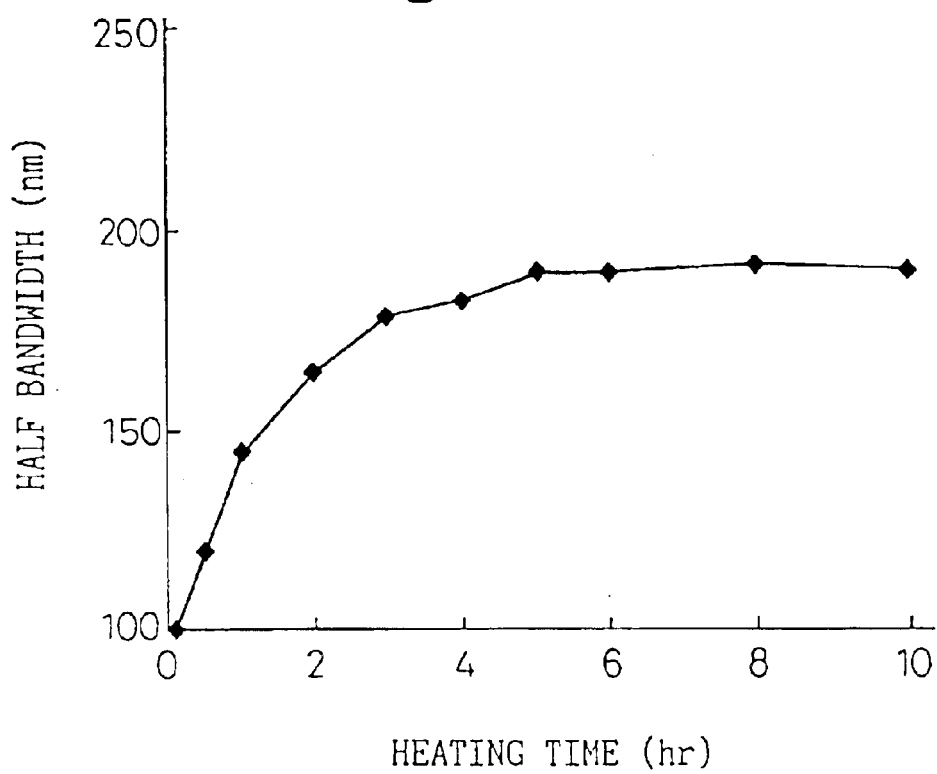
FIG. 82 is a graph for the relationship between the heating time and the half bandwidth in the eighth embodiment.

Further, the thickness of the photosensitive material (the photopolymer was used) was 6 μm and 10 μm. The light diffusion body was formed by three laminated double-faced ground glass, and the intensity ratio R/O of the reference light and the object light was 5. Further, the incident angle θr of the reference light and the incident angle θe were 30°, and the amount of exposure was 20 mJ/cm². The result of measurement is shown in FIGS. 80 to 82.

As shown in FIGS. 80 and 81, when the heating temperature becomes high, the half bandwidth becomes broad so that the peak wavelength is shifted to the long wavelength. In FIG. 82, the heating temperature is 100° C. The half bandwidth is increased during five hours, and becomes approximately constant after five hours.

(Ninth Embodiment)

Figure 83:
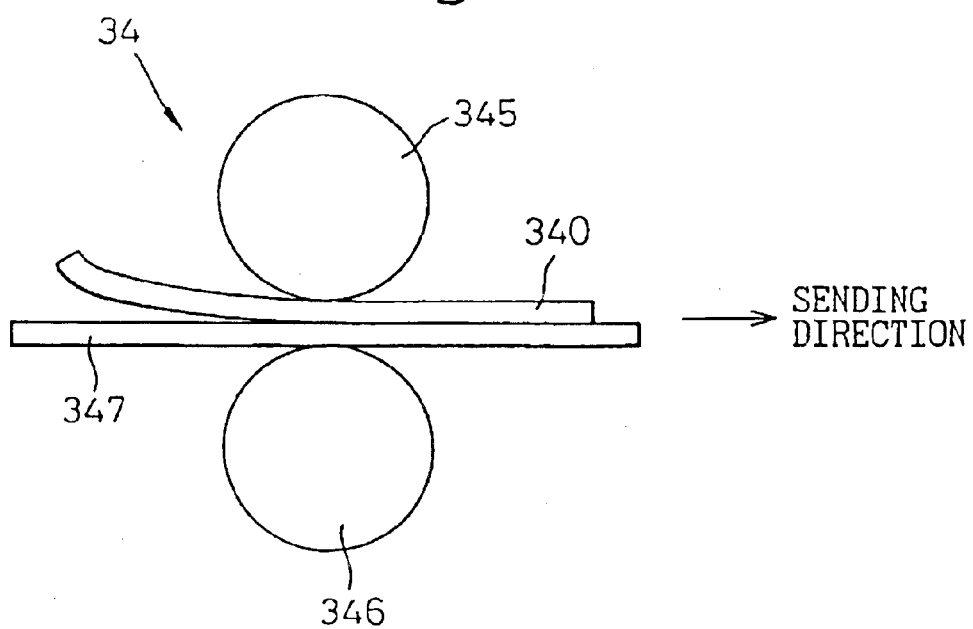
FIG. 83 is an explanatory view for a reducing method of the thickness of the hologram element by using a laminator.

In this embodiment, after completion of the interference fringe, the hologram element was produced in accordance with the following conditions. That is, the hologram element was irradiated by the ultraviolet having the intensity of 0.1 mW/cm², and heated by 120° during one hour. As shown in FIG. 83, after above processes, the hologram element 340 was pressed by rollers 345 and 346 with a hard substrate 347 (for example, a glass plate, resin plate, etc.) by using a laminator 34, in the conditions of the heating temperature 140° C., the pressure of 2 kg/cm², and transfer speed of 10 cm/minute. As a result, the peak wavelength of the hologram spectrum was shifted to the long wavelength by approximately 30 nm.

In this case, since the hologram element is heated and pressed, the photopolymer becomes soft. Further, after exposure or irradiation of the UV, the hologram element can be pressed. In this case, it is possible to set a low heating temperature. Further, when the dichromated gelatin (DCG) is used as the photosensitive material, the following adjustments are performed. That is, when the peak wavelength is shifted to the long wavelength, a dry plate coated by the DCG before exposure, is exposed after vacuum process in the range of 0.1 to 1 (Torr) and from 10 seconds to 2 hours.

When the Ar laser having the wavelength 514 nm is used, the wavelength was shifted to the long wavelength by 550 nm in the conditions of 0.2 Torr and 10 minutes, and by 590 nm in the conditions of 0.2 Torr and 1.5 hours. When the peak wavelength is shifted to the short wavelength, the thickness of the photosensitive material becomes more thick than the thickness at the exposure by performing a chemical hard-film process after swelling of the hologram in warm water during development. As a result, it is possible to shift the peak wavelength to the short wavelength. In this case, after swelling of the hologram in the warm water of 30° C. and during five minutes, and after swelling it in a rapid fixer during five minutes with 25° C., the peak wavelength was shifted to the 480 nm.

Explanations of the Fourth Aspect of the Present Invention

Before describing the preferred embodiments, a conventional art and its problem are explained below. There is a known transparent hologram screen which can reproduce the image based on the output light by scattering and diffusing the image light from the image projector. The observer can observe the reproduced image on the hologram screen and can see the background through the hologram screen. This type of the hologram screen can be utilized, for example, in the ticket window in a bank or hospital, as mentioned above. Further, the hologram screen can be utilized as an advertising board in a shopping center, and as a head-up display apparatus.

Figure 110:
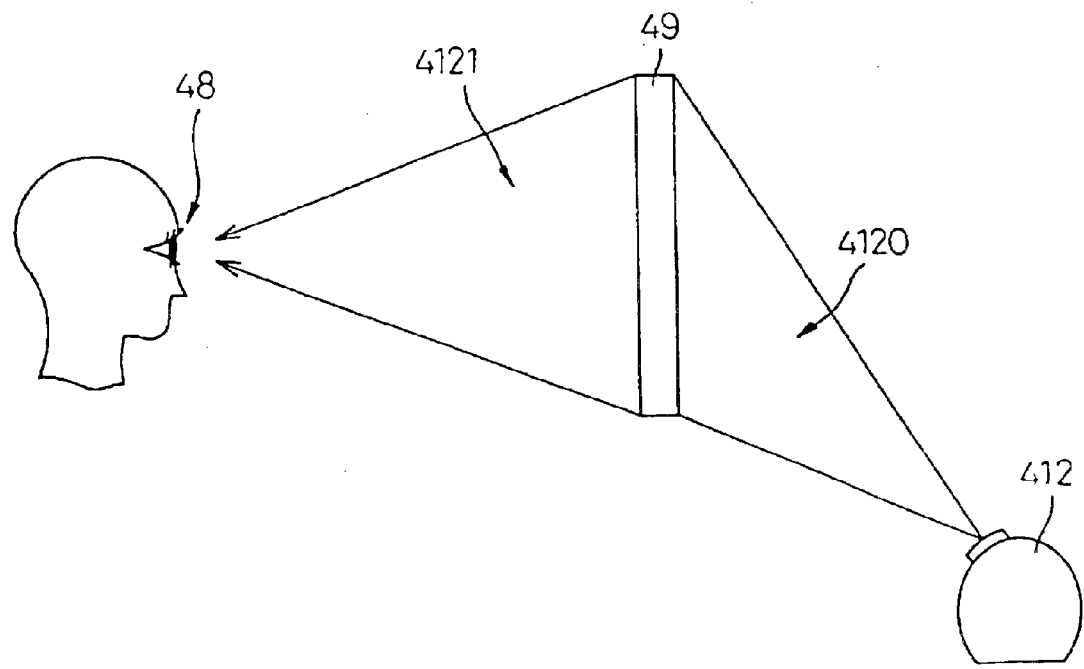
FIG. 110 is an explanatory view for the display apparatus using the transmission type hologram screen.

One example of a display apparatus using the transmission type hologram screen is shown in FIG. 110. The image projector 412 is arranged at the back of the hologram screen 49, i.e., opposite to the observer 48. The image light 4120 is irradiated from the image projector 412 onto the hologram screen 49 so that the image is reproduced on the hologram screen 49 and the image can be observed by the observer 48.

Figure 111:
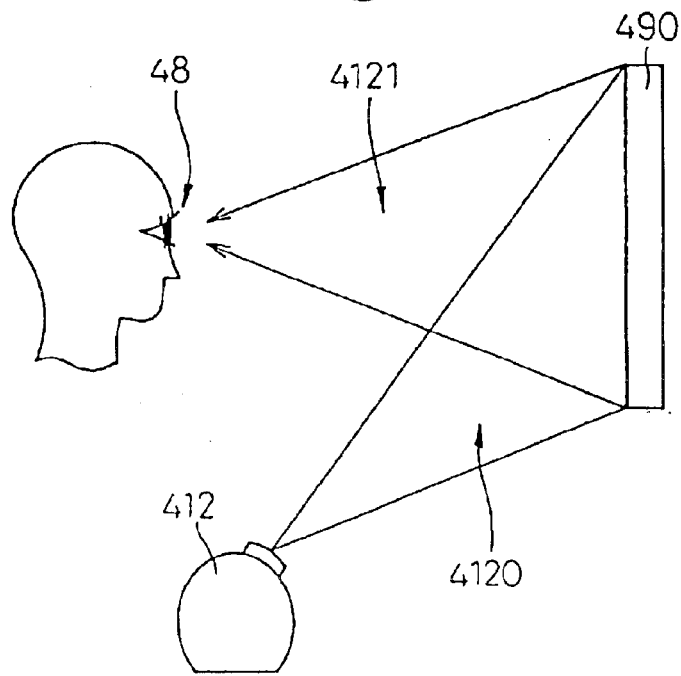
FIG. 111 is an explanatory view for the display apparatus using the reflection type hologram screen.
Figure 112:
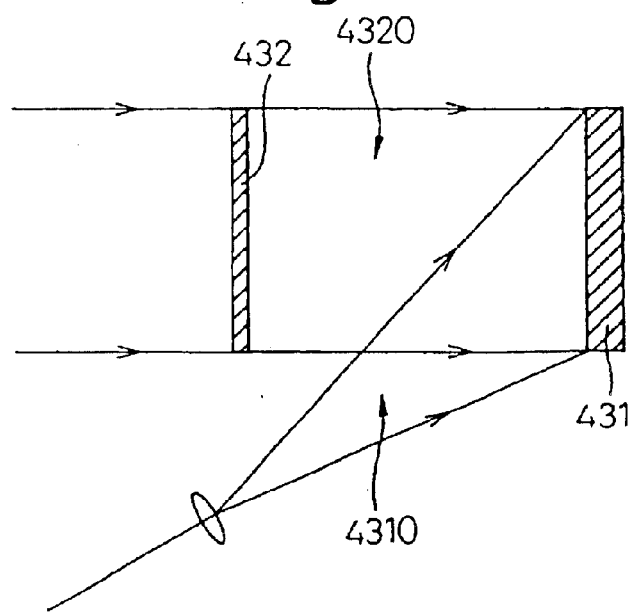
FIG. 112 is an explanatory view for indicating a basic structure of the transmission type hologram screen.
Figure 113:
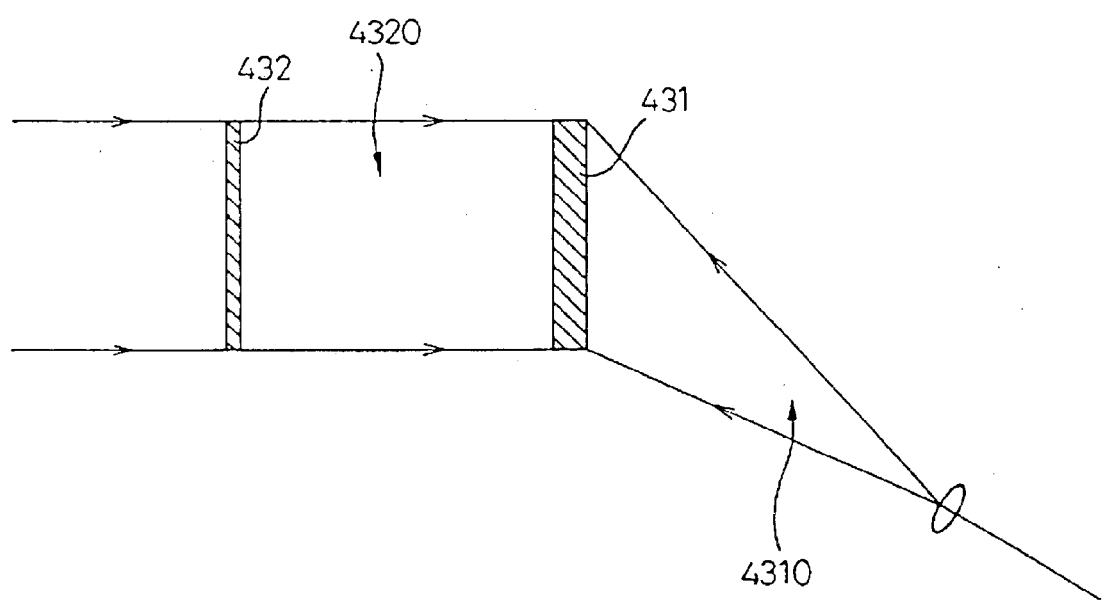
FIG. 113 is an explanatory view for indicating a basic structure of the reflection type hologram screen.

On the other hand, a display apparatus using the reflection type hologram screen is shown in FIG. 111. The image projector 412 is arranged at the front of the hologram screen 490, i.e., at the same side as the observer 48. The image light 4120 from the image projector 412 is irradiated in order to reproduce the image on the hologram screen 490. As shown in FIGS. 112 and 113, two lights, i.e., the object light 4320 formed by the diffusion light through the light diffusion body 432, and the reference light 4310 formed by non-diffusion light, are irradiated on the photosensitive material 4310 in order to expose and form the interference fringe thereon.

In this case, as shown in FIG. 112, when the object light 4320 and the reference light 4310 are irradiated from the same side on the photosensitive material 431, it is possible to obtain the transmission type hologram screen 490. On the other hand, as shown in FIG. 113, when the object light 4320 and the reference light 4310 are irradiated from the opposite side each other on the photosensitive material 431, it is possible to obtain the reflection type hologram screen 490.

There is, however, a problem in which cloudiness occurs on the hologram screen because the interference fringe formed by the object light is recorded thereon. When cloudiness occurs on the screen, it is very difficult to observe the background through the hologram screen. Particularly, when there is no image on the hologram screen, the observer feels difference of the image at the background due to this cloudiness.

A method of producing the hologram screen having wide view angle has been disclosed, for example, in the Japanese Unexamined Patent Publication No. 9-127853. According to this method, the diffusion light, i.e., the object light, is obtained by irradiating a plurality of lights, each of which has different direction, onto the light diffusion body. On the other hand, the non-diffusion light is used as the reference light. The object light and the reference light are irradiated on the photosensitive material in order to form the interference fringe. Further, two kinds or more, each having different diffusion angle, of the light diffusion bodies are bonded so as to form one light diffusion body. Then, the object light and the reference light are irradiated on the photosensitive material in order to obtain the hologram screen. According to this method, since it is possible to use the diffusion light in which the difference in intensity due to scattering direction is small, it is possible to obtain the hologram screen having wide view angle.

On the other hand, since there is a proper feature in which the observer can observe the image from only particular range (a view angle) on the hologram screen. Accordingly, the hologram screen having wide view angle has high utility in various fields. However, when the view angle becomes broad, cloudiness is increased on the hologram screen.

As another method, a method for preventing cloudiness from the image has been disclosed in the Japanese Patent Unexamined Publication No. 9-127612.

It is assumed that the reference light is not irradiated, and only object light is irradiated on the photosensitive material to expose it. When the efficiency $\eta_\infty$ of the hologram screen obtained by the above conditions is 5% or less, the intensity of the object light is given as A. The photosensitive material is exposed by using the object light and the reference light having the intensity which corresponds to the intensity A. As a result, it is possible to obtain the hologram screen having no cloudiness on the image.

There is a problem, however, in the above method. That is, even if the exposure is performed by the object light which exceeds the efficiency $\eta_\infty$ of 5%, there is possibility in which no cloudiness is obtained on the hologram screen. Accordingly, the above conventional method has been yet insufficient in order to solve cloudiness on the hologram screen.

Further, the hologram screen using the dichromated gelatin (DCG) as the photosensitive material has been disclosed in the above Japanese Unexamined Patent Publication No. 9-127612. In this case, it is necessary to provide a wet development process in the producing process using the DCG. Accordingly, when the DCG becomes hard in the development process, small cracks occur in the DCG so that the hologram screen becomes cloudy.

The inventors found the fact that, if there is no cloudiness on the hologram screen, the observer does not mind a cloudy state even if the efficiency $\eta_\infty$ becomes large. On the other hand, since the hologram screen made by the DCG frequently becomes cloudy, it is necessary to set the efficiency $\eta_\infty$ to 5% or less.

The fourth aspect of the present invention aims to solve the above problems, and to provide the hologram screen which has superior transparency and no cloudiness, and can observe clearly the background by the observer. Further, a producing method of the hologram screen is provided.

According to the invention defined in claim 26, the image light from the image projector is scattered and diffused to obtain the output light so that the image can be reproduced on the screen, and the hologram screen is characterized by a haze ratio of 5 to 60%.

As mentioned above, the hologram screen according the fourth aspect of the present invention has the haze ratio of 5 to 60%. Since the haze ratio is set in the range of 5 to 60%, the light which is input from the external, except for the image projector, to the hologram screen has the low scattering extent, it is possible to output the image with high efficiency. Accordingly, when the observer observes the hologram screen, there is no cloudiness of the hologram screen due to the external light, and it is possible to transmit the background without cloudiness, and to clearly observe the background through the hologram screen. That is, the observer can observe the back at the same time the image reproduced on the hologram screen, different from the non-transparent hologram. As a result, this transparent hologram can be utilized as, for example, the advertising board in the shopping center. Further, the transparent hologram screen can be utilized as a head-mount display of a mobile system.

When the haze ratio exceeds 60%, there is cloudiness on the hologram screen so that it is difficult to clearly observe the back. On the other hand, when the haze ratio is 5% or less, the efficiency of the hologram screen becomes low so that the image becomes dark.

In general, a haze ratio which indicates cloudiness of a transparent plate has been defined, for example, in the JIS-K7105 (Japanese Industrial Standard), and this is used in the present invention. In the case of the hologram screen, even if the haze ratio becomes high, the observer can clearly observe the back, i.e., the hologram screen has high transparency.

The haze ratio can be expressed as follows.

$$H = Td/Tt \times 100 \quad (13)$$

Where, H is a haze ratio (%), Td is a diffused transmission (%), and Tt is an all lights transmission (%). Concretely, Tt is the light intensity which is transmitted perpendicularly to the center of the light diffusion body or the hologram screen (precisely, the light intensity of the scattering light in the range of ±3.5°), and Td is the total intensity of the scattering light at all directions except for the center direction.

The cause of cloudiness of the hologram screen will be explained compared to cloudiness of the light diffusion body.

Figure 103:
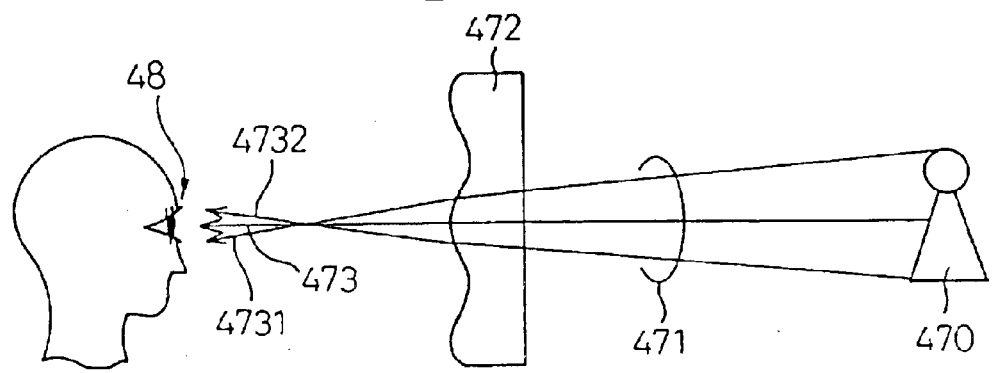
FIG. 103 is an explanatory view for the beam of light toward the observer from the object existing at the back of the light diffusion body.

In the general light diffusion body, the incident light is scattered due to unevenness of the surface, or due to particles existing within the diffusion body and scattering the light. As shown in FIG. 103, the beam of light 471 from the object 470 at the back of the light scattering body 472 to the observer 48 passes through the light scattering body 472 and output to the observer 48. In this case, a part of beam of light 473 goes straight to the observer 48, and the remaining lights 4731 and 4732 are always bended to another directions which are different from the direction of the observer 48. From this reason, there is obscuration of the image of the object 470 at the back when the observer 48 observes the image.

When the haze ratio becomes small, the bending extent of the lights 4731 and 4732 becomes small. However, except that the bending extent is extremely small, the obscuration of the object 470 always occurs when the observer 48 observes the image. For example, when the beam of lights 4731 and 4732 are bent by 0.1°, there is the difference of 3.5 mm at the observer location which is apart from the light scattering body 472 by the distance of 2 m. Further, there is the difference of 8.7 mm at the observer location which is apart from the light scattering body 472 by the distance of 5 m. In general, since a diameter of the pupil of human eye is approximately 5 mm, the beam of lights 4731 and 4732 are bent by only 0.1°, the obscuration of the object 470 occurs at the location of the observer 48.

On the other hand, the hologram screen, as mentioned below, the diffusion body which is formed by transmitting the laser light through the light diffusion body or reflecting the laser light therefrom is used as the object light, and the non-diffusion light is used as the reference light. The interference fringe is formed by the object light and the reference light, and recorded as the difference in the refractive index of the material of the photosensitive material. The recorded interference fringe functions as the diffractive lattice. In general, the material of the hologram screen is transparent, and the surface thereof is flat.

Figure 104:
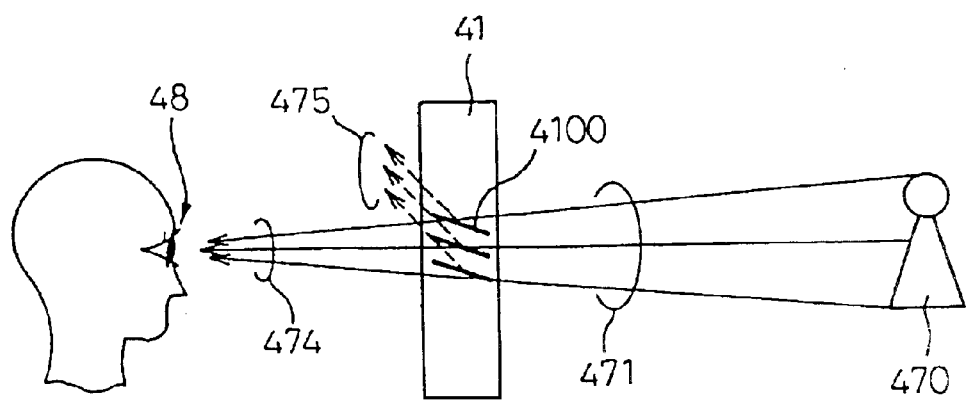
FIG. 104 is an explanatory view for the beam of light toward the observer from the object existing at the back of the hologram screen.

As shown in FIG. 104, the direction of the beam of light 471 which directs from the object 470 to the observer 48, is not changed by the interference fringe 4100 recorded on the hologram screen 41. Accordingly, the beam of light 471 becomes the beam of light 474 directing to the observer 48 through the hologram screen 41, and the observer can observe the object 470 without obscuration. As a result, the hologram screen 41 appears to be transparent by the observer 48.

In this case, a part of the beam of light 471 is diffracted by the interference fringe 4100 and output from the hologram screen 41 as the beam of light 475. Since the incident direction of the beam of light 474 is different from the incident direction of the image light, the intensity of the beam of light 475 becomes low compared to the beam of light 474. However, since there are many interference fringes 4100, the beam of light 475 may become the light having a certain grade of the intensity. When the intensity of the beam of light 475 becomes strong due to efficiency and number of the interference fringe 4100, the haze ratio of the hologram screen 41 becomes high.

However, the beam of light 474 which is not diffracted (see FIG. 104) goes straight to the observer 48, and the light path of the beam of light 474 is not bent. Accordingly, it is possible to prevent obscuration of the object 470 which is arranged at the back of the hologram screen 41. In the case of the hologram screen 41, even if it has high haze ratio compared to the normal light scattering body, it is possible to see the hologram screen as it is transparent.

On the other hand, cloudiness which causes non-transparency of the hologram screen, occurs due to the fact that the external light is diffracted by the normal interference fringe (i.e., interference fringe formed by the object light and reference light) and another interference fringe formed by two object lights (i.e., unnecessary interference fringe), and the diffracted light is output to the direction of the observer's view line. In this case, the external light indicates the lights which are input to the hologram screen, except for the image light irradiated to the hologram screen and the object light from the back of the hologram screen.

Figure 105:
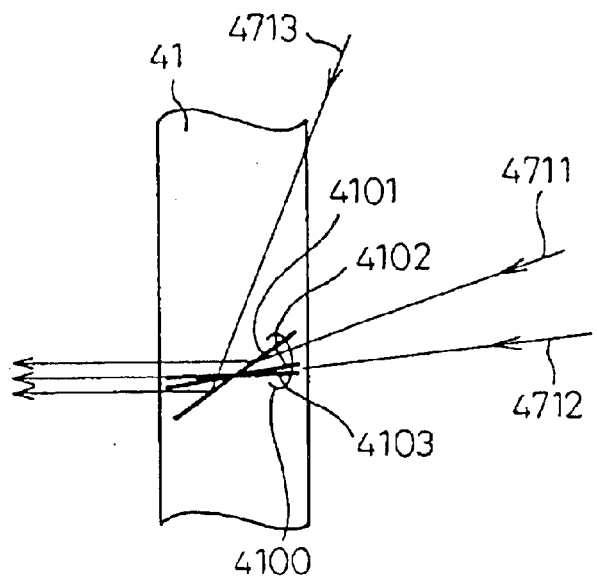
FIG. 105 is an explanatory view for the diffraction of external light due to the interference fringe on the hologram screen.

FIG. 105 is a schematic view of the interference fringe 100 recorded on the hologram screen 41. In FIG. 105, the interference fringe is shown by three lines each having different slant. However, in actuality, one line is formed by a plurality of parallel fringes so that there are many lines each having different angles.

Figure 106:
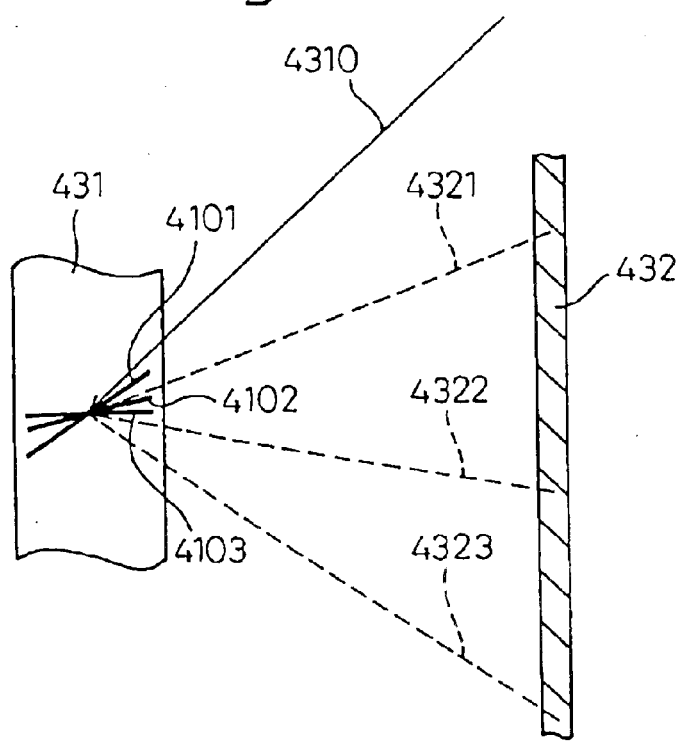
FIG. 106 is an explanatory view when forming the interference fringe on the photosensitive material.

In the interference fringe 100, the interference fringe 101 is recorded by the reference light 4310 and the object light 4321, the interference fringe 102 is recorded by the reference light 4310 and the object light 4322, and the interference fringe 103 is recorded by the reference light 4310 and the object light 4323, as shown in FIG. 106. Accordingly, in the interference fringe 100, the image light which was input from the same direction as the reference light 4310 can be effectively diffracted, but the lights which are input from other directions cannot be effectively diffracted. Further, as shown in FIG. 105, when the external lights 4711, 4712 and 4713 are input to the hologram screen 41, a part of the external light is diffracted to the direction of the observer's view line.

Figure 107:
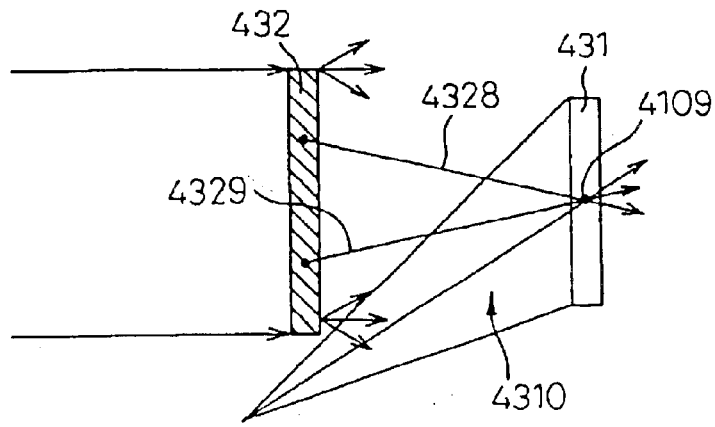
FIG. 107 is an explanatory view when forming the "Fresnel noise" on the photosensitive material.

As shown in FIG. 107, the interference fringe 4109 is normally formed by the reference light 4310 and the object lights 4328 and 4329, and, at the same time, it is also formed by the object lights 4328 and 4329. In this case, the interference fringe formed by two object lights is called "Fresnel noise", and a part of the external light is diffracted due to "Fresnel noise".

As mentioned above, when the external light is diffracted by the normal interference fringe and another interference fringe due to "Fresnel noise", and output to the direction of the observer's view line, the observer feels cloudiness of the hologram screen. That is, the cloudiness of the hologram screen is caused by a cloudy state of the whole of the surface of the hologram screen when the external light is diffracted by the interference fringe and output to the direction of the observer's view line. That is, cloudiness is not caused by the scattering of the background light. Even if the scattering extent of the background light lies in a certain high grade, i.e., even if the haze ratio is high, cloudiness of the hologram is not observed by the observer when the intensity of the external light which is diffracted to the observer is weak. As mentioned above, in the case of cloudiness of the hologram screen, even if the haze ratio is high, the cloudiness extent which is observed by the observer is small and different from cloudiness of the normal light scattering body.

Figure 108:
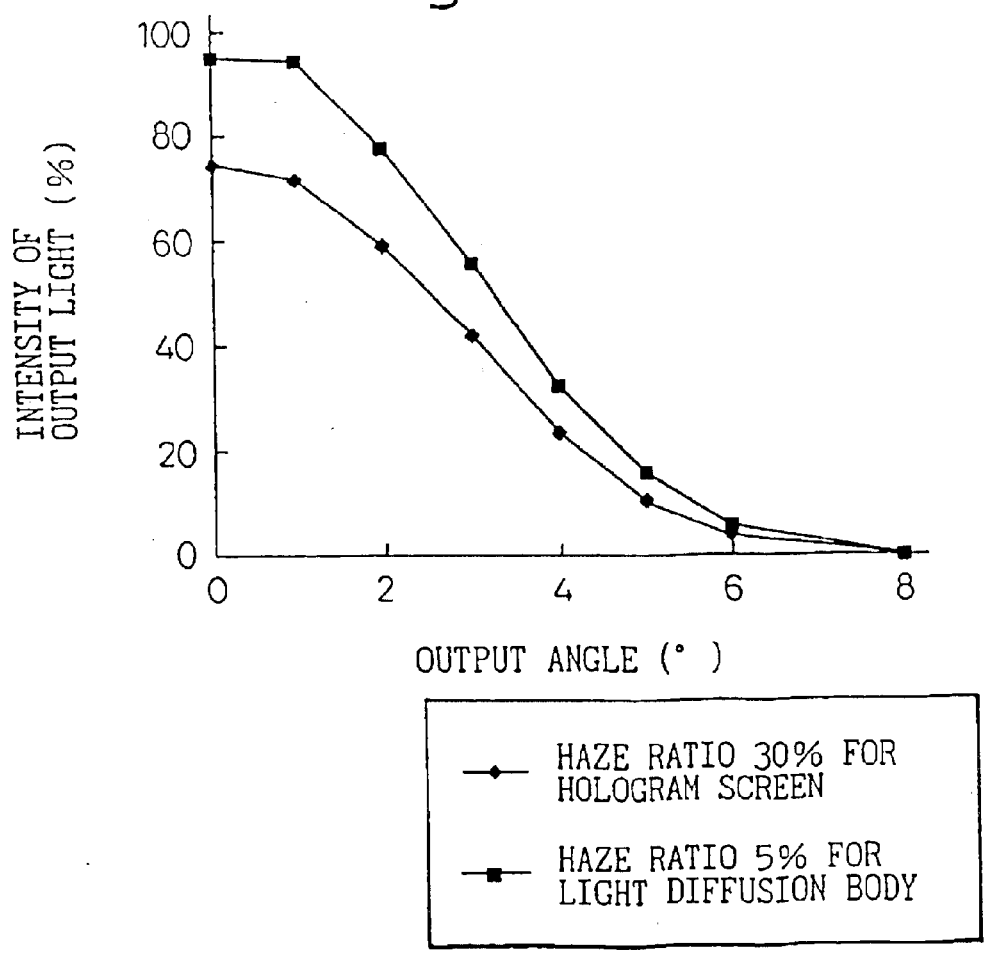
FIG. 108 is a graph for the relationship between the output angle and the intensity of output light at the normal light diffusion body and the hologram screen.

The result of comparison of the hologram screen and the normal light scattering body is explained below. The scattering characteristic (i.e., an intensity distribution for each output angle of the output light) of the transmission light of the hologram screen having the haze ratio of 30% and the light diffusion body having the haze ratio of 5% (for example, an anti-glare film AG-30 made by NITTO DENKO Co., Ltd.) is shown in FIG. 108. The hologram screen used in this embodiment was made based on a method explained in the following second embodiment.

As shown in FIG. 108, the light scattering body has the haze ratio of 5% and the intensity of the output light at the direction of the output angle of 0° is approximately 95%. On the other hand, the hologram screen has the haze ratio of 30%, and the intensity of the output light at the direction of the output angle of 0° is approximately 75%. That is, in the hologram screen, it is possible to output the beam of light having the intensity of 75%, which is not scattered. Since the light having this intensity is not scattered, it is possible to recognize the back of the hologram screen. When the haze ratio is 50%, the light can be transmitted by approximately 65% so that it is possible to sufficiently observe the back of the hologram screen. However, since the intensity of the transmission light becomes low, the back becomes slightly dark. According to the present invention, it is possible to provide the hologram screen which has good transparency and no cloudiness, and can be observed clearly at the back.

According to the invention defined in claim 27, it is preferable that a screen gain of the hologram screen is 0.3 or more. As a result, it is possible to obtain the hologram screen in which the brightness of the image on the hologram screen is not reduced. Accordingly, it is possible to obtain the hologram screen having the clear and superior image.

When the hologram screen is arranged into a popular room, the back brightness of the hologram screen becomes 400 cd/m$^2$. Accordingly, it is necessary to provide the brightness exceeding the above in the brightness of the image which is imaged on the hologram screen (see FIG. 85).

On the other hand, a high brightness type image projector (for example, a liquid crystal projector) which is available in the market has a minimum projecting display size of 40 inches. Further, it has been known that the maximum illuminance of the image projected on this display size is approximately 4000 lux. Further, in general, the screen gain can be obtained based on the following formula.

(screen gain)=(brightness×π)/illuminance

Accordingly, the screen gain which becomes the illuminance of 4000 (lux) and the brightness of 400 (cd/m$^2$) is approximately 0.3. As mentioned above, it is necessary to set the screen gain to 0.3 or more in order not to reduce the brightness of the image on the hologram screen. If the screen gain is 0.3 or less, the image on the hologram screen becomes dark, and it may be difficult to distinguish from the back of the hologram screen. In this case, the upper limit of the screen gain must be determined so as not to exceed the haze ratio of 60% since the haze ratio is increased in accordance with increase of the screen gain. Accordingly, the screen gain cannot be determined uniformly since it is dependent on the characteristic of the hologram screen.

According to the invention defined in claim 28, in the transmission type or reflection type hologram screen, the intensity ratio $E_R/E_O$ of the intensity $E_O$ of the object light and the intensity $E_R$ of the reference light is changed in accordance with the scattering angle of the light diffusion body. In this case, the scattering angle of the light diffusion body is an angle determined when the intensity ratio $I\theta/I_O$ is 0.5. Where, the intensity $I_O$ is defined by the light intensity which is output perpendicularly (i.e., direction of angle 0°) from the light diffusion body, and the intensity $I\theta$ is defined by 1the light intensity which is output to the direction of angle 0°) from the light diffusion body.

Figure 109:
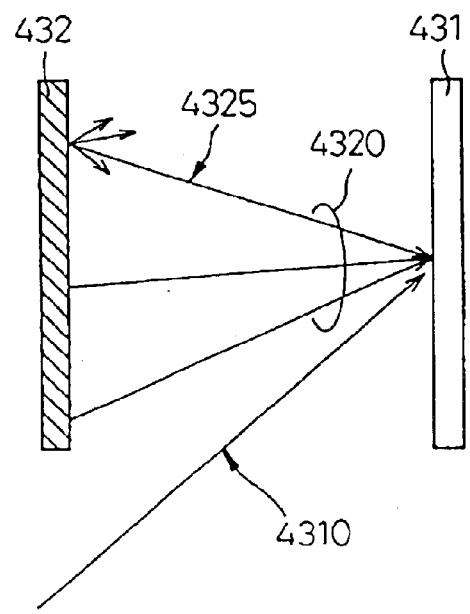
FIG. 109 is an explanatory view in the case when a plurality of object lights and one reference light are irradiated to the same position on the photosensitive material.

As shown in FIG. 109, the intensity $E_O$ of the object light 4320 and the intensity $E_R$ Of the reference light 4310 are given by a sum of intensity of the object light 4310 and the reference light 4320 which are irradiated on a unit area of the photosensitive material from all directions. Even if the intensity ratio $E_R/E_O$ is constant, since the scattering angle of the light diffusion body is changed, the intensity $I\theta_O$ of the object light 4325 which is output to a certain direction, i.e., direction of the angle θ, becomes weak. When the intensity $I\theta_O$ obecomes weak, the efficiency $\eta_{RO}$ of the interference fringe becomes low.

Accordingly, when the scattering angle of the light diffusion body is changed, it is necessary to change the intensity $I\theta_O$ in order not to decrease the efficiency $\eta_{RO}$. In this case, to change the intensity $I\theta_O$ means the change of the intensity $E_O$, i.e., the intensity ratio $E_R/E_O$. If the efficiency $\eta_{RO}$ becomes low, the reduced image becomes dark.

Further, even if the intensity ratio $E_R/E_O$ is constant, the efficiency of the "Fresnel noise" which is formed by the interference fringe between two object lights becomes large when the scattering angle of the light diffusion body becomes large. As mentioned above, when the efficiency of the "Fresnel noise" becomes large, the cloudiness of the hologram screen becomes large so that the it becomes the non-transparent state. Accordingly, it is necessary to change the intensity ratio $E_R/E_O$ in order to decrease the efficiency of the "Fresnel noise".

As mentioned above, by changing the intensity ratio $E_R/E_O$ in accordance with a size of the scattering angle of the light diffusion body, it is possible to increase the efficiency $\eta_{RO}$ and to decrease the efficiency of the "Fresnel noise". In the hologram screen in which the efficiency $\eta_{RO}$ is higher and the efficiency of the "Fresnel noise" is lower, the incident light to the hologram screen is not scattered so that it is possible to irradiate the output light with high efficiency. That is, it is possible to easily produce the hologram screen having the haze ratio of 5 to 60%.

When the haze ratio is 5 to 60%, it is possible to irradiate the image light with high efficiency. In this case, the scattering extent of the light, which is input from other light sources except for the image projector to the hologram screen, becomes low. Accordingly, when the observer observes the hologram screen, the cloudiness of the hologram screen due to the external light is small, the light from the back of the hologram screen is transmitted without cloudiness, and can reach the observer. Accordingly, the observer can clearly observe the back through the hologram screen. That is, according to the fourth aspect of the present invention, it is possible to produce the transparent hologram screen without cloudiness.

In the exposure optical system, as a method for changing the scattering angle of the light diffusion body, there are two methods, i.e., a method for exchanging the light diffusion body, and a method for using the light diffusion body integrated by laminating a plurality of light scattering bodies each having the same scattering angle or each having different scattering angle.

Further, the intensity ratio $E_O/E_R$ by suitably changing the intensities $E_O$ and $E_R$. For example, it is possible to adjust the change of the intensities $E_O$ and $E_R$ by suitably changing the reflection factor of each mirror and magnification of the object lens. In particular, it is preferable to change the reflection factor of the half-mirror since it is possible to avoid loss of the laser light.

In the producing method in this embodiment, it is possible to utilize a photopolymer and dichromated gelatin as the photosensitive material. However, there is the following problem. That is, since it is necessary to provide a wet type development process in the producing process using the dichromated gelatin, there is a problem in which cracks occur on the photosensitive material during producing process so that cloudiness occurs on the hologram screen. In the present invention, however, it is possible to provide the hologram screen without cloudiness by using various photosensitive materials, and to obtain the transparent hologram screen.

According to the invention defined in claim 29, when enlarging the scattering angle of the light diffusion body, it is preferable to reduce the above intensity ratio $E_R/E_O$. As a result, it is possible to obtain the hologram screen without cloudiness since the haze ratio becomes 5 to 60% or less.

Further, it is possible to obtain the diffusion light having broad extent by enlarging the scattering angle of the light diffusion body, and to also obtain the hologram screen having broad view field by using the diffusion light as the object light. In the hologram screen having broad view field, since the image can be observed without a narrow limitation of the observer position, this hologram screen can be utilized without limitation in the place in actual use.

Figure 85:
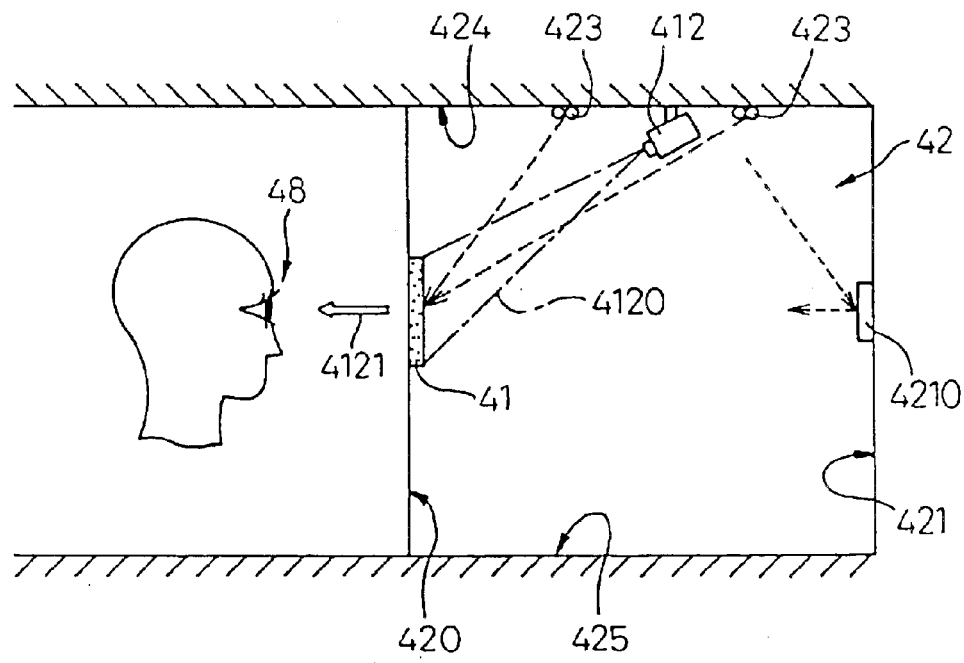
FIG. 85 is an explanatory view for the relationship between a showroom and the hologram screen according to a first embodiment of the fourth aspect of the present invention.

The embodiment will be explained with reference to FIGS. 85 to 87 below. As shown in FIG. 85, the image light 4120 from the image projector 412 is scattered and diffused so that the output light 4121 can be obtained. Further, the hologram screen has the haze ratio of 5 to 60%.

As shown in FIG. 85, the hologram screen 41 is arranged in a showroom 42. In the showroom 42, an exhibition 4210 is mounted on a wall 421, and the hologram screen 41 is mounted on an inside of a window glass 420. The observer 48, who positioned at the outside of the showroom 42, can observe the image on the hologram screen 42. Further, a lamp 423 is mounted on a ceiling 424 of the showroom 42, and the light from the lamp 423 becomes a part of the output light passing through the hologram screen 41 and is sent to the observer 48. The light from the lamp 423 is irradiated on the exhibition 4210, and reflected thereby. Further, the light reflected by the exhibition is sent to the observer 48. A liquid crystal projector is used as the image projector 412 which is mounted on the ceiling 424.

In this embodiment, the hologram screen 41 is the transmission type, and a method of producing the hologram screen was explained in the second embodiment. On the other hand, as shown in FIG. 111, it is possible to arrange the image projector 412 at the same side of the observer 48 by using the reflection type hologram screen. Further, it is possible to arrange the image projector 412 on the floor 425.

Next, in the hologram screen according to the embodiment, an evaluation test was performed regarding the relationship between the haze ratio and the cloudiness which was observed by the observer as follows. That is, in an environment shown in FIG. 85, the evaluation test was performed by twenty observers regarding visual recognition of the exhibition 4210 and grade of cloudiness of the hologram screen.

As a method for obtaining the hologram screen having different haze ratio which was used in this evaluation test, the method for producing the hologram screen shown in the embodiment was utilized. That is, the intensity ratio $E_R/E_O$ of the reference light and the object light is changed in accordance with the scattering angle of the light diffusion body in the exposure optical system shown in FIG. 88. One hologram screen was formed by laminating a plurality of hologram screens in order to obtain the desired haze ratio.

The hologram screen 41 used in the evaluation test has the width across corners of 20 inches. The horizontal illuminance of the light from the lamp 423 was 1000 (lux), and the brightness on the wall 421 which becomes the background of the hologram screen 41 was 400 (cd/m$^2$). Further, the distance between the wall 421 and hologram screen 41 was 5 m, and the illuminance at the side of the observer 48 was 1000 (lux). Since the average illuminance is 500 (lux) in an office room, and a small shop, such as a convenience store, is 700 (lux), the brightness of the lamp 423 was set to 1000 (lux).

The visual recognition of the back of the hologram screen 41 was evaluated by the following test. That is, Gothic black characters including Chinese characters and alphabet, and each having a size of 36-point, were drawn on a white paper. This white paper was mounted on the wall 421 as the background of the hologram screen and as the exhibition 4210. This exhibition 4210, which is not irradiated by the image projector 412, was observed by the observer 48 who positioned apart from the hologram screen 41 by two meters. Then, the state of the characters (i.e., whether it is easy for the observer to read characters on the white paper) and the cloudiness extent of the back due to the hologram screen, were subjectively evaluated by the observers.

Figure 86:
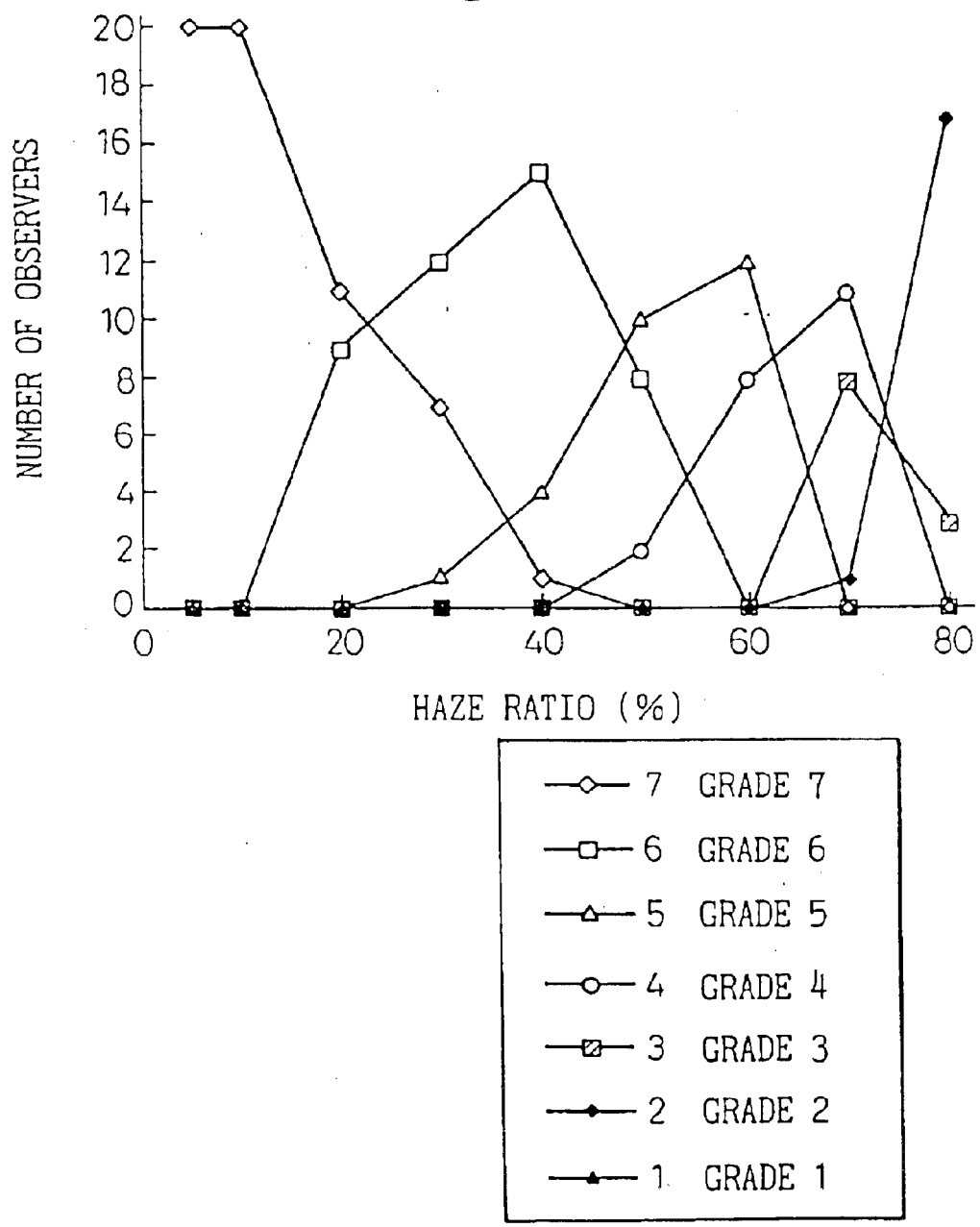
FIG. 86 is a graph for the relationship between a haze ratio and the number of observers, i.e., evaluation level when reading characters on the screen by observers in the first embodiment.
Figure 87:
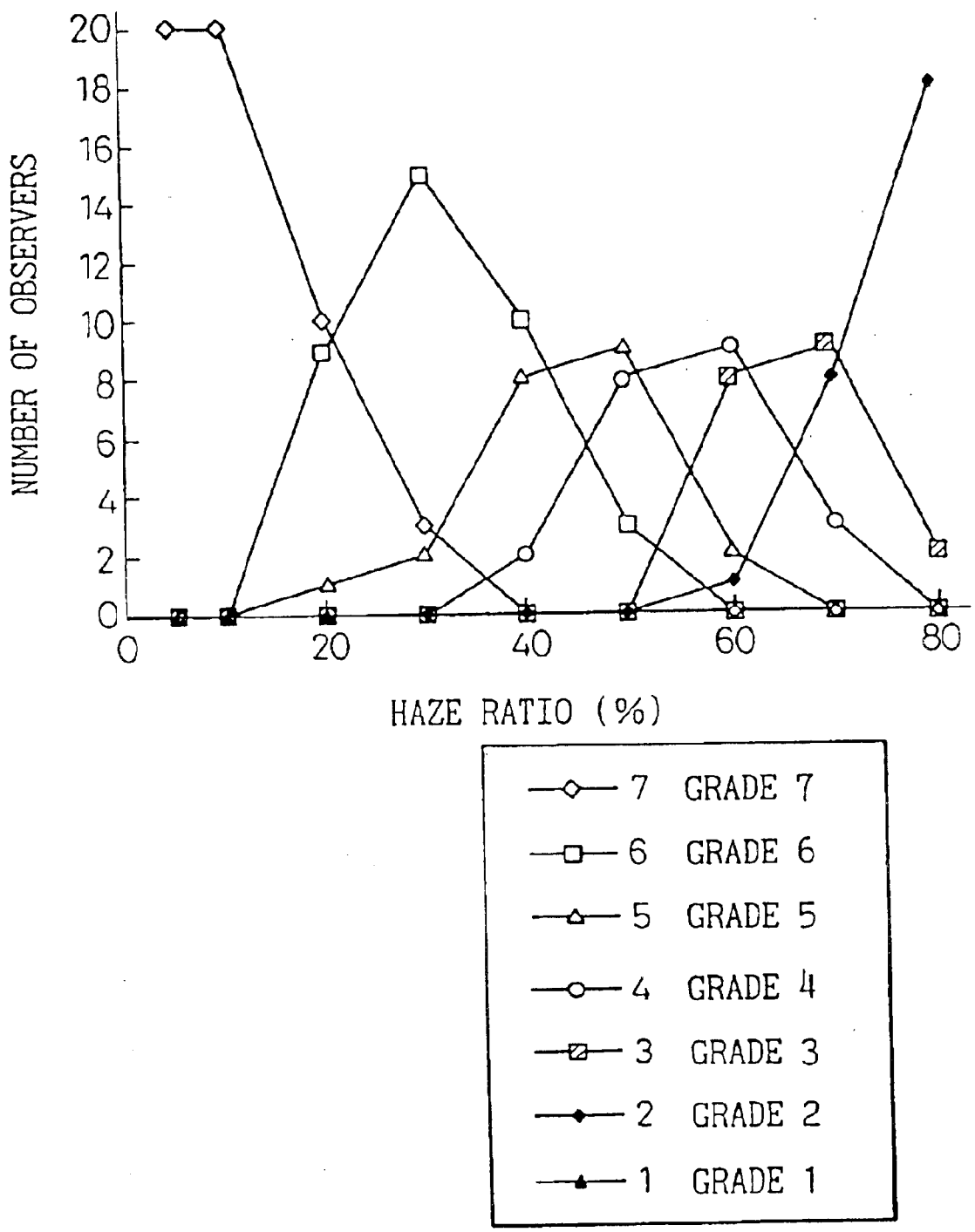
FIG. 87 is a graph for the relationship between the haze ratio and the number of observers, i.e., evaluation level of cloudiness on the screen in the first embodiment.

The result of the evaluation is shown in FIGS. 86 and 87. In FIG. 86, the evaluation scale was determined as follows. That is, GRADE 7 denotes "very easy to read", GRADE 6 denotes "easy to read", GRADE 5 denotes "slightly easy to read", GRADE 4 denotes "either of them", GRADE 3 denotes "slightly difficult to read", GRADE 2 denotes "difficult to read", and GRADE 1 denotes "cannot read".

On the other hand, in FIG. 87, the evaluation scale was determined as follows. That is, GRADE 7 denotes "completely transparent", GRADE 6 denotes "almost transparent", GRADE 5 denotes "slightly cloudy, but don't mind", GRADE 4 denotes "slightly cloudy, but either of them", GRADE 3 denotes "cloudy, and do mind", GRADE 2 denotes "cloudy, and do mind strongly", and GRADE 1 denotes "completely non-transparent".

As shown in FIG. 86, when the haze ratio of the hologram screen 41 is 60% or less, all twenty observers judged as "no problem to read characters" (i.e., all observers lie in GRADE 4 or more). Further, as shown in FIG. 87, when the haze ratio is 60% or less, all observers observe slightly cloudy state, but don't mind feeling of difference (i.e., all observers lie in GRADE 4 or more). As mentioned above, when the haze ratio is 60% or less, it is possible to clearly observe the back through the hologram screen, and to obtain the image without cloudiness.

(Second Embodiment)

Figure 88:
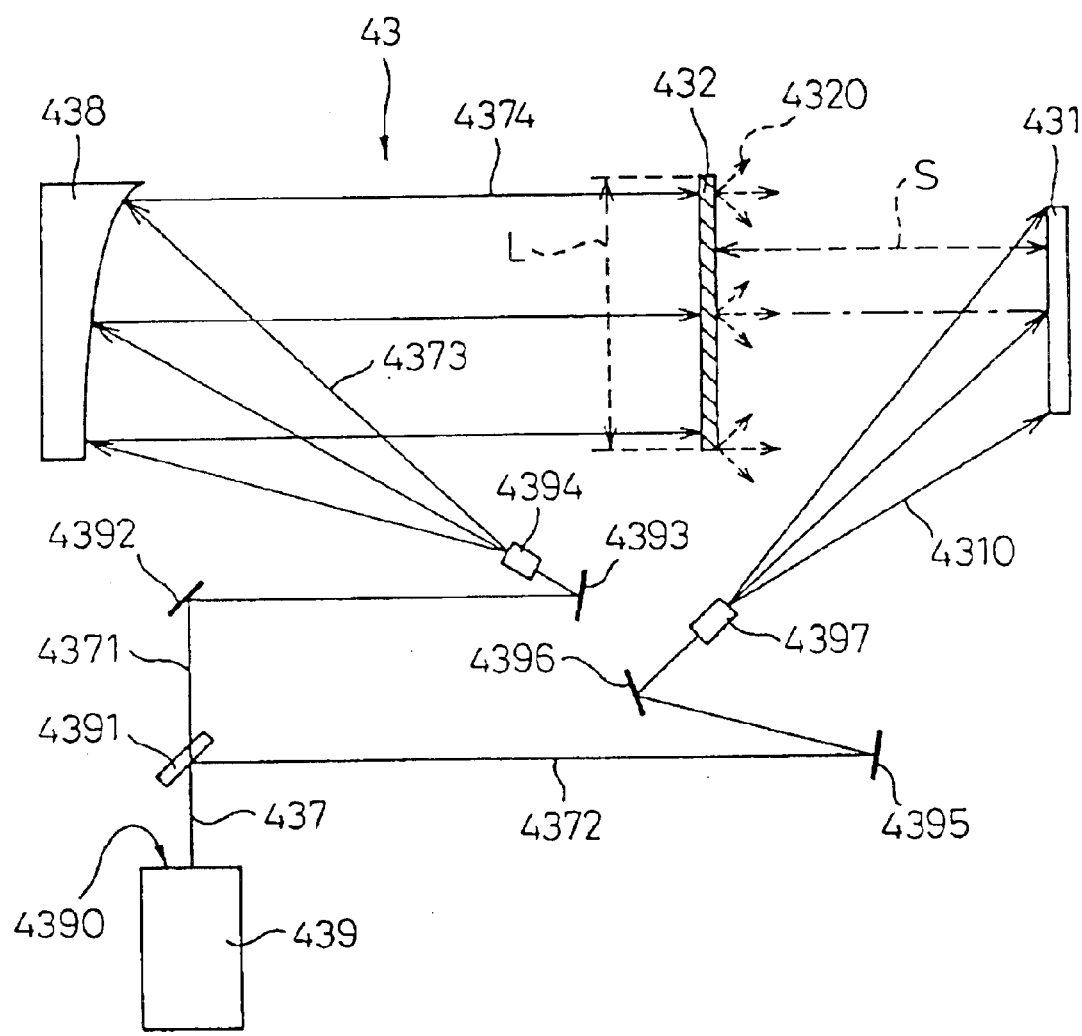
FIG. 88 is an explanatory view for the exposure optical system in the second embodiment of the fourth invention.

The method for producing the hologram screen is explained with reference to FIGS. 88 to 102. As shown in FIG. 88, the object light 4320 and the reference light 4310 are irradiated on the photosensitive material 431 in order to form (record) the interference fringe thereon. When changing the scattering angle of the light diffusion body 432, the intensity ratio $E_R/E_O$ of the intensity $E_O$ of the object light 4320 and the intensity $E_R$ of the reference light 4310 is changed.

In FIG. 88, the exposure optical system 43 is provided for producing the hologram screen. In this structure, the adjustment of the intensity ratio $E_R/E_O$ of the intensity $E_O$ of the object light 4320 and the intensity $E_R$ of the reference light 4310 was performed by suitably changing the transmission factor of the half mirror 4391, the reflection factor of each mirror 4392, 4393, 4395 and 4396, and the magnification of the object lens 4394 and 4397.

In this case, there is the relationship of L/S=3/2 between the distance L (i.e., a length of light diffusion body 432) and the distance S0 (i.e., a distance between the light diffusion body 432 and the photosensitive material 431). Further, the photopolymer made by Dupont Co., Ltd. having the thickness of 6 μm was used as the photosensitive material 431, and the double-faced ground glass having the surface roughness of #1000 was used as the light diffusion body 432.

As mentioned above, the object light 4320 and the reference light 4310 are irradiated onto the photosensitive material 431 in order to record the interference fringe thereon. An amount of the exposure on the photosensitive material 431 was 30 mJ/cm². After completion of the interference fringe, the ultraviolet was irradiated on the photosensitive material 431 with the intensity of 0.1 mJ/cm², and the photosensitive material 431 was heated by temperature 120° C. during two hours, so that the hologram screen was obtained.

Figure 89:
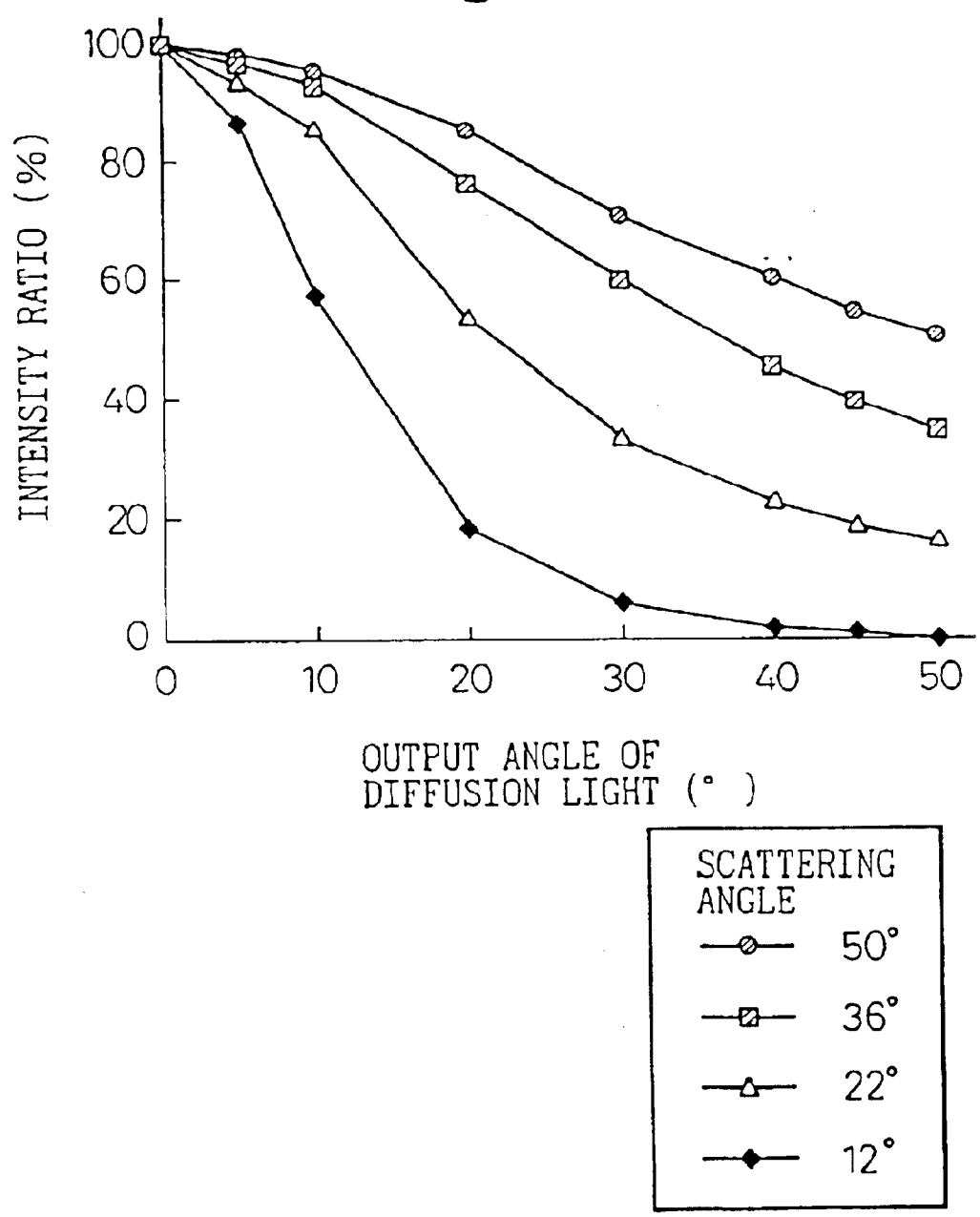
FIG. 89 is a graph for the relationship between the output angle of the diffusion body and the intensity ratio at various scattering angles in the second embodiment.
Figure 91:
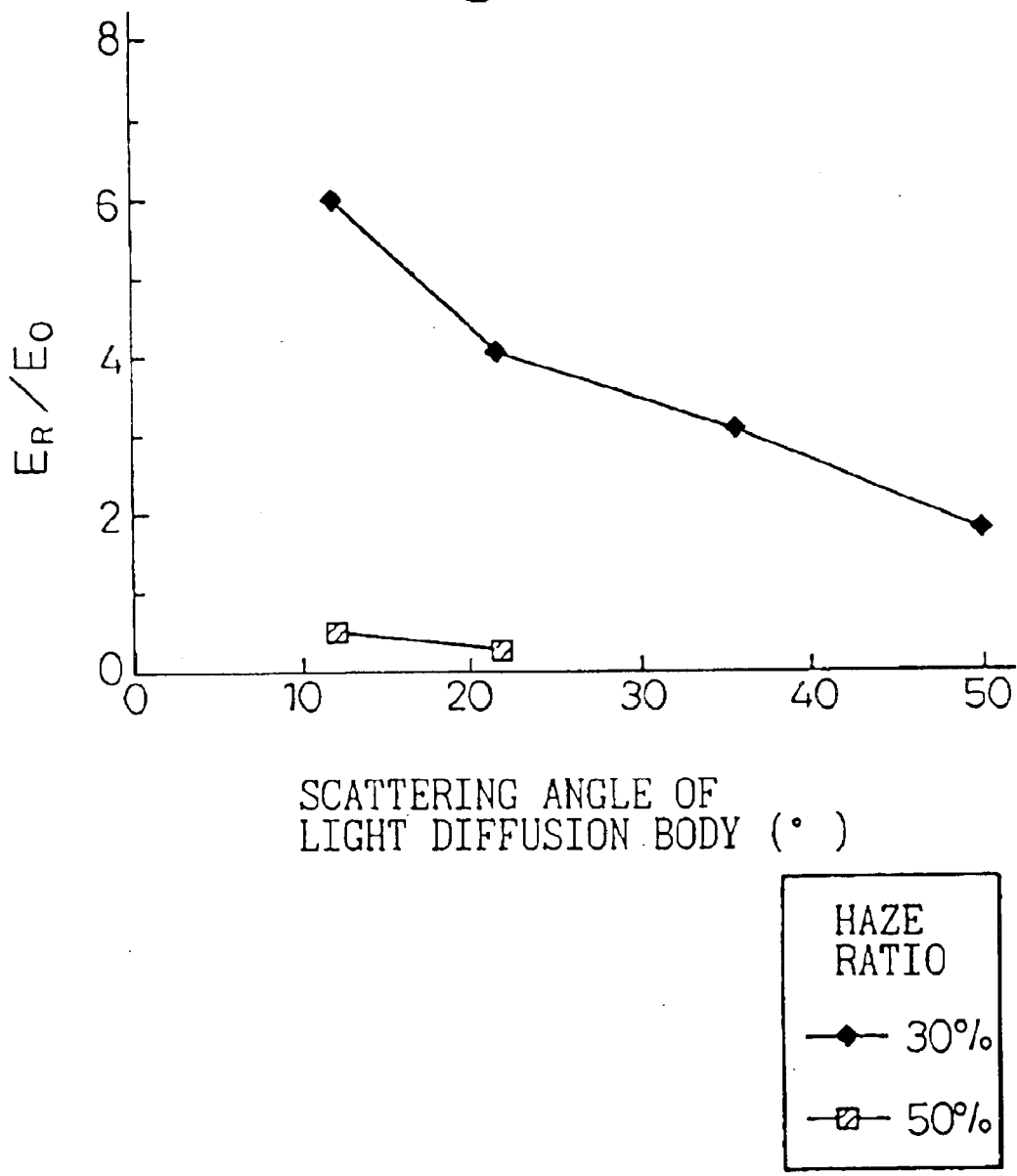
FIG. 91 is a graph for the relationship between the scattering angle of the light diffusion body and the intensity ratio $E_R/E_O$ at the different haze ratio in the second embodiment.

Since the photosensitive material 431 is formed by a thin film, when it is used as the hologram screen, the thin film is supported by a transparent plate which is bonded thereto. Various performances of the above hologram screen were evaluated by the following test. In this test, the light diffusion body was formed by four kinds of light diffusion bodies each having different angle as shown in FIG. 89. The haze ratio of each hologram screen was measured as shown in FIG. 90. As shown in FIG. 90, when the intensity $E_O/E_R$ is the same, the haze ratio becomes small in accordance with increase of the scattering angle of the light diffusion body. On the other hand, when the haze ratio is the same, the intensity $E_O/E_R$ becomes small in accordance with increase of the scattering angle of the light diffusion body. As is obvious from the graph, when the intensity $E_O/E_R$ becomes large, the above characteristic appears considerably. In FIG. 91, the relationship between the scattering angle and the intensity $E_O/E_R$ in the case of the haze ratio of 30% and 50% is shown in FIG. 91.

Further, the relationship between the haze ratio and the intensity $E_R/E_O$ due to the "Fresnel noise" formed by the interference fringe between two object lights, was checked as follows. That is, in the exposure optical system 43 shown in FIG. 88, the light diffusion body having the scattering angle of 36° was used, and the haze ratio due to the "Fresnel noise" was checked for the case only when the intensity $E_R/E_O$ is 20 or less, as shown in FIG. 93.

Figure 93:
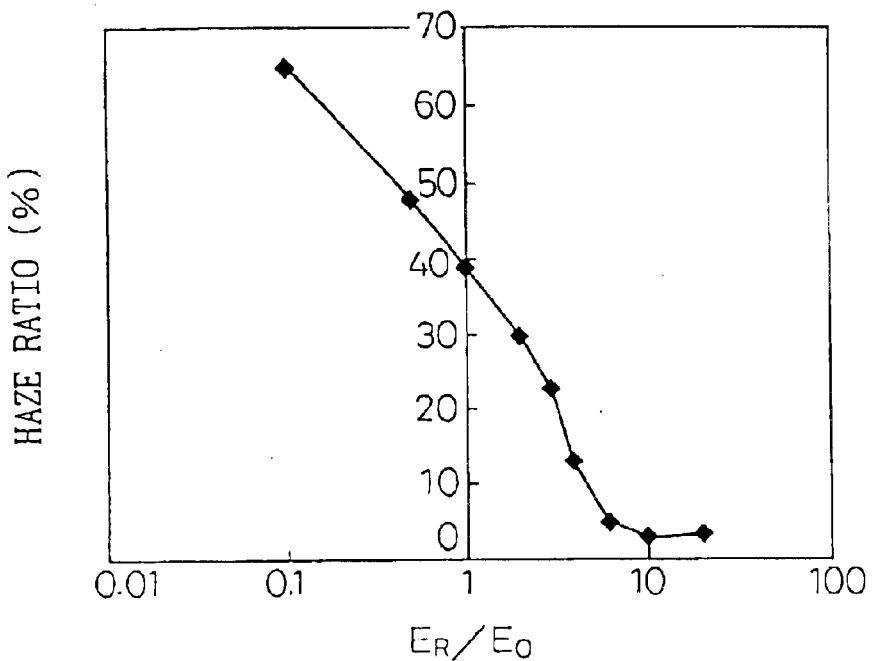
FIG. 93 is a graph for the relationship between the intensity ratio $E_R/E_O$ and the haze ratio when using the light diffusion body having the scattering angle of 36° in the second embodiment.

As shown in FIG. 93, when the intensity $E_R/E_O$ is 6 or less, the haze ratio is considerably increased. When the intensity $E_R/E_O$ is 10 or more, the haze ratio becomes constant by approximately 3%. Accordingly, the haze ratio of 3% is considered as the haze ratio based on the material itself which forms the hologram screen.

Figure 92:
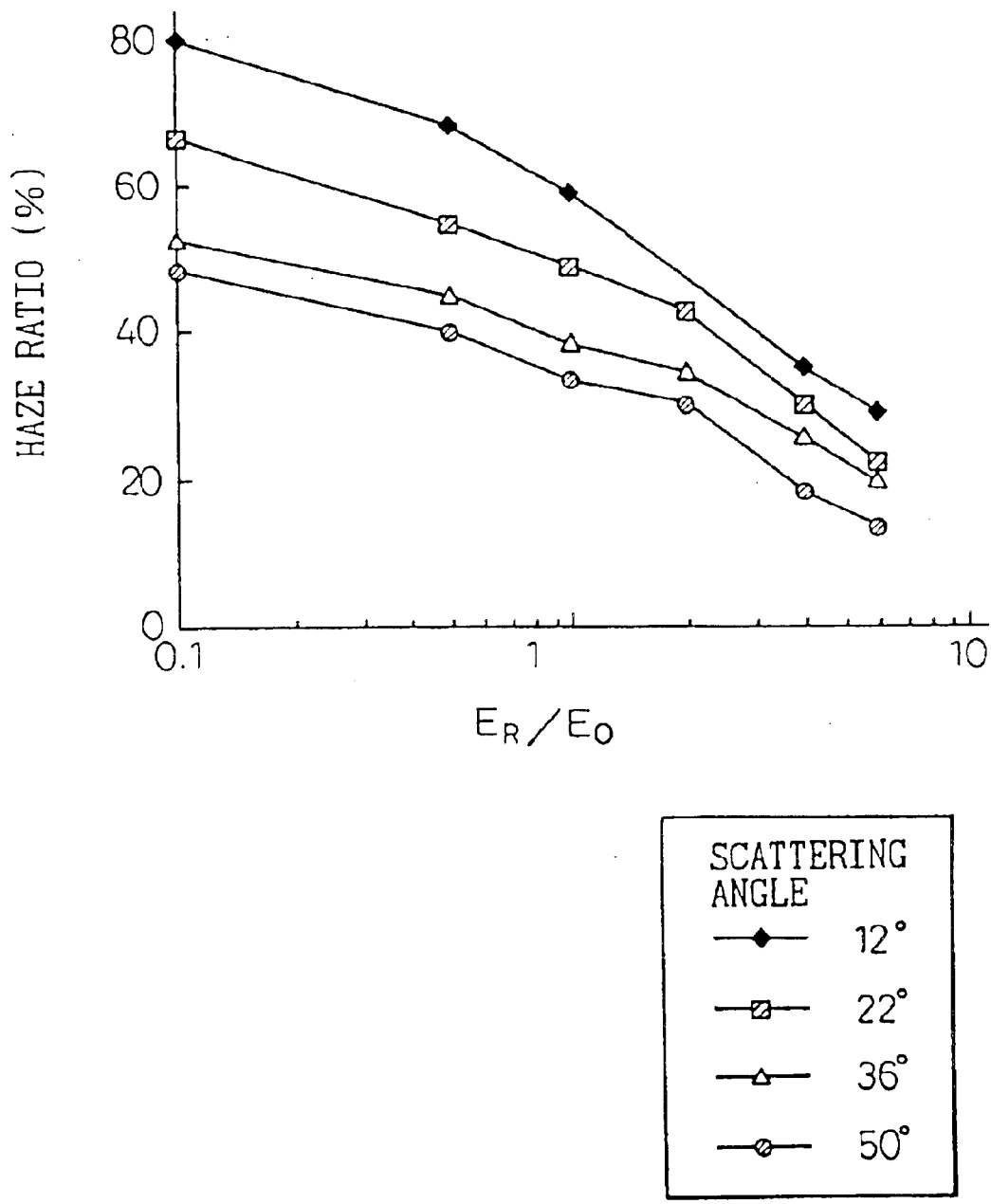
FIG. 92 is a graph for the relationship between the intensity ratio $E_R/E_O$ and the haze ratio at various scattering angles of the light diffusion body in the second embodiment.

Further, as is obvious from comparison of the graph of FIG. 90 with the graph of FIG. 92, the hologram screen having the interference fringe due to the "Fresnel noise" has the lower haze ratio. This reason is as follows. That is, when the photosensitive material is exposed by only object light, all energy of the object light are used for the preparation of "Fresnel noise". However, when there is the reference light, an amount of energy to be consumed for the "Fresnel noise" becomes small. Further, the haze ratio based on the normal interference fringe formed by the object light and the reference light becomes low. On the other hand, the haze ratio which occurs in the large intensity $E_R/E_O$ is almost caused by the normal haze ratio.

Accordingly, when producing the hologram screen having relatively high haze ratio, if the haze ratio due to the "Fresnel noise" is checked as shown in FIGS. 92 and 93, and if the intensity of the object light and the amount of exposure are set to the same as the desired haze ratio, it is possible to set the haze ratio of the hologram screen to a value lower than the desired haze ratio.

AS shown in FIG. 92, in the case of the hologram screen produced based on the "Fresnel noise" and the scattering angle of 12° as the light diffusion body, the haze ratio becomes 5% when the intensity $E_R/E_O$ is 6. For the hologram screen having the haze ratio of 5%, a "completely transparent" hologram screen was recognized by all twenty observers (i.e., This corresponds to GRADE 7 of the evaluation).

On the other hand, as shown in FIG. 90, in the case of the hologram screen produced based on the normal interference fringe and the scattering angle of 12° as the light diffusion body, the haze ratio becomes 20% when the intensity $E_R/E_O$ is 6. For the hologram screen having the haze ratio of 20%, a "transparent" hologram screen was recognized by all twenty observers (i.e., This corresponds to GRADE 6 and GRADE 7).

When the hologram screen is produced based on the above processes, it is possible to reduce the haze ratio due to the "Fresnel noise" until the grade in which there is no influence for cloudiness of the hologram screen. Further, it is possible to reduce the haze ratio due to the normal interference fringe until the grade in which the transparency of the hologram screen can be ensured.

Figure 94:
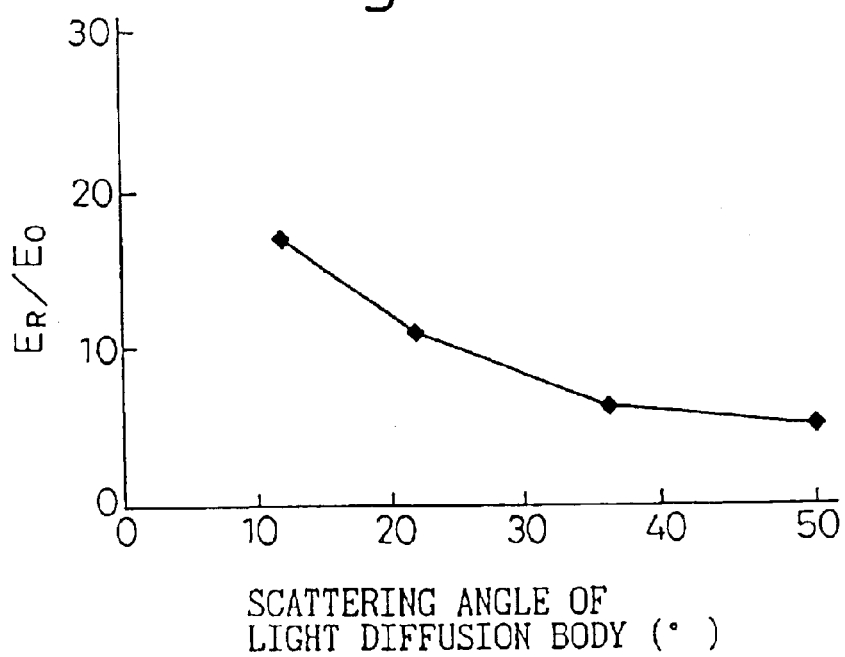
FIG. 94 is a graph for the relationship between the scattering angle of the light diffusion body and the intensity ratio $E_R/E_O$ when producing the hologram screen having the haze ratio of 5% in the second embodiment.

Next, in the exposure optical system shown in FIG. 88, the relationship between the scattering angle of the light diffusion body used at the production of the hologram screen and the intensity $E_R/E_O$ at the exposure is shown in FIG. 94. Since the haze ratio of the hologram screen is approximately 5%, it is very transparent (see FIGS. 86 and 87). When the scattering angle becomes large, it is possible to obtain the hologram screen having the same haze ratio by reducing the intensity $E_R/E_O$.

Figure 95:
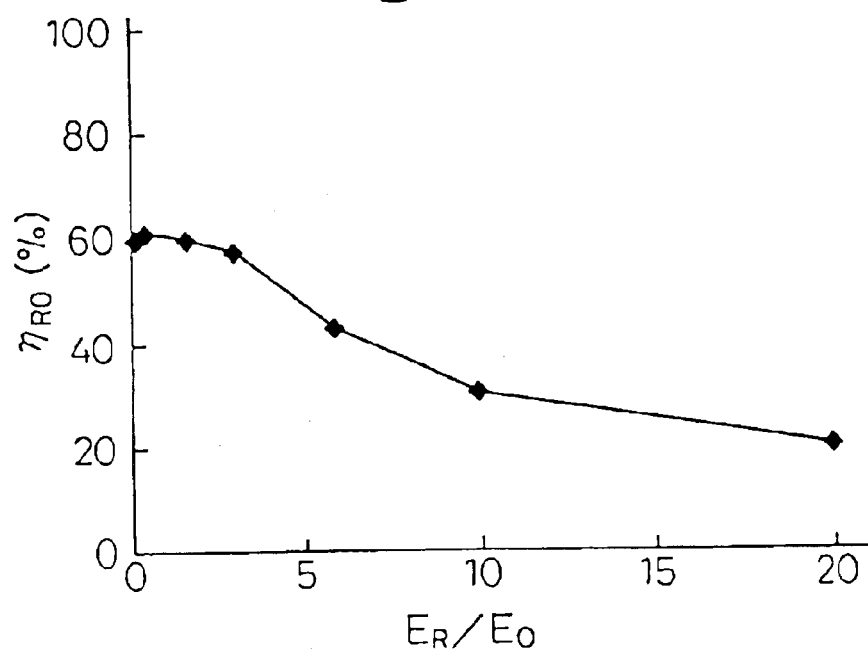
FIG. 95 is a graph for the relationship between the intensity ratio $E_R/E_O$ and a diffraction efficiency $\eta_{RO}$ of the normal interference fringe at the hologram screen which is produced by using the light diffusion body having the scattering angle of 36° in the second embodiment.
Figure 96:
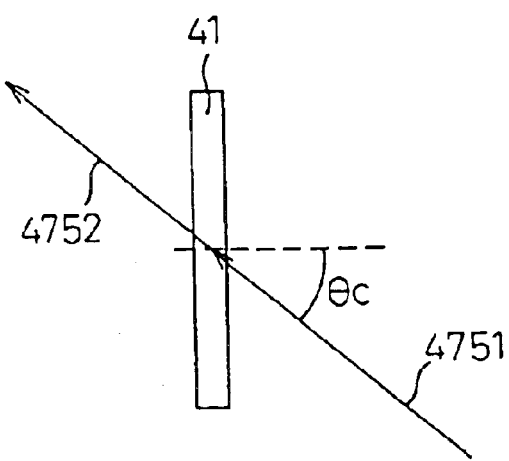
FIG. 96 is an explanatory view for a measuring method of the diffraction efficiency in the second embodiment.
Figure 97:
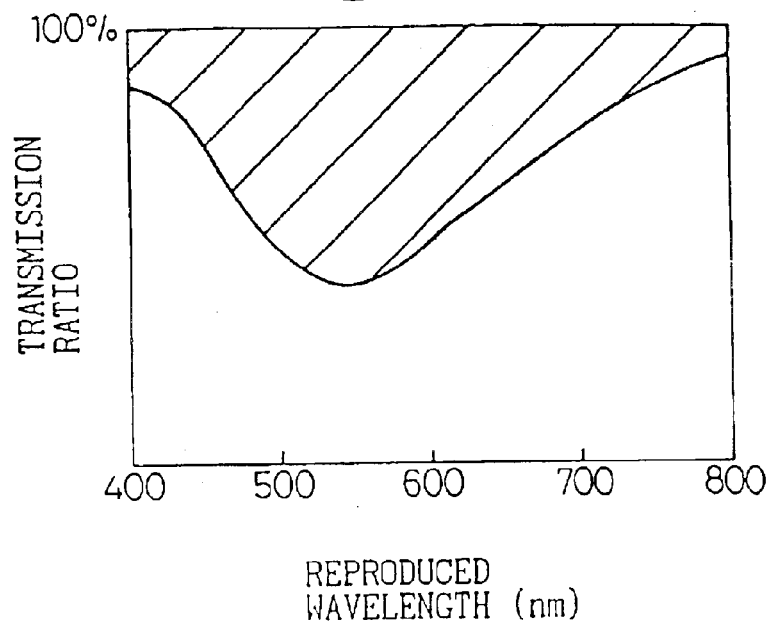
FIG. 97 is a graph for the reproduced wavelength and the transmission ratio in order to calculate the diffraction efficiency.

Further, the relationship between the diffraction efficiency $\eta_{RO}$ Of the normal interference fringe at the hologram screen, which was produced by using the light diffusion body of the scattering angle of 36°, and the intensity $E_R/E_O$ at the exposure, as shown in FIG. 95. In the measurement of the diffraction efficiency $\eta_{RO}$, as shown in FIG. 96, the light 4751 was irradiated with the angle θc to the hologram screen 41, and the light 4752, which was transmitted through the hologram screen 41 without diffraction by the interference fringe, was measured. The distribution of the transmitted light 4752 is shown in FIG. 97, and an area shown by slant lines is defined as the diffraction efficiency $\eta_{RO}$ of the hologram screen.

As shown in FIG. 95, the diffraction efficiency $\eta_{RO}$ becomes large in accordance with decrease of the intensity $E_R/E_O$. When the intensity $E_R/E_O$ is 3 or less, it becomes approximately constant. Accordingly, as shown in FIGS. 90 and 95, when producing the hologram screen, by producing it when the intensity $E_R/E_0$ is 3, it is possible to reduce the haze ratio of the hologram screen without decrease of the normal diffraction efficiency $\eta_{RO}$. Further, since the hologram screen has the haze ratio of 30%, cloudiness of the hologram screen was not recognized by the observers (see FIGS. 86 and 87).

Figure 98:
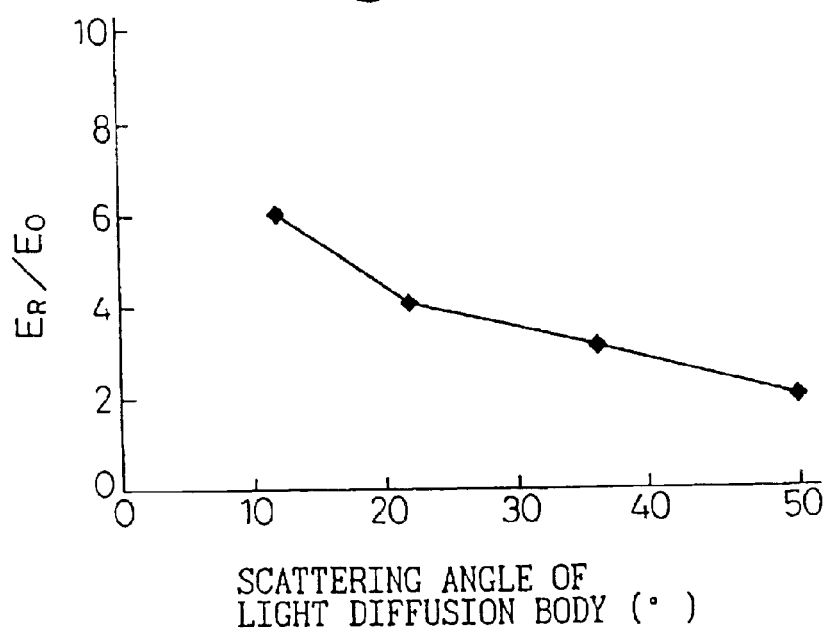
FIG. 98 is a graph for the relationship between the scattering angle of the light diffusion body and the intensity ratio $E_R/E_O$ in the second embodiment.
Figure 99:
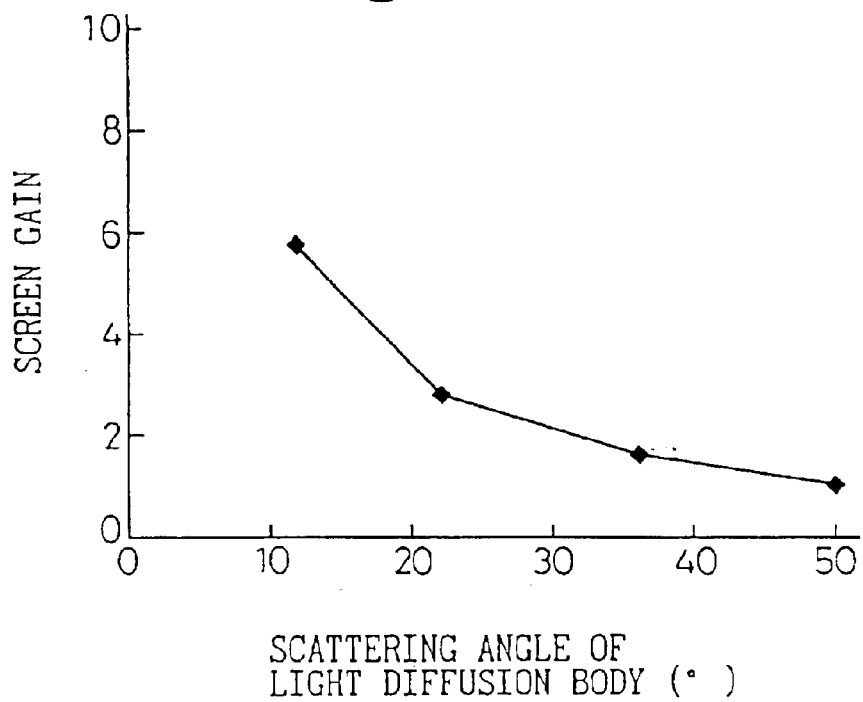
FIG. 99 is a graph for the relationship between the scattering angle of the light diffusion body and the screen gain in the second embodiment.

Further, the intensity $E_R/E_O$ is obtained for each light diffusion body shown in FIG. 89, and the relationship between the intensity and the scattering angle is shown in FIG. 98. As shown in FIG. 98, it is necessary to reduce the intensity $E_R/E_O$ in accordance with increase of the scattering angle of the light diffusion body. The screen gain of the hologram screen shown in FIG. 98 is shown in FIG. 99. As shown in FIG. 99, the screen gain at each scattering angle exceeds 0.3.

As shown in FIGS. 90 and 95, the haze ration becomes high in accordance with increase of efficiency of the hologram screen. Further, as shown in FIG. 92, the haze ratio due to the "Fresnel noise" also becomes high.

As is obvious from the above explanations, in the case that the brightness of the image is not always necessary, i.e., the efficiency of the hologram screen is not always required based on an environmental conditions using the hologram screen, it is possible to produce the hologram screen having good transparency by reducing the diffraction efficiency $\eta_{RO}$ of the hologram screen.

Further, in the change of the scattering angle of the light diffusion body 432, the scattering angle is adjusted in such a way that, the larger the scattering angle, the smaller the intensity ratio $E_R/E_O$, when changing the intensity ratio $E_R/E_O$. As a result, it is possible to clearly observe the back through the hologram screen, and to produce the hologram screen having no cloudiness and good transparency. Further, when the screen gain is 0.3 or more, it is possible to produce the hologram screen which can clearly recognize the image.

Figure 100:
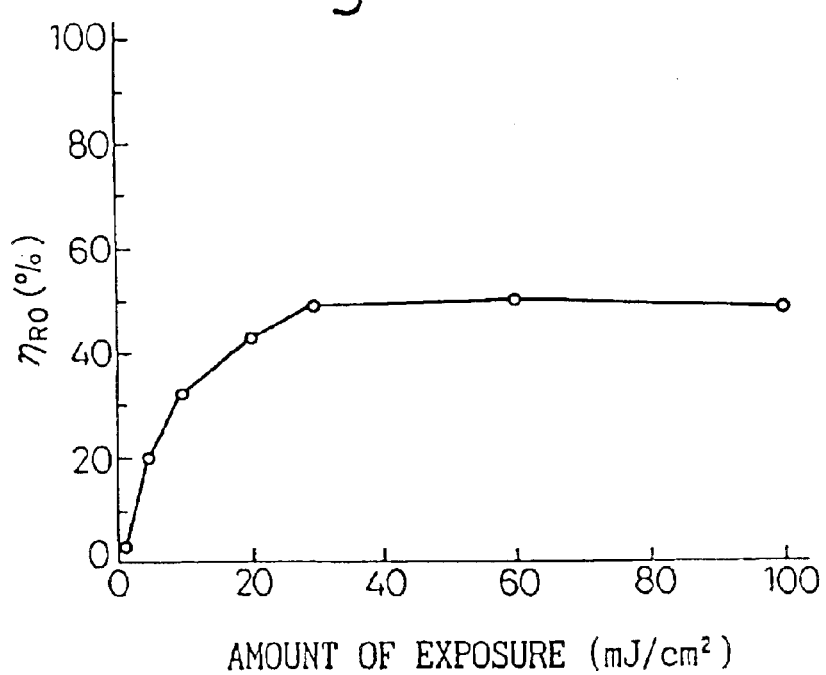
FIG. 100 is a graph for the relationship between the amount of exposure and the diffraction efficiency $\eta_{RO}$ of the interference fringe in the second embodiment.
Figure 101:
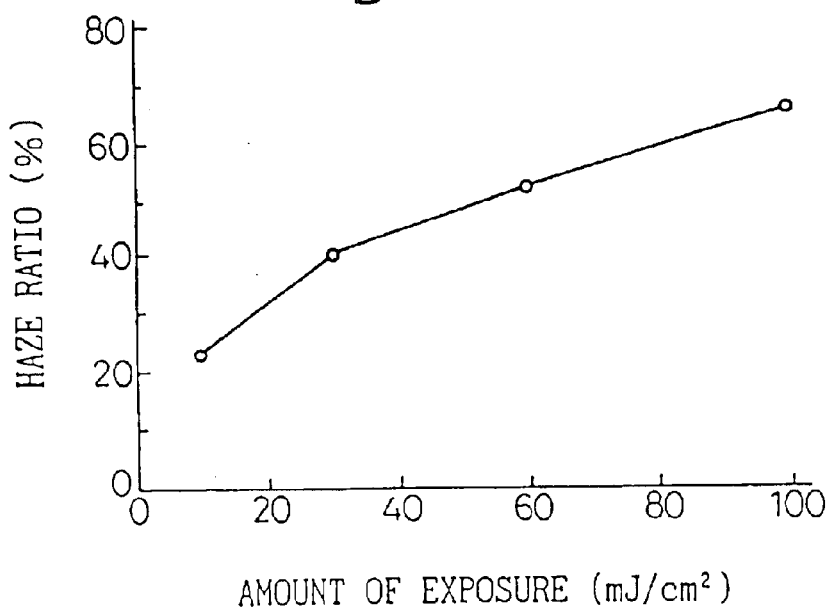
FIG. 101 is a graph for the relationship between the amount of exposure and the haze ratio of the hologram screen in the second embodiment.

Even if the exposure conditions is set as the diffraction efficiency $\eta_{RO}$ of the normal interference fringe of the hologram screen is constant, there is the case in which the haze ratio becomes low in accordance with increase of the efficiency of the "Fresnel noise". For example, in the production of the hologram screen based on the conditions in which the scattering angle of the light diffusion body is 36° and intensity ratio $E_R/E_O$ is 3, as shown in FIG. 100, when the amount of exposure becomes constant or more, the diffraction efficiency $\eta_{RO}$ of the normal interference fringe becomes constant, but the haze ratio is increased as shown in FIG. 101. In this case, the amount of exposure is determined to a value in which the diffraction efficiency $\eta_{RO}$ becomes constant, i.e., 30 mJ/cm².

Figure 102:
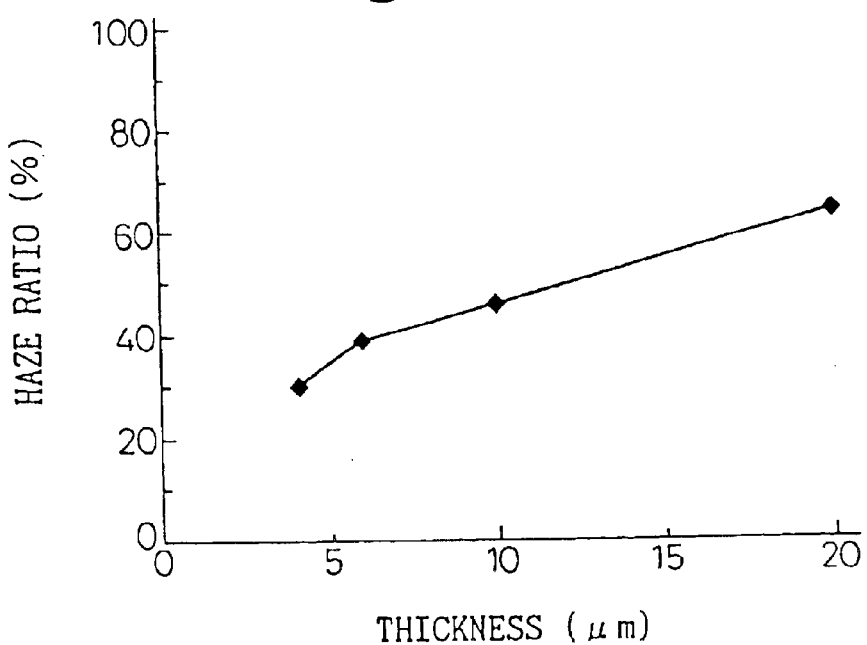
FIG. 102 is a graph for the relationship between the thickness of the photosensitive material and the haze ratio of the hologram screen in the second embodiment.

Further, it is possible to change the haze ratio in accordance with the thickness of the photosensitive material when producing the hologram screen. The change of the haze ratio is shown in FIG. 102 when changing the thickness of the photosensitive material. As is obvious from FIG. 102, it is preferable to use thin film as far as possible in the extent of characteristic of the hologram screen in order to obtain low haze ratio.

As shown in FIG. 112, the object light and the reference light are irradiated from the same direction. In this case, it is possible to obtain the transmission type hologram screen. On the other hand, the object light and the reference light are irradiated from the different direction each other. In this case, it is possible to obtain the reflection type hologram screen.

What is claimed is:

1. A hologram screen for reproducing an image based on an output light obtained by scattering and diffusing an image light from an image projector, characterized in that;

when a white light is used as the image light and projected on the hologram screen; and when a distance between two points at optional two points A and B on a surface of the hologram screen is given by 20 cm or less, and a value of the CIE 1976 chromaticity coordinate (u', v') at the point A is given by (u'$_A$, v'$_A$) and the value of the CIE 1976 chromaticity coordinate (u', v') at the point B is given by (u'$_B$, v'$_B$);

the output light, which is output perpendicularly from the surface of the hologram screen, has a color distribution in which a color difference Δu'v' between two points A and B is derived from the following formula (1) and given by 0.06 or less, where, the formula (1) is expressed by, $$\Delta u'v' = [(u'_A - u'_B)^2 + (v'_A - v'_B)^2]^{1/2} \qquad (1).$$

2. A hologram screen for reproducing an image based on an output light obtained by scattering and diffusing an image light from an image projector, characterized in that;

when a white light is used as the image light and projected on the hologram screen; and when a distance between two points at optional two points A and B on a surface of the hologram screen is given by 20 cm or less, and a value of the CIE 1976 chromaticity coordinate (u', v') at the point A is given by (u'$_A$, v'$_A$) and the value of the CIE 1976 chromaticity coordinate (u', v') at the point B is given by $(u'_B, v'_B)$;

the output light, which is output to a viewpoint defined by the following formula (2) from the surface of the hologram screen, has a color distribution in which a color difference Δu'v' between two points A and B is derived from the following formula (1) and given by 0.01 or less, where, the formula (1) is expressed by, $$\Delta u'v' = [(u'_A - u'_B)^2 + (v'_A - v'_B)^2]^{1/2} \quad (1)$$

and, where, the formula (2) is expressed by, $$H/2L = 0.1 \quad (2)$$

in the formula (2), L is a distance between the viewpoint and a center of the hologram screen, and H is a length of the hologram screen at the direction of the height.

3. A hologram screen as claimed in claim 1, wherein a spectral characteristic of the output light, which is output perpendicularly from the surface of the hologram screen, has a characteristic in which either a difference between peak wavelengths at the whole of the surface of the hologram screen is given by 120 nm or less, or a difference between half bandwidth is given by 100 nm or less.

* * * * *